United States Patent
Wu et al.

(10) Patent No.: US 9,761,370 B2
(45) Date of Patent: Sep. 12, 2017

(54) DUAL SIDE CONTROL FOR INDUCTIVE POWER TRANSFER

(71) Applicant: Utah State University, North Logan, UT (US)

(72) Inventors: Hunter Wu, Logan, UT (US); Kylee Sealy, Logan, UT (US); Aaron Gilchrist, Logan, UT (US)

(73) Assignee: UNITED STATES DEPARTMENT OF ENERGY, Washington, DC (US)

( * ) Notice: Subject to any disclaimer, the term of this patent is extended or adjusted under 35 U.S.C. 154(b) by 837 days.

(21) Appl. No.: 13/748,187

(22) Filed: Jan. 23, 2013

(65) Prior Publication Data

US 2013/0207468 A1 Aug. 15, 2013

Related U.S. Application Data

(60) Provisional application No. 61/589,599, filed on Jan. 23, 2012.

(51) Int. Cl.
*H02J 50/10* (2016.01)
*H01F 38/14* (2006.01)
(Continued)

(52) U.S. Cl.
CPC .......... *H01F 38/14* (2013.01); *B60L 11/182* (2013.01); *H02J 17/00* (2013.01); *H02J 50/10* (2016.02);
(Continued)

(58) Field of Classification Search
CPC ................................ H01F 38/14; H02J 17/00
See application file for complete search history.

(56) References Cited

U.S. PATENT DOCUMENTS

| 4,661,897 A | 4/1987 | Pitel et al. |
| 5,969,958 A | 10/1999 | Nielsen et al. |

(Continued)

FOREIGN PATENT DOCUMENTS

| CN | 101490943 | 7/2009 |
| EP | 1717940 A2 | 2/2006 |

(Continued)

OTHER PUBLICATIONS

H. Wu, A. Gilchrict, K. Sealy and D. Bronson, "A High Efficiency 5kW Inductive Charger for Evs using Dual Side Control," Jan. 1, 2012, Utah State university, Space Dynamics Lab publication, p. 147.*

(Continued)

*Primary Examiner* — Thienvu Tran
*Assistant Examiner* — Pinping Sun
(74) *Attorney, Agent, or Firm* — Kunzler Law Group

(57) ABSTRACT

An apparatus for dual side control includes a measurement module that measures a voltage and a current of an IPT system. The voltage includes an output voltage and/or an input voltage and the current includes an output current and/or an input current. The output voltage and the output current are measured at an output of the IPT system and the input voltage and the input current measured at an input of the IPT system. The apparatus includes a max efficiency module that determines a maximum efficiency for the IPT system. The max efficiency module uses parameters of the IPT system to iterate to a maximum efficiency. The apparatus includes an adjustment module that adjusts one or more parameters in the IPT system consistent with the maximum efficiency calculated by the max efficiency module.

23 Claims, 35 Drawing Sheets

(51) Int. Cl.
*H02M 3/335* (2006.01)
*B60L 11/18* (2006.01)
*H02M 7/5387* (2007.01)
*H02J 17/00* (2006.01)
*H02J 5/00* (2016.01)
*H02J 7/02* (2016.01)

(52) U.S. Cl.
CPC ... *H02M 3/33576* (2013.01); *H02M 7/53871* (2013.01); *H02J 5/005* (2013.01); *H02J 7/025* (2013.01); *Y02T 10/7005* (2013.01); *Y02T 10/7072* (2013.01); *Y02T 10/92* (2013.01); *Y02T 90/122* (2013.01); *Y02T 90/127* (2013.01); *Y02T 90/14* (2013.01); *Y10T 307/406* (2015.04)

(56) References Cited

U.S. PATENT DOCUMENTS

| | | | |
|---|---|---|---|
| 6,016,257 | A | 1/2000 | Chang et al. |
| 6,317,338 | B1 | 11/2001 | Boys |
| 6,366,051 | B1 | 4/2002 | Nantz et al. |
| 6,448,745 | B1 | 9/2002 | Killat et al. |
| 6,548,985 | B1* | 4/2003 | Hayes ............ H02J 7/022 320/108 |
| 7,148,669 | B2 | 12/2006 | Maksimovic et al. |
| 7,245,880 | B1* | 7/2007 | Jacobsen ............ H04W 52/42 370/318 |
| 7,307,461 | B2* | 12/2007 | Nguyen ............ G11C 7/1078 327/171 |
| 7,652,459 | B2 | 1/2010 | Abu Qahouq et al. |
| 8,085,024 | B2 | 12/2011 | Prodic et al. |
| 8,219,250 | B2* | 7/2012 | Dempster ............ G05B 15/02 700/22 |
| 8,405,373 | B2* | 3/2013 | Tsai ............ H02M 1/08 323/272 |
| 8,653,699 | B1 | 2/2014 | Dening et al. |
| 8,796,887 | B2* | 8/2014 | Von Novak ............ H02J 17/00 307/104 |
| 8,989,792 | B1* | 3/2015 | Depew ............ H04B 1/3838 455/117 |
| 9,337,664 | B2* | 5/2016 | Von Novak ............ H02J 5/005 |
| 2004/0047305 | A1* | 3/2004 | Ulupinar ............ H04W 52/125 370/320 |
| 2004/0208260 | A1* | 10/2004 | Chan ............ H03G 3/3042 375/297 |
| 2006/0181906 | A1 | 8/2006 | Batarseh et al. |
| 2007/0120421 | A1* | 5/2007 | Boys ............ H02J 5/005 307/11 |
| 2008/0053716 | A1 | 3/2008 | Scheucher |
| 2008/0203992 | A1 | 8/2008 | Qahouq et al. |
| 2009/0160422 | A1 | 6/2009 | Isobe et al. |
| 2009/0174263 | A1 | 7/2009 | Baarman et al. |
| 2009/0267582 | A1 | 10/2009 | Prodic et al. |
| 2010/0109443 | A1* | 5/2010 | Cook ............ H01Q 1/2225 307/104 |
| 2010/0109604 | A1 | 5/2010 | Boys et al. |
| 2010/0123451 | A1* | 5/2010 | Freer ............ H02J 5/005 323/356 |
| 2011/0049978 | A1 | 3/2011 | Sasaki et al. |
| 2011/0080056 | A1 | 4/2011 | Low et al. |
| 2011/0109263 | A1* | 5/2011 | Sakoda ............ B60L 11/182 320/108 |
| 2011/0163542 | A1* | 7/2011 | Farkas ............ B60L 11/005 290/2 |
| 2011/0181240 | A1 | 7/2011 | Baarman et al. |
| 2011/0199045 | A1* | 8/2011 | Hui ............ H02M 3/3376 320/108 |
| 2011/0204845 | A1 | 8/2011 | Paparo et al. |
| 2011/0254379 | A1 | 10/2011 | Madawala |
| 2011/0270462 | A1* | 11/2011 | Amano ............ H02J 5/005 700/297 |
| 2011/0285349 | A1* | 11/2011 | Widmer ............ B60L 11/182 320/108 |
| 2011/0304216 | A1 | 12/2011 | Baarman |
| 2012/0002446 | A1 | 1/2012 | Madawala et al. |
| 2012/0049620 | A1 | 3/2012 | Jansen |
| 2012/0080957 | A1* | 4/2012 | Cooper ............ H02J 5/005 307/104 |
| 2012/0112691 | A1* | 5/2012 | Kurs ............ B60L 11/182 320/108 |
| 2013/0020878 | A1* | 1/2013 | Karalis ............ H02J 7/025 307/104 |
| 2013/0049484 | A1 | 2/2013 | Weissentern et al. |
| 2013/0159956 | A1* | 6/2013 | Verghese ............ G06F 17/5036 716/122 |
| 2013/0308345 | A1 | 11/2013 | Gray et al. |

FOREIGN PATENT DOCUMENTS

| | | | | |
|---|---|---|---|---|
| FR | | 2738417 | A1 | 3/1997 |
| JP | | H06105408 | | 4/1994 |
| JP | | H11224822 | | 8/1999 |
| JP | | 2010068646 | | 3/2010 |
| JP | WO | 2011061821 | A1* | 5/2011 ............ H02J 5/005 |
| JP | | 2011244583 | | 12/2011 |
| RU | | 2316884 | C2 | 2/2008 |
| RU | | 2412514 | C2 | 2/2011 |
| TW | | 200810315 | A | 2/2008 |
| TW | | 327402 | | 7/2010 |
| WO | | 2008051611 | | 6/2008 |
| WO | | 2011046453 | | 4/2011 |
| WO | WO | 2011/046453 | A1 | 4/2011 |
| WO | WO | 2011/061821 | A1 | 5/2011 |
| WO | | 2012001291 | A2 | 1/2012 |
| WO | | 2012007942 | A2 | 1/2012 |

OTHER PUBLICATIONS

Keeling, et al., "A unity factor IPT pickup for high power application," IEEE transactions on industrial electronics, vol. 57, No. 2, Feb. 2010, IEEE transaction on industrial electronics, pp. 744-751.*
Covic, et al.,"A three-phase inductive power transfer system for roadway vehicles," ITT transaction on industrial Electronics, vol. 54, No. 6, Dec. 2007, pp. 3370-3378.*
Wu, et al., "" Design of Symmetric voltage cancellation control for LCL converter in inductive power transfer systems, IEEE international Electric Machines & Drives conference (IEMDC), May 15-18, pp. 866-871.*
Boys, et al., "Single phase unity power factor inductive power transfer system," IEEE power electron Specialists conference, Jun. 15-19, 2008 pp. 3701-3706.*
U.S. Appl. No. 13/748,074, Office Action, dated Sep. 12, 2014.
U.S. Appl. No. 13/748,074, Notice of Allowance, dated Apr. 7, 2015.
Hussnain, Ali et al., "Inductive Link Design for Medical Implants," Industrial Electronics & Applications 2009, ISIEA 2009, IEEE Symposium on, IEEE, Piscataway, NJ, USA, Oct. 4, 2009, pp. 694-699, XP031582290, ISBN: 978-4244-4681-0.
C. C. Chan, "The State of the Art of Electric, Hybrid, and Fuel Cell Vehicles," Proceedings of the IEEE, vol. 95, pp. 704-718, 2007.
SAE, "SAE Electric Vehicle and Plug in Hybrid Electric Vehicle Conductive Charge Coupler," SAE J1772 Standard, 2001.
M. Eghtesadi, "Inductive power transfer to an electric vehicle-analytical model," in 1990 IEEE 40th Vehicular Technology Conference, 1990, pp. 100-104.
S. Lee, J. Huh, C. Park, N.-S. Choi, G.-H. Cho, and C.-T. Rim, "On-Line Electric Vehicle using inductive power transfer system," in IEEE Energy Conversion Congress and Exposition (ECCE), 2010, pp. 1598-1601.
F. Nakao et al, "Ferrite core couplers for inductive chargers," in Proceedings of the Power Conversion Conference, 2002. PCC Osaka 2002. , 2002, pp. 850-854 vol. 2.
Huang, Chang-Yu et al, "LCL pick-up circulating current controller for inductive power transfer systems," in IEEE Energy Conversion Congress and Exposition (ECCE), 2010 2010, pp. 640-646.
P. Si et al, "Analyses of DC Inductance Used in ICPT Power Pick-Ups for Maximum Power Transfer," in 2005 IEEE/PES Transmission and Distribution Conference and Exhibition: Asia and Pacific, 2005 pp. 1-6.

(56) References Cited

OTHER PUBLICATIONS

PCT Application No. PCT/US2013/22787, ISR & Written Opinion, dated May 7, 2013.
PCT Application No. PCT/US2013/022788, ISR & Written Opinion, dated May 16, 2013.
U.S. Appl. No. 13/748,269, Office Action dated.
Brooker et al., Technology improvement pathways to cost effective vehicle electrification, 2010 SAE2010 World Cong. 1-18 (Feb. 1, 2010).
Budhia et al., Design and Optimisation of Circular Magnetic Structures for Lumped Inductive Power Transfer Systems, 2009 Energy Conversion Cong. and Expo 2081-2088 (Sep. 20-24, 2009).
Magnus et al., A d.c. magnetic metamaterial, 7:4 Nat. Mater. 295-297 (2008).
Milton et al., Realizability of metamaterials with prescribed electric permittivity and magnetic permeability tensors, 12 New Journal of Physics (Mar. 2010).
Zierhofer et al., Geometric approach for coupling enhancement of magnetically coupled coils, 43 IEEE Transactions on Biomedical Engineering 708-714 (1996).
Boys et al., Stability and control for inductively coupled power transfer systems, 147 IEE Proc.—Electric Power Applications 37-43 (2000).
Wu et al., A 1kW inductive charging system using AC processing pickups, 6 IEEE Industrial Electronics and Applications 1999-2004 (Jun. 21-23, 2011).
Covic et al., A Three-Phase Inductive Power Transfer System for Roadway-Powered Vehicles, 54:6 IEEE Transactions on Industrial Applications 3370-3378 (2007).
Borage et al., Analysis and design of an LCL-T resonant converter as a constant-current power supply, 52 IEEE Transactions on Industrial Electronics 1547-1554 (2005).
Wu et al., Design of Symmetric Voltage Cancellation Control for LCL converters in Inductive Power Transfer Systems, 2011 IEEE International Electric Machines & Drives Conf. 866-871 (May 15-18, 2011).
Nakao et al., Ferrite core couplers for inductive chargers, 2 Power Conversion Conf. 850-854 (2002).
Wu et al., A review on inductive charging for electric vehicles, 2011 IEEE Int'l Macnines & Drives Conf. 143-147 (May 15-18, 2011).
Huang et al., LCL pick-up circulating current controller for inductive power transfer systems, 2010 IEEE Energy Conversion Cong. and Exposition (ECCE) 640-646 (Sep. 12-16, 2010).
Budhia et al., A new IPT magnetic coupler for electric vehicle charging systems 36 IEEE Industrial Electronics and Applications 2487-2492 (Nov. 7-10, 2010).
Budhia et al., Development and evaluation of single sided flux couplers for contactless electric vehicle charging, 2011 IEEE Energy Conversion Cong. and Expo 613-621 (Sep. 17-22, 2011).
Chigira et al., Small-Size Light-Weight Transformer with New Core Structure for Contactless Electric Vehicle Power Transfer System, 2011 IEEE Energy Conversion Cong. and Expo 260-266 (Sep. 17-22, 2011).
Jin et al., Characterization of novel Inductive Power Transfer Systems for On-Line Electric Vehicles, 26 IEEE Applied Power Electronics Conference and Expo 1975-1979 (Mar. 6-11, 2011).
Nagatsuka et al., Compact contactless power transfer system for electric vehicles, 2010 Int'l Power Electronics Conf. 807-813 (Jun. 21-24, 2010).
Covic et al., Self tuning pick-ups for inductive power transfer, 2008 IEEE Power Electronics Specialists Conf. 3489-3494.

Si et al., Wireless Power Supply for Implantable Biomedical Device Based on Primary Input Voltage Regulation, 2 IEEE Cof. on Industrial Electronics and Applications 235-239 (2007).
Joung et al., An energy transmission system for an artificial heart using leakage inductance compensation of transcutaneous transformer, 13 IEEE Transactions on Power Electronics 1013-1022 (1998).
Si et al., A Frequency Control Method for Regulating Wireless Power to Implantable Devices, 2 IEEE Transactions on Biomedical Circuits and Systems 22-29 (2008).
Sasaki et al., Thermal and Structural Simulation Techniques for Estimating Fatigue of an IGBT Module, 20 Power Semiconductor Devices and IC's 181-184 (2008).
Ciappa et al., Lifetime prediction of IGBT modules for traction applications, 38 IEEE Reliability Physics Symp. 210-216 (2000).
Borage et al., Analysis and design of an LCL-T resonant converter as a constant-current power supply, 52 IEEE Int'l Electric Machines & Drives Conf. 1547-1554 (2005).
Budhia et al., A new IPT magnetic coupler for electric vehicle charging systems, 36 IEEE Industrial Electronics Conf. 2487-2492 (Nov. 10-17, 2010).
Keeling et al., A Unity-Power-Factor IPT Pickup for High-Power Applications, 57 IEEE Transactions on Industrial Electronics 744-751 (Feb. 2010).
Boys et al., Single-phase unity power-factor inductive power transfer system, 2008 IEEE Power Electronics Specialists Conf. 3701-3706.
Xu et al., Modeling and controller design of ICPT pickups, 3 Int'l Conf. on Power System Technology 1602-1606 (2002).
Si et al., Analyses of DC Inductance Used in ICPT Power Pick-Ups for Maximum Power Transfer, 2005 IEEE Transmission and Distribution Conf. and Exhibition: Asia and Pacific 1-6 (2005).
Boys et al., Controlling inrush currents in inductively coupled power systems, 7 IEEE Int'l Power Engineering Conference 1046-1051 (2005).
Musavi et al., A High-Performance Single-Phase Bridgeless Interleaved PFC Converter for Plug-in Hybrid Electric Vehicle Battery Chargers, 47 IEEE Transactions on Industry Applications 1833-1843 (Jul.-Aug. 2011).
Elliott et al., Multiphase Pickups for Large Lateral Tolerance Contactless Power-Transfer Systems, 57 IEEE Transactions on Industrial Electronics 1590-1598 (May 2010).
Wang et al., Design considerations for a contactless electric vehicle batter charger, 52 IEEE Transactions on Industrial Electronics 1308-1314 (2005).
PCT/US2013/022787, International Search Report and Written Opinion, dated May 7, 2013.
H. Chang-Yu, J. T. Boys, G. A. Covic, and M. Budhia, "Practical considerations for designing IPT system for EV battery charging," in Proc. IEEE Veh. Power Propulsion Conf. (VPPC '09), 2009, pp. 402-407.
O. H. Stielau and G. A. Covic, "Design of loosely coupled inductive power transfer systems," in Proc. Int. Conf. Power Syst. Technol. (PowerCon'00), 2000, pp. 85-90.
Hunter Wu, Design of Symmetric Volatage Cancellation Control for LCL Converters in Inductive Power Transfer System, IEEE International Electric Machine & Drive Conference ,US, May 15, 2011.
Hunter Wu, 1KW Inductive Charging System using AC Processing Pickups, IEEE Conference on Industrial Electronics and Applications, US, Jun. 1, 2011.
Hunter Wu, A Review on Inductive Charging for Electric Vehicles, IEEE International Electric Machine & Drive conference, US, May 15, 2011.

* cited by examiner

Misalignment conditions for vertical and horizontal misalignment.

The losses in the H-bridge for different temperatures for IRG7PH42UPBF

Switch Heatsink Thermal Design

Simplified IGBT Gate Drive Circuit

LCL Converter with Split Inductor Design

Adjustable Inductor

Flux density of AC inductor design for LCL converter using E55 core.

Circular pad structure and dimension (Top View)

Coupling coefficient vs. vertical height for IPT pad

Uncompensated power of IPT pads for different vertical heights

Dimensions and Configuration of Ferrite Arm Support Structure

Dovetail Groove Dimensions

Primary track current vs. conduction angle

Equivalent efficiency model circuit diagram of secondary decoupling pickup

Equivalent efficiency model circuit diagram of primary LCL converter

Controller block diagram for optimal efficiency

Coupling coefficient estimation using: upper traces for k=2k$_{min}$ (M=60μH) and lower traces for k=1.14k$_{min}$ (M=34.2μH)

Parallel pickup with decoupling circuit

AC current peak to peak amplitude normalized against DC average value vs. Ldc

Secondary pickup efficiency vs. switching frequency of the decoupling circuit

Root locus and bode plot of decoupling circuit

Efficiency of System @k=1.14k$_{min}$ (v=246mm, h=0mm).

Efficiency of System @k=2.0k$_{min}$ (v=172mm, h=0).

Practical overall system efficiency measurements when output voltage is allowed to vary. 5kW transfer occurs when the DC output is 300 V.

Magnetic field measurement results for 5 kW system operating under worst conditions.

Body average measurement from 4 measurement points on a 1500 mm tall female human body.

Efficiency of System @k=1.14k$_{min}$ (v=246mm, h=0mm).

Efficiency of System @k=2.0k$_{min}$ (v=172mm, h=0).

Current values for waveforms $i_b$, $i_1$, and $i_2$ for $Q_{2v}=0.2Q_{2vm}$ and $k=2k_{min}$ Efficiency measurement under a wide range of operating conditions.

(a)

(b)

(a) P=2kW, (b) P=5kW @ v=246mm h=0mm. Top to bottom trace, $i_b$ (Figure 11), $i_1$ (Figure 11), $i_2$ (Figure 29), and $V_s$ (Figure 29) (inverse of duty cycle).

(a)

(b)

(a) P=2kW, (b) P=5kW @ v=246mm h=0mm. Top to bottom trace, $i_b$ (Figure 11), $i_1$ (Figure 11), $i_2$ (Figure 29), and $V_s$ (Figure 29) (inverse of duty cycle).

DUAL SIDE CONTROL FOR INDUCTIVE POWER TRANSFER

This application claims the benefit of U.S. Provisional Patent Application No. 61/589,599 entitled "WIRELESS POWER TRANSFER SYSTEM AND METHODS" and filed on Jan. 23, 2012 for Hunter Wu, et al., which is incorporated herein by reference for all purposes. U.S. patent application Ser. No. 13/748,074 entitled "SWITCH WEAR LEVELING" and filed on Jan. 23, 2013 for Hunter Wu, et al., and U.S. patent application Ser.No. 13/748,269 entitled "WIRELESS POWER TRANSFER SYSTEM" and filed on Jan. 23, 2013 for Hunter Wu, et al. are incorporated herein by reference for all purposes.

This invention was made with government support under contract DEEE0003114 by the Department of Energy. The government has certain rights in the invention.

FIELD OF THE INVENTION

This invention relates to control of switching power supplies and more particularly relates to control of switching power supplies in an inductive power transfer ("IPT") system.

SUMMARY

An apparatus for dual side control includes a measurement module that measures a voltage and a current of an IPT system. The voltage includes an output voltage and/or an input voltage and the current includes an output current and/or an input current. The output voltage and the output current are measured at an output of the IPT system and the input voltage and the input current measured at an input of the IPT system. The apparatus includes a max efficiency module that determines a maximum efficiency for the IPT system. The max efficiency module uses parameters of the IPT system to iterate to a maximum efficiency. The apparatus includes an adjustment module that adjusts one or more parameters in the IPT system consistent with the maximum efficiency calculated by the max efficiency module.

In one embodiment, the IPT system includes a first stage and a second stage. The first stage transmits energy wirelessly and the second stage receives the wirelessly transferred energy and controls energy transfer to one or more loads via an output bus. The output voltage and the output current are measured on the output bus. In another embodiment, the first stage includes an LCL load resonant converter and the second stage includes a secondary resonant circuit, a secondary rectification circuit and/or a secondary decoupling circuit. In another embodiment, at least one load includes an energy storage device.

In one embodiment, the one or more parameters adjusted by the adjustment module include a duty cycle reference that adjusts a duty cycle of the second stage and/or a conduction angle reference that adjusts conduction angle of the first stage. In a further embodiment, the adjustment module adjusting the duty cycle reference and/or the conduction angle reference is part of an outer control loop where the first stage includes a first stage inner loop controlling conduction angle based on the conduction angle reference and the first stage inner loop controls conduction angle faster than the outer loop control and/or the second stage includes a second stage inner loop controlling duty cycle based on the duty cycle reference and the second stage inner loop controls duty cycle faster than the outer loop control.

In one embodiment, the max efficiency module determines the maximum efficiency by iterating using one or more variables. The one or more variables include conduction angle of the first stage, duty cycle of the second stage, size of a gap where the IPT system transfers power wirelessly across the gap, misalignment of a primary receiver pad and a secondary receiver pad where the IPT system transfers power wirelessly from the primary receiver pad to the secondary receiver pad, power transferred to the one or more loads, and/or a quality factor.

In one embodiment, the max efficiency module determines the maximum efficiency by determining an efficiency of at least the first stage and the second stage for the measured voltage and current. In another embodiment, the max efficiency module determines the maximum efficiency where efficiency of the IPT system is calculated as $\eta = \eta_{r1} \cdot \eta_{c1} \cdot \eta_{r2} \cdot \eta_{b2} \cdot \eta_{c2}$, where $\eta$ is IPT system efficiency, $\eta_{r1}$ is efficiency of the first stage without voltage drop, $\eta_{c1}$ is efficiency of first stage without linear resistance loss, $\eta_{r2}$ is efficiency of a secondary resonant circuit of the second stage, $\eta_{b2}$ is efficiency of a secondary rectification circuit and a secondary decoupling circuit of the second stage without voltage drop, and $\eta_{c2}$ is efficiency of the secondary rectification circuit and the secondary decoupling circuit of the second stage with linear resistance loss.

In another embodiment, where the first stage includes an LCL load resonant converter and the secondary decoupling circuit includes a secondary boost converter, $\eta_{r1}$ is calculated as:

$$\eta_{r1} = \frac{1}{1 + \frac{R_{L1} + R_b \omega^2 C_1^2 ((R_{L1} + Re(Z_r))^2 + (\omega \Delta L_1 + Im(Z_r))^2)}{Re(Z_r)}}$$

where $R_{L1}$ is the equivalent series resistance ("ESR") of a primary receiver pad, where the IPT system transfers power wirelessly from the primary receiver pad to a secondary receiver pad, $R_b$ is ESR of a bridge inductor of the LCL load resonant converter of the first stage and linear on resistance of switching devices on during a half cycle of the LCL load resonant converter, $\omega$ is an operating frequency of the IPT system, $C_1$ is capacitance of a parallel tuning capacitor of the LCL load resonant circuit, $Re(Z_r)$ is a reflected resistance on the first stage of the second stage, $\Delta L_1$ is change in the primary receiver pad inductance due to size of size of a gap where the IPT system transfers power wirelessly across the gap, and $Im(Z_r)$ is a reflected reactance on the first stage of the second stage.

In a further embodiment, the first stage includes an LCL load resonant converter and the secondary decoupling circuit includes a secondary boost converter and $Z_r$ is calculated as $Z\_r = Re(Z\_r) + j*Im(Z\_r)$ where $$Re(Z_r) = \frac{\omega M^2}{L_{2eq}} \frac{Q_{2v}}{1 + Q_{2v}^2 \alpha^2} \text{ and}$$

$$Im(Z_r) = \frac{\omega M^2}{L_{2eq}} \left( -1 - \frac{Q_{2v}}{1 + Q_{2v}^2 \alpha^2} \right)$$

where M is mutual inductance between the primary receiver pad and the secondary receiver pad of the IPT system, $L_{2eq}$ is an equivalent secondary receiver pad inductance with series tuning, $Q_{2v}$ is a voltage quality factor of the secondary resonant circuit, and $\alpha$ is a normalized detuning capacitance ratio of the secondary resonant circuit, the normalized detuning capacitance ratio defined as $\alpha=|(\Delta C\_2)/C\_2|$, $C_2$ is capacitance of a parallel tuning capacitor of the secondary resonant circuit, and $\Delta C_2$ is an equivalent change in secondary tuning capacitance due to variations in self inductance of the secondary receiver pad.

In a further embodiment, M is calculated as $$M = \frac{\sqrt{1+Q_{2v}^2\alpha^2}}{1-D} \frac{I_{out}X_1}{V_{dc}\sin\left(\frac{\sigma}{2}\right)} L_{2eq}$$

where $$Q_{2v} = \frac{\pi^2(1-D)^2 R_{dc}}{8\omega L_{2eq}} \text{ and where } R_{dc} = \frac{V_{out}}{I_{out}},$$

$V_{out}$ is output voltage measured on the output bus, $I_{out}$ is output current measured on the output bus, $\sigma$ is conduction angle of the first stage, and D is a duty cycle of the secondary boost converter of the second stage.

In one embodiment, where the first stage includes an LCL load resonant converter and the secondary decoupling circuit includes a secondary boost converter, $\eta_{c1}$ is calculated as $$\eta_{c1} = 1 - \frac{\pi V_{hs\_on}}{\omega L_b \sqrt{\frac{2P_{out}}{Re(Z_r)}}}$$

where $V_{hs\_on}$ is a voltage drop portion of a switching device of the first stage, $\omega$ is an operating frequency of the IPT system, $L_b$ is a bridge inductance of the LCL load resonant converter, $P_{out}$ is output power transferred by the IPT system, and $Re(Z_r)$ is a reflected resistance on the first stage of the second stage.

In another embodiment, where the first stage includes an LCL load resonant converter and the secondary decoupling circuit includes a secondary boost converter, $\eta_{r2}$ is calculated as $$\eta_{r2} = \frac{1}{1+\frac{\omega C_2 R_{L2}}{Q_{2v}}(1+Q_{2v}^2(1+\alpha)^2)}$$

where $\omega$ is an operating frequency of the IPT system, $C_2$ is capacitance of a parallel tuning capacitor of the secondary resonant circuit of the second stage, $R_{L2}$ is ESR of a secondary receiver pad, the IPT system transferring power wirelessly from a primary receiver pad to the secondary receiver pad, $Q_{2v}$ is a voltage quality factor of the secondary resonant circuit, and $\alpha$ is a normalized detuning capacitance ratio of the secondary resonant circuit, the normalized detuning capacitance ratio defined as $$\alpha = \left|\frac{\Delta C_2}{C_2}\right|, \text{ where } Q_{2v} = \frac{\pi^2(1-D)^2 R_{dc}}{8\omega L_{2eq}} \text{ and } R_{dc} = \frac{V_{out}}{I_{out}},$$

$V_{out}$ is output voltage measured on the output bus, $I_{out}$ is output current measured on the output bus, $L_{2eq}$ is an equivalent secondary receiver pad inductance with series tuning, D is a duty cycle of the secondary boost converter of the second stage, and $\Delta C_2$ is an equivalent change in secondary tuning capacitance due to variations in self inductance of the secondary receiver pad.

In another embodiment where the first stage includes an LCL load resonant converter and the secondary decoupling circuit includes a secondary boost converter, $\eta_{b2}$ is calculated as $$\eta_{b2} = \frac{1}{1+\frac{8\omega C_2(R_{Ldc}+R_{bd\_on})}{\pi^2 Q_{2v}}}$$

where $\omega$ is an operating frequency of the IPT system, $C_2$ is capacitance of a parallel tuning capacitor of the secondary resonant circuit of the second stage, $R_{Ldc}$ is ESR of a DC inductor and linear on resistance of switching devices on during a half cycle of the LCL load resonant converter, $R_{bd\_on}$ is a linear resistance of a diode of a secondary boost converter of the second stage, and $Q_{2v}$ is a voltage quality factor of the secondary resonant circuit, where $$Q_{2v} = \frac{\pi^2(1-D)^2 R_{dc}}{8\omega L_{2eq}} \text{ and } R_{dc} = \frac{V_{out}}{I_{out}},$$

$L_{2eq}$ is an equivalent secondary receiver pad inductance with series tuning, $V_{out}$ is output voltage measured on the output bus, $I_{out}$ is output current measured on the output bus, and D is a duty cycle of the secondary boost converter of the second stage.

In another embodiment where the first stage includes an LCL load resonant converter and the secondary decoupling circuit includes a secondary boost converter, $\eta_{c2}$ is calculated as $$\eta_{c2} = \frac{1}{1+\frac{\pi V_{rd\_on}+\sqrt{2}V_{bd\_on}}{\sqrt{2}(1-D)V_{out}}}$$

where $V_{rd\_on}$ is a voltage drop portion of a diode of the secondary rectifier circuit of the second stage, $V_{bd\_on}$ is a voltage drop portion of a diode of the secondary boost converter of the second stage, D is a duty cycle of the secondary boost converter of the second stage, and $V_{out}$ is a DC output voltage of the secondary resonant circuit of the second stage.

A system for dual side control includes a first stage with a primary receiver pad, a second stage with a secondary receiver pad, and an output power bus. The first stage transmits energy wirelessly from the primary receiver pad and the second stage receives the wirelessly transferred energy in the secondary receiver pad. The second stage controls energy transfer to one or more loads via the output bus and the first stage, the second stage, and the output power bus are at least a portion of an IPT system. The system includes a measurement module that measures a voltage and a current where the voltage and current are measured on the output bus and/or an input to the IPT system. The system includes a max efficiency module that determines a maximum efficiency for the IPT system. The max efficiency module uses parameters of the IPT system to iterate to a maximum efficiency. The system includes an adjustment module that adjusts one or more parameters in the IPT system consistent with the maximum efficiency calculated by the max efficiency module.

The system may further include, in one embodiment, an energy storage device where the energy storage device is a load of the one or more loads. In another embodiment, the energy storage device provides power to a vehicle and the second stage and the energy storage device reside on the vehicle. The vehicle receives power wirelessly from the first stage when the secondary receiver pad is at least partially aligned with the primary receiver pad. In another embodiment, the first stage includes a rectifier stage that rectifies an AC voltage connected as input power to the first stage. In another embodiment, the first stage includes an LCL load resonant converter and the second stage includes a secondary resonant circuit, a secondary rectification circuit, and a secondary boost converter and the max efficiency module determines the maximum efficiency where efficiency of the IPT system is calculated as $\eta = \eta_{r1} \cdot \eta_{c1} \cdot \eta_{r2} \cdot \eta_{b2} \cdot \eta_{c2}$, as defined above.

A method for dual side control includes measuring a voltage and a current of an IPT system. The voltage is an output voltage and/or an input voltage and the current is an output current and/or an input current. The output voltage and the output voltage are measured at an output of the IPT system and the input voltage and the input current are measured at an input of the IPT system. The method includes determining a maximum efficiency for the IPT system using parameters of the IPT system to iterate to a maximum efficiency and adjusting one or more parameters in the IPT system consistent with the calculated maximum efficiency.

In one embodiment, the IPT system includes a first stage and a second stage and the first stage transmits energy wirelessly and the second stage receives the wirelessly transferred energy and controls energy transfer to one or more loads via an output bus. The first stage includes an LCL load resonant converter and the second stage includes a secondary resonant circuit, a secondary rectification circuit and/or a secondary decoupling circuit, and at least one load includes an energy storage device. In another embodiment, adjusting the one or more parameters includes adjusting a duty cycle reference that adjusts a duty cycle of the second stage and/or a conduction angle reference that adjusts conduction angle of the first stage and adjusting the duty cycle reference and/or the conduction angle reference are part of an outer control loop where the first stage includes a first stage inner loop controlling conduction angle based on the conduction angle reference where the first stage inner loop controls conduction angle faster than the outer loop control and/or the second stage includes a second stage inner loop controlling duty cycle based on the duty cycle reference where the second stage inner loop controls duty cycle faster than the outer loop control.

In one embodiment, determining the maximum efficiency includes determining the maximum efficiency by iterating using one or more variables where the one or more variables include conduction angle of the first stage, duty cycle of the second stage, size of a gap where the IPT system transfers power wirelessly across the gap, misalignment of a primary receiver pad and a secondary receiver pad where the IPT system transfers power wirelessly from the primary receiver pad to the secondary receiver pad, power transferred to the one or more loads, and/or a quality factor.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

I. Primary AC to DC Power Factor Stage

Figure 3:
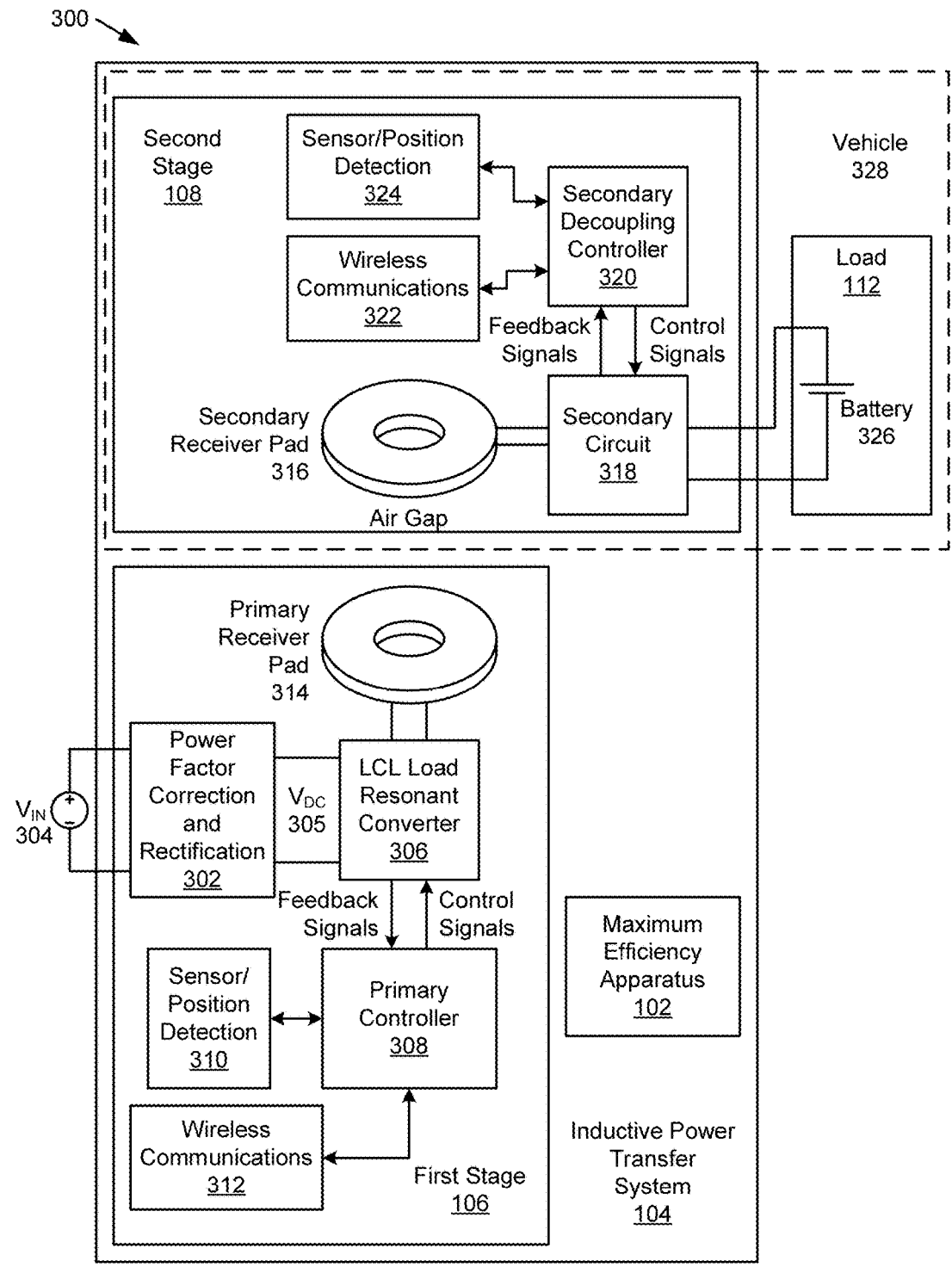
FIG. 3 illustrates a block diagram of an exemplary inductive power transfer charging system with a maximum efficiency apparatus.

FIG. 3 illustrates a block diagram of an exemplary inductive power transfer ("IPT") charging system 300. The IPT system 300 of FIG. 3, is one embodiment of a system 100 that may include a maximum efficiency apparatus 102 in an IPT system 104, as described below. The IPT systems 300 described herein may include a power factor stage 302, such as a primary alternating current ("AC") to direct current ("DC") power factor stage, fed from a voltage source 304, such as from a utility power grid. In some embodiments, a primary AC-DC converter stage may be configured to convert grid-level voltages to a DC voltage 305, such as a DC bus voltage, for a primary tuned resonant converter. A DC output voltage with very low output ripple is preferred to large ripple systems in order to prevent an amplitude modulated signal appearing in the wireless inductive power transfer system which can cause reduced efficiency and require additional complexity.

In some embodiments, active power factor correction ("PFC") in AC-DC converters may help to ensure the grid voltage and current are closely in phase. PFC may reduce overall grid current requirements and typically reduces grid harmonic. Grid power supply companies typically have certain harmonic requirements for attached industrial equipment. Often grid power supply companies also charge extra for power to industrial equipment that exhibits low power factor.

In the IPT system 300 described herein, one or more suitable stages may be used for PFC. For example, one or more commercial off-the-shelf ("COTS") AC-DC high efficiency power factor corrected converters may be used. The grid voltage source 304 may be a wide range of voltage inputs including, for example, single-phase 240 VAC, three-phase 208 VAC, or three-phase 480 VAC. In another embodiment, a 400 VDC output may be used for this stage and 400 VDC is typically an efficient output for a nominal grid input of single-phase 240 VAC grid input. A single-phase 240 VAC grid voltage with a 30 A circuit (suitable for a 5 kW IPT system) is commonplace in the United States even in areas that do not support industrial three-phase voltages, and may be used with the IPT system 300.

For the IPT system 300, the converter 104 includes an LCL load resonant converter 306 controlled by a primary controller 308 that may receive feedback signals from and may send control signals to the LCL load resonant converter 306. The primary controller 308 may receive information from alignment sensors for position detection 310 and may communicate over wireless communications 312. The LCL load resonant converter 306 is coupled to a primary receiver pad 314 coupled to a secondary receiver pad 316 over an air gap. The secondary receiver pad 316 is connected to a parallel decoupling pickup shown as a secondary circuit 318 controlled by a secondary decoupling controller 320 that may receive feedback signals and may send control signals to the secondary circuit 318. The secondary decoupling controller 320 may also communicate with alignment sensors for position detection 324 for control and may communicate wirelessly 322. The secondary circuit 318 may connect to a load 112, such as a battery 326 and may charge the battery 326. The battery 326 may provide power to another load, such as a motor controller (not shown). The second stage 108 and load 112 may be located in a vehicle 328.

II. Primary Tuned Resonant Converter

The IPT systems 300 described herein may contain a primary tuned resonant converter. In some embodiments, the LCL load resonant converter 306 shown in FIG. 13 may be used. The LCL load resonant converter 306 may include a switching section and an LCL tuning section. This converter may include the following advantages:

The inverter bridge typically only has to supply the real power required by the load 112 and any losses in the resonant tank. The high track currents are constrained to self-circulate in the resonant tank. For example, in most practical applications where $Q_1 > 1$ and $i_b < i_1$ (see FIG. 13), the switches have low conduction losses and a high converter efficiency may be achieved.

The output current is typically independent of load, making it a constant current source which may be ideal for IPT applications. The primary receiver pad current $i_1$ is typically only dependent on one control variable and hence the power output, or uncompensated power ("SU") in equation (1), is directly controlled.

To design the LCL load resonant converter, in one embodiment the reactance of each branch is tuned by the conventional equation in M. Borage et al, "Analysis and design of an LCL-T resonant converter as a constant-current power supply," *IEEE Transactions on Industrial Electronics*, vol. 52, pp. 1547-1554, 2005:

$$X_1 = \omega L_b = \frac{1}{\omega C_1} = \omega L_1 - \frac{1}{\omega C_{1s}} = \omega L_{1eq} \tag{1}$$

Here $C_{1s}$ is a series tuning capacitor to reduce the reactance of the pickup to a desired operating value. For this system, phase shift control or symmetric voltage cancellation ("SVC") is used to directly control the track current ($i_1$) with one control variable ($\sigma$). SVC is described in more detail in H. H. Wu et al, "Design of Symmetric Voltage Cancellation Control for LCL converters in Inductive Power Transfer Systems," in *IEEE International Electric Machines & Drives Conference* ("IEMDC"), 2011, 2011, pp. 866-871, which is incorporated herein by reference. To determine the track current under SVC, and assuming fundamental mode analysis, the following equation may be used:

$$i_1 = \frac{2\sqrt{2}\,V_{dc}}{\pi X_1} \sin\left(\frac{\sigma}{2}\right) \tag{2}$$

The maximum obtainable track current can be determined when $\sigma$ is set to 180°. For the LCL converter, the specifications in Table I are calculated according to the design equations. The reflected impedance of a fully tuned parallel resonant tank is given by:

$$Z_r = \frac{\omega^2 M^2}{Z_2} = \omega \frac{M^2}{L_{2eq}}(Q_{2v} - 1 \cdot j) \tag{3}$$

It should be noted from (3) that a constant reflected capacitive reactance is in series with the track inductor and one method to directly compensate for this in the design (see H. H. Wu et al, "Design of Symmetric Voltage Cancellation Control for LCL converters in Inductive Power Transfer Systems," in *IEEE International Electric Machines & Drives Conference* ("IEMDC"), 2011, 2011, pp. 866-871.) is to short the secondary pickup inductance with its series tuning capacitor. This gives a new primary operating range of inductance for a targeted vertical height range dependent on the mutual inductance of the magnetics.

As the coupling changes in the system, a complex phenomenon of variations in both $Z_r$ and equivalent $L_1$ will occur. This will cause the bridge current $i_b$ to increase beyond its nominal. In addition, $i_b$ is inversely proportional to $M_2$, which is dependent on the loading condition on the secondary side. Hence, $i_b$ is:

$$i_b = \frac{(V_{ab})_1}{j\omega \Delta L_1 + Z_r} \quad (4)$$

Because the system may be allowed to change its coupling by 100% ($k_{max}$=200% $k_{min}$) or more, the maximum $i_b$ in some embodiments may be designed for at least 2 times the minimum $i_b$. With variations in the primary self-inductance, the bridge current inductor must be sized for associated maximum currents as determined by the coupling range. The system design parameters as shown in Table I are exemplary parameters for a system capable of handling a change in coupling of 2 times. The system may be modified to accommodate a larger range of coupling such as a variance upwards of about 3 or about 4 times the minimum coupling.

In some embodiments, a 5 kW output capable wireless inductive power transfer system may be designed and implemented demonstrating an air gap of 165 mm to 265 mm and an overall system efficiency >90% under full load across the entire conical volume of operation. For the LCL Converter, Table I shows the exemplary and chosen values for each of the described parameters. A frequency of 20 kHz was also chosen to be within the capabilities of standard IGBT switch technology for hard switching applications.

TABLE I

Design Parameters for LCL Converter.

Figure 4:
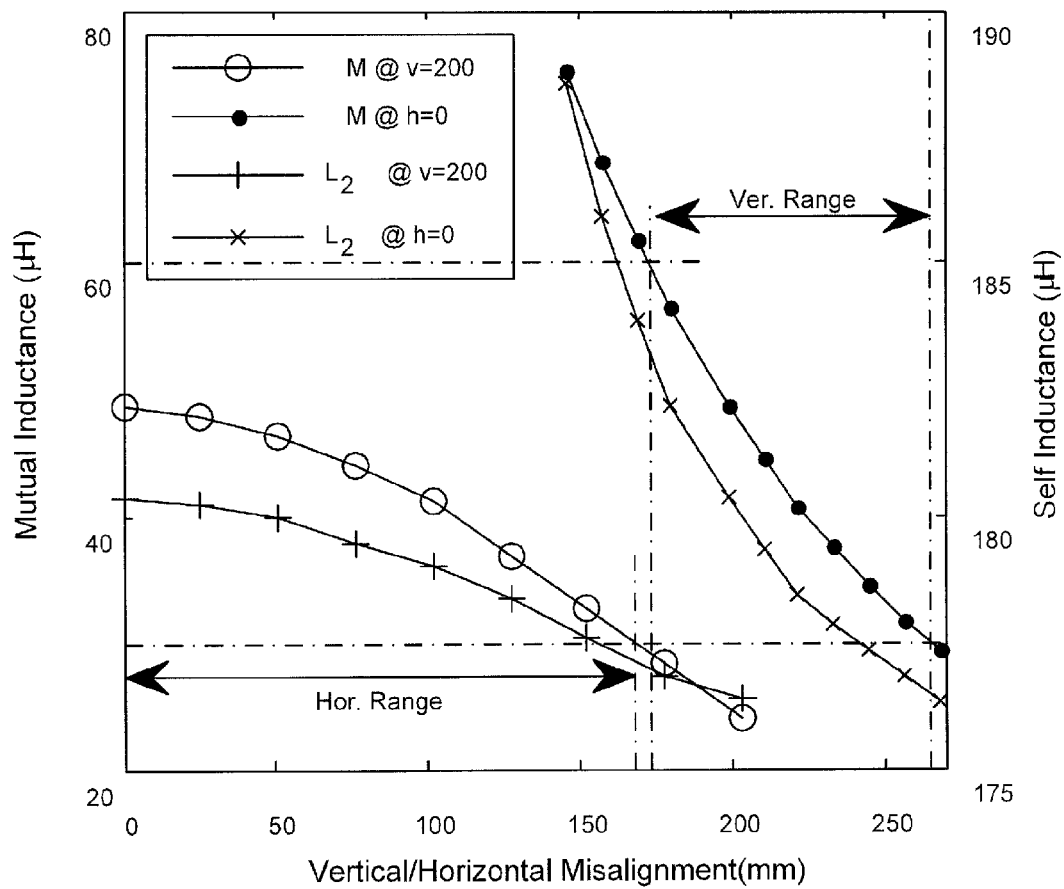
FIG. 4 illustrates misalignment conditions for vertical and horizontal misalignment. h=0 trend represents the profile of vertical misalignment under zero horizontal offset. v=200 trend represents the profile of horizontal misalignment under 200 mm of height separation.

| Parameter | Value | Parameter | Value |
|---|---|---|---|
| $V_{dc}$ | 400 V | $C_{1s}$ | 680.73 nF |
| $X_1$ | 9 Ω | $L_1$ (FIG. 4) | 177-188 µH |
| $i_{1-max}$ | 40 A | $L_{1-short}$ | 161-172 µH |
| $L_b$ | 71.62 µH | Switch | IRG7PH42UPBF |
| $C_1$ | 884.19 nF | Diode | RHRG75120 |
| ω | 1.257 × 10$^5$ rad/s (f = 20 kHz) | | |

A. Switch and Diode Selection of the Switching Section

After the topology and control strategy is chosen for the primary converter, the semiconductor devices may be selected next. Any suitable semiconductor device capable of performing the functions described herein may be used. Exemplary semiconductor devices include the International Rectifier IGBT IRG7PH42UPBF discrete device, other discrete or module-based Insulated Gate Bipolar Transistors ("IGBT"), other discrete or module-based Metal Oxide Field Effect Transistors ("MOSFET"), or similar technologies including Silicon Carbide ("SiC") or Gallium Nitride ("GaN") type semiconductor devices.

Figure 6:
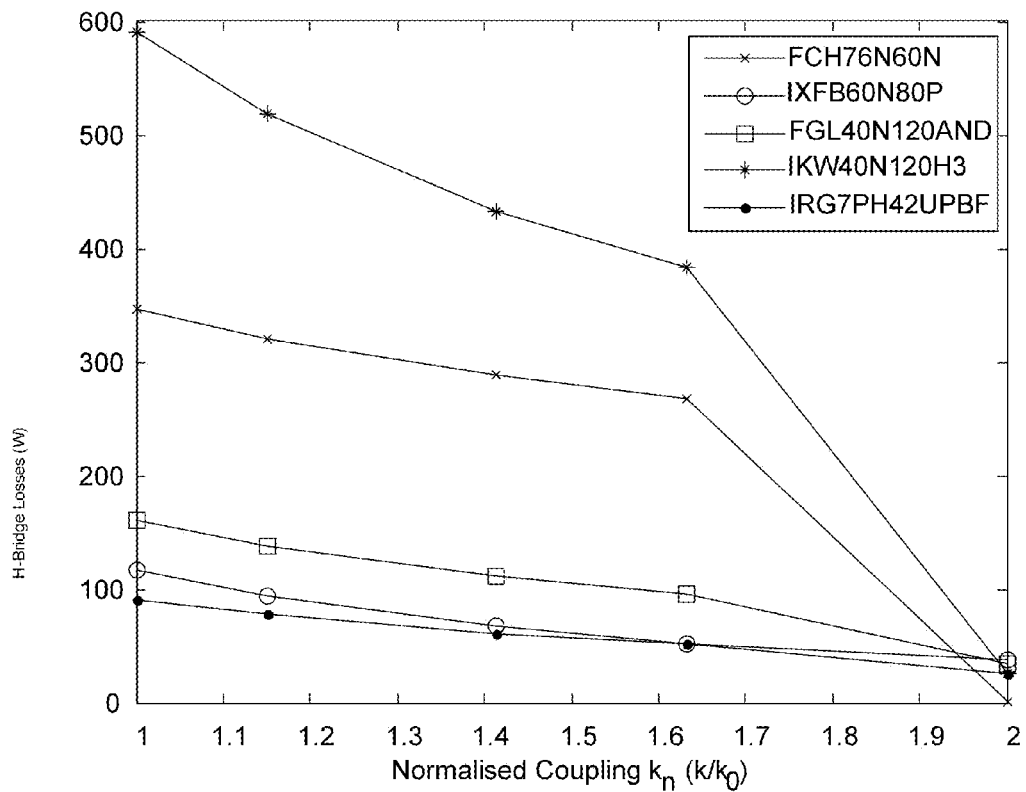
FIG. 6 illustrates comparison of losses for a selection of switches for H-bridge.

To evaluate preferred semiconductor devices, a range of power IGBT and MOSFET semiconductors may be included in a comparison. According to one design criteria, these devices need a breakdown voltage of at least 800 V to be deemed reliable when being hard switched in an H-bridge environment at 400 VDC. In addition, the performance of the system over a wide range of coupling conditions may be simulated to compare the performance because the point of best operation may not result in a reasonable result when the pad height is allowed to vary with a coupling coefficient change of 100%. FIG. 6 shows the losses of the selected power devices over the whole range of coupling conditions. It can be seen that International Rectifier IGBT IRG7PH42UPBF coupled with a very fast external diode (Fairchild RHRG75120) has better performance compared to majority of other devices especially power MOSFETs. Power MOSFETs often suffer from huge diode reverse recovery losses because of the internal body diodes in the MOSFET package. This may be especially true at lower coupling coefficients when the conduction angle is large.

Figure 7:
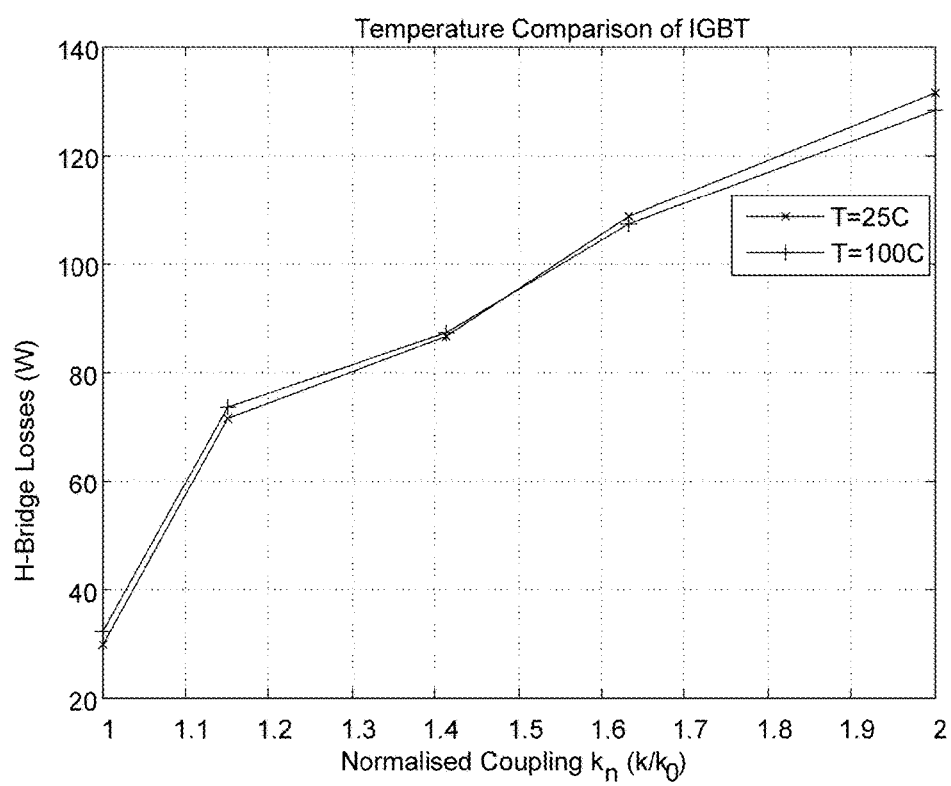
FIG. 7 illustrates the losses in the H-bridge for different temperatures for IRG7PH42UPBF.

The operating characteristics for the IRG7PH42UPBF IGBT at the two temperature extremes are shown in FIG. 7. It can be seen that the losses are much higher at weaker coupling in the H-bridge. In addition, the losses have a weak temperature dependence profile. Here the system's thermal control system, such as a heat sink, must accommodate the maximum power losses point of the graph which corresponds to a coupling of the worst case and a temperature of 100° C.

Any suitable thermal design may be used to control temperatures. Such designs should concentrate on removing substantially all or all heat from switches and/or diodes into suitably sized thermal control systems and/or heat sinks, such as, for example aluminum heat sinks. The heat sinks may be cooled by any suitable method, such as forced convection air cooling. For the primary electronics, the switches may be configured on the bottom of the printed circuit board in some embodiments such that the entire top of the switch housings may be thermally mated to a heat sink below the board. For reasons of electrical isolation, the switch top may be first mated to a heat spreader, such as an alumina heat spreader wafer (e.g. TO-225 footprint product). The wafer may then be mated to the heat sink. Each mated joint may include a ceramic loaded thermal paste, or functional alternative, for a low thermal resistance joint. In embodiments using an aluminum heat sink on the primary, the aluminum heat sink typically has a high thermal capacity and especially high surface area heat sink extrusion (exemplary part numbers include MM60167 available from M&M Metals or equivalent).

On the secondary circuit 318, in one embodiment suitable aluminum heat sinks may include a moderate capacity and surface area extrusion (exemplary part numbers include MM32647 available from M&M metals or equivalent). Both the primary and secondary electronics assemblies may include an air cooling fan directed down the heat sink fin channels. Suitable fans include fans that are 12 volt DC high capacity, low power, low noise designs consuming less than 5 watts. Model number D7025V12 from Sofasco or equivalent may be suitable.

Figure 8:
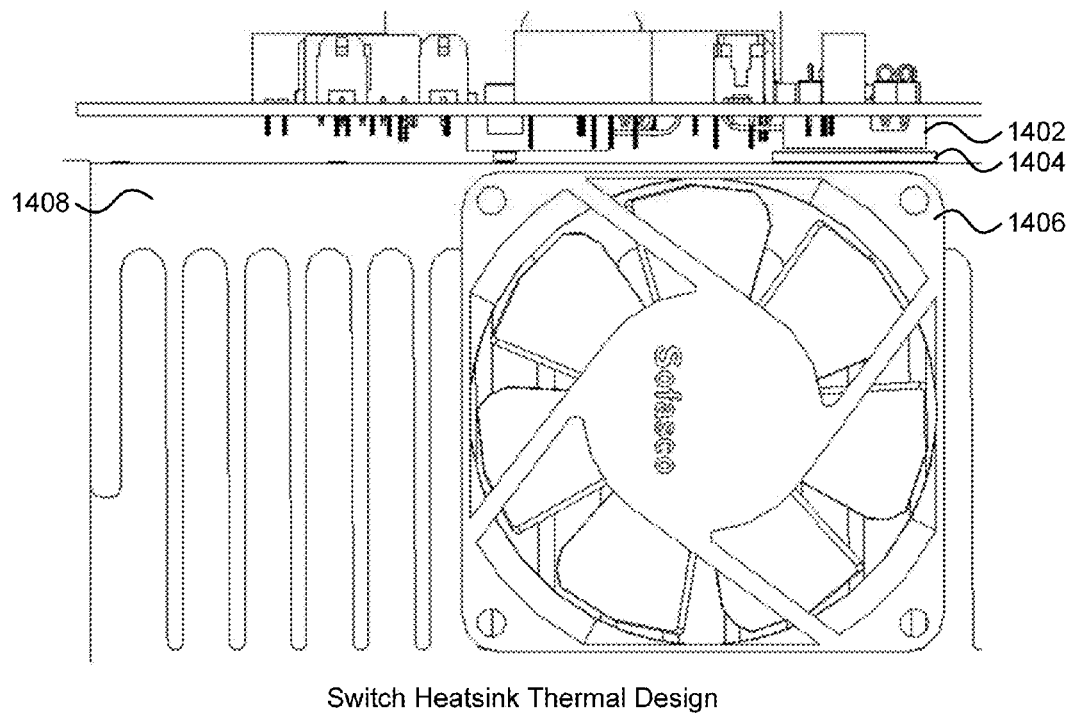
FIG. 8 illustrates an exemplary switch Heatsink Thermal Design.

FIG. 8 illustrates an exemplary thermal configuration for the primary electronics (the secondary configuration may be identical or similar). Thermal analysis indicates that the above-described exemplary design adequately controls the electronic component temperatures. Other suitable designs that control the electronic component temperatures may also be used. At an average power dissipation of 23 watts per switch and external diode, the temperature gradient on the heat sink is predicted to be less than about 0.8° C. and the heat sink temperature averages about 38° C. The case temperatures on the switches are less than about 45° C. and the junction temperatures are predicted to be less than about 85° C. These temperatures tend to promote good electronics performance and long life for the components. Power dissipations in all other electronic components on the primary and secondary printed circuit boards has been kept low and copper trace area designed to be high in the printed circuit board design. As measured with an infrared thermal camera. The temperatures of all other components do not exceed about 60° C.

Figure 9:
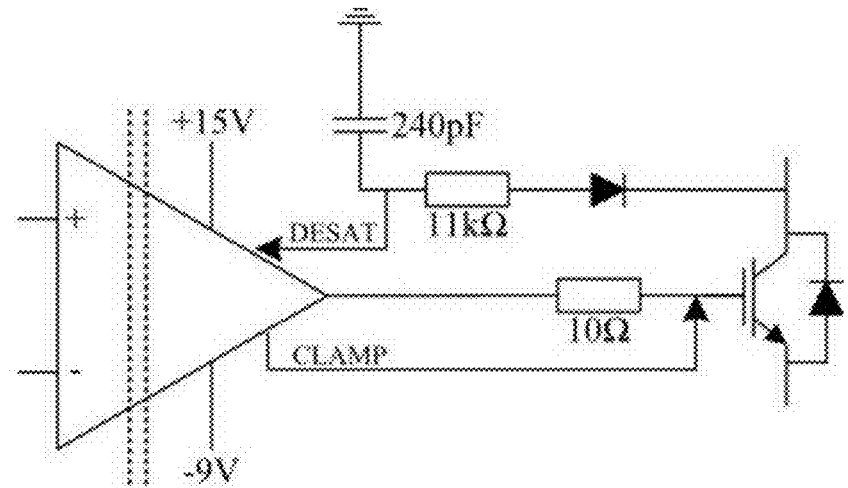
FIG. 9 illustrates an exemplary simplified IGBT Gate Drive Circuit.

Item 1402 Example of a high dissipation component (switch or diode)
Item 1404 Alumina heat spreader wafer
Item 1406 Air cooling fan
Item 1408 Aluminum heat sink B. Switch Gate Drive Circuitry of the Switching Section In some embodiments, each switch (such as International Rectifier IRG7PH42UPBF IGBT) and diode pair (such as Fairchild RHRG75120 diode) in the full-bridge switching configuration is driven with a gate driver, such as an Infineon 1ED020112-F gate driver, as shown in FIG. 9. The gate driver may be fully isolated internally and may be properly isolated in the printed circuit board layout to accommodate creepage and clearance constraints. The gate drive design may include desaturation detection and miller clamp control. Additionally, fast zener clamps and diodes (not pictured) may be used at each of the gate driver's inputs and outputs to improve reliability and safety of the driver under typical conditions.

It should be noted that in some embodiments an important part of driving the full-bridge switch configuration is proper printed circuit board layout. In some embodiments, stray inductances between same legs and between each leg of the full-bridge topology are reduced through circuit board layout design to maintain switching without bouncing the switch inputs. The proper circuit board design mitigates stray inductances to produce a clean and efficient switching waveform.

C. Bridge Inductance of the LCL Tuning Circuit

Figure 10:
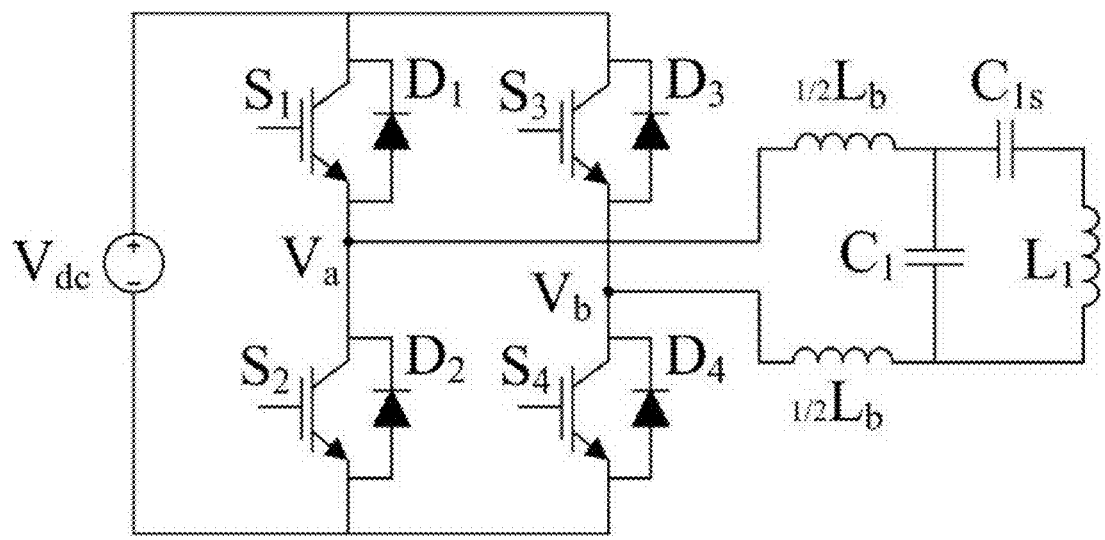
FIG. 10 illustrates an exemplary LCL Converter with Split Inductor Design.

In some embodiments, an aspect of the circuit design built and characterized herein may be that the $L_b$ inductor is implemented in a split arrangement with two inductors, each with the value of $L_b/2$ on either side of the full-bridge switching output as shown in FIG. 10. This may be done to allow for smaller ferrite mass in each inductor and to reduce switching harmonics seen by sensitive measurement IC's. Measurement across the parallel tank capacitance $C_1$ in FIG. 10, may be an important part of real-time characterization of the system. The RMS voltage across $C_1$ may be required, for safety reasons, to be isolated from general control circuitry. Isolated voltage measurement, in some embodiments, may be costly and complex; the frequency and bandwidth of the signal may primarily determine the cost and complexity of such circuitry. By reducing the harmonics and hence the signal bandwidth, the isolated voltage measurement cost and complexity may be significantly reduced.

Figure 11:
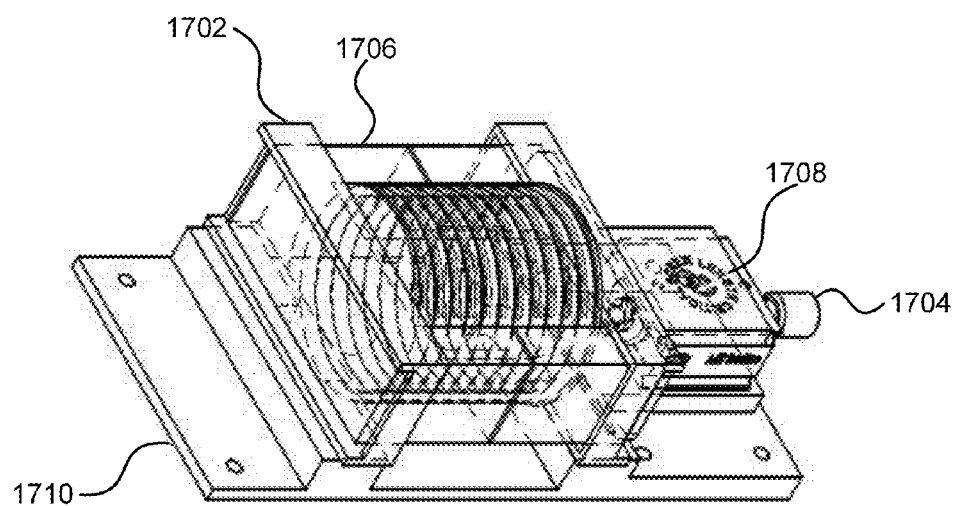
FIG. 11 illustrates an exemplary adjustable Inductor.

In addition, each of these inductors may be configured to have adjustable inductor designs, such as the mechanically tunable inductor design pictured in FIG. 11. In FIG. 11, Item 1 includes a plastic positioning bobbin for the ferrite E pieces. Item 2 is a single axis mechanical stage. Items 3, of which there are two halves, are ferrite E55 cores, for example from Ferroxcube. Item 4 is a bracket connecting the moving portion of the stage to one of the E pieces. Item 5 is an assembly bracket for positioning all of the parts of the assembly. The inductance may be adjusted using a mechanical stage (or other similar translation actuator) (Item 2) that manipulates the air gap between two halves of a ferrite E shaped core arrangement around which litz wire may be coiled. This allows rapid and easy tuning of the LCL resonant tank (LCL tuning circuit) during the production stage of the system because the reactance can be accurately controlled to within about 1% of the desired value by turning and then locking the 80 threads per inch adjustment screw. The application of a finely tunable mechanically adjusted inductor such as disclosed herein to inductive wireless power transfer systems is novel.

Figure 12:
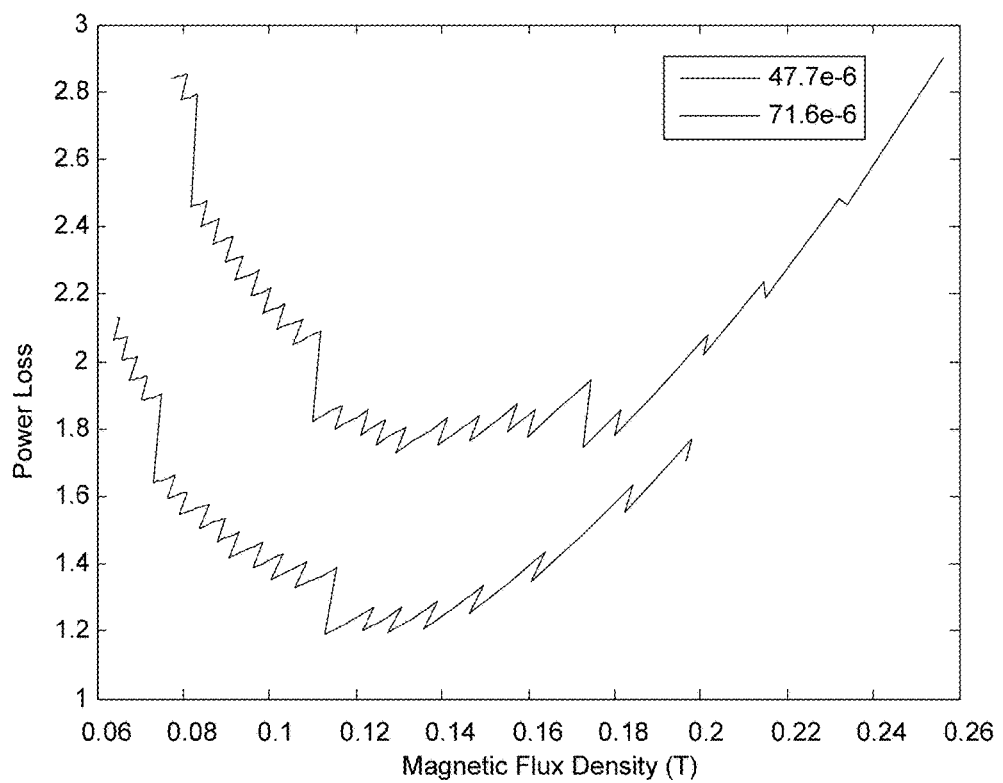
FIG. 12 illustrates an exemplary flux density of AC inductor design for LCL converter using E55 core.

The AC inductor ($L_b$) design process for losses and flux density may involve using the fundamental principle of the balance of magneto motive force. Using this principle, the number of turns, air gap and magnetic flux density can be chosen. FIG. 12 shows the flux density and power losses in the ferrite for different air gaps and number of turns (although not shown, but incorporated). The small step jumps are increments in turns and the larger jumps are 1 mm air gap increments. Thus, by using two inductors the flux density may be kept very low and the design may be easily achieved. In addition, the RMS flux density should be kept far below 0.2 T (because ~0.28 T peak) which is the absolute saturation density of the 3C90 material used.

D. Capacitive Network of the LCL Tuning Circuit

In some embodiments, the capacitive network shown in an LCL converter (as shown in FIG. 10) may include a series compensation capacitor ($C_{1s}$) and a parallel tank capacitor ($C_1$). To determine the capacitances for such a system, the following method may be used:

1. Determine desired operating angular frequency $\omega=2*\pi*f$ where f is the frequency in Hertz.
2. Determine input DC voltage to primary ($V_{dc1}$), desired output voltage ($V_{dc2}$), and desired output current ($I_{dc2}$). Output Power, $P_{out}=V_{dc2}*I_{dc2}$.
3. For a given pad set, determine the coupling coefficient (k) range and nominal air gap between primary and secondary receiver pads 314, 316.

$$k = \sqrt{1 - \frac{(L_1)_s}{(L_1)_o}}$$

where $(L_1)_s$ is the primary receiver pad inductance with the secondary receiver pad 316 shorted at a given height and $(L_1)_o$ is the primary receiver pad inductance with the secondary receiver pad 316 open circuit at a given height. $k_0$ is thus the coupling coefficient k with the pads set at nominal air gap.

4. Determine maximum primary RMS AC Voltage ($V_{ac1}$) where $$V_{ac1} = V_{dc1} * \frac{2\sqrt{2}}{\pi}\sin\left(\frac{\sigma}{2}\right)$$

when $\sigma=180°$. And determine required maximum RMS AC Track Current ($I_{1max}$) using IPT modeling. The desired primary reactance ($X_{1\_des}$) is thus $$X_{1\_des} = \frac{V_{ac1}}{I_{1max}}.$$

5. Determine secondary receiver pad inductance when at the nominal height above primary and primary receiver pad 314 is open circuit ($L_{20}$) and associated reactance ($X_{20}$). $X_{20}=\omega*L_{20}$ where $\omega$ is the angular frequency of the system.

6. Determine open circuit voltage ($V_{oc}$) at maximum height (i.e. $k_{min}$) $V_{oc}=I_{1max}*X_{20}*k_{min}$ (assuming primary and secondary receiver pad inductances are very close to each other) and from that determine the desired secondary reactance $$(X_{2\_des}),\ X_{2\_des} = \frac{V_{oc}}{I_{dc2}}$$

7. For the given secondary resonant circuit (shown in FIG. 23) determine required secondary series compensation capacitance ($C_{2s}$) and secondary parallel tank capacitance ($C_2$) using the following equations $C_{2s}=[\omega*(X_{20}-X_{2\_des})]^{-1}$ and $C_2=[\omega*X_{2\_des}]^{-1}$ 8. Determine the nominal primary receiver pad inductance ($L_{10}$) and reactance ($X_{10}$) with secondary at maximum height and secondary coil shorted in series with the secondary series compensation capacitance $C_{2s}$.

9. For the given primary LCL tuning circuit (shown in FIG. 10) determine required primary series compensation capacitance ($C_{1s}$) and primary parallel tank capacitance ($C_1$) using the following equations $C_{1s}=[\omega*(X_{10}-X_{1\_des})]^{-1}$ and $C_1=[\omega*X_{1\_des}]^{-1}$ 10. The primary bridge inductance ($L_b$) can thus be determined $$L_b = \frac{X_{1\_des}}{\omega}.$$

If the bridge inductance is split between both legs of the inverter, the associated inductance is halved for each inductor.

E. Coil Interaction

In some embodiments, $L_1$, as shown in FIG. 10, is a magnetic pad design used to transfer power to a secondary circuit 318. In a resonant wireless IPT converter, the primary magnetic pad acts as the primary half of a loosely coupled transformer with some amount of self-inductance and mutual inductance. The self-inductance may be used (as shown in II.D.) to tune the circuit; therefore the system, in general, must be fairly tolerant to this change in self-inductance in order to maintain efficiency in resonant power transfer.

III. Magnetics

The IPT systems described herein may include magnetic systems. In some embodiments, any suitable magnetic system may be employed. Such systems are capable of producing and receiving a magnetic field over an air gap. A circular pad topology may be used in systems as described herein. See, e.g., M. Budhia et al, "Design and Optimisation of Circular Magnetic Structures for Lumped Inductive Power Transfer Systems," *IEEE Transactions on Power Electronics*, vol. PP, pp. 1-1, 2011; F. Nakao et al, "Ferrite core couplers for inductive chargers," in *Proceedings of the Power Conversion Conference*, 2002. PCC Osaka 2002., 2002, pp. 850-854 vol. 2; H. H. Wu et al, "A review on inductive charging for electric vehicles," in *IEEE International Electric Machines & Drives Conference* ("*IEMDC*"), 2011, 2011, pp. 143-147; H. H. Wu et al., "A 1 kW inductive charging system using AC processing pickups," in *6th IEEE Conference on Industrial Electronics and Applications* ("*ICIEA*"), 2011 2011, pp. 1999-2004; H. Chang-Yu et al, "LCL pick-up circulating current controller for inductive power transfer systems," in *IEEE Energy Conversion Congress and Exposition* ("*ECCE*"), 2010 2010, pp. 640-646.

In addition to circular designs, other pad designs may be employed, such as the pad design described in U.S. Provisional Application No. 61/544,957, filed Oct. 7, 2011, the entirety of which is incorporated herein by reference. Other pad designs include polarized pad designs such as those described in M. Budhia et al, "A new IPT magnetic coupler for electric vehicle charging systems," in *36th Annual Conference on IEEE Industrial Electronics Society, IECON 2010*, 2010, pp. 2487-2492; M. Budhia et al, "Development and evaluation of single sided flux couplers for contactless electric vehicle charging," in *IEEE Energy Conversion Congress and Expo* ("*ECCE*"), 2011, 2011, pp. 614-621; M. Chigira et al, "Small-Size Light-Weight Transformer with New Core Structure for Contactless Electric Vehicle Power Transfer System," in *IEEE Energy Conversion Congress and Expo* ("*ECCE*"), 2011, 2011, pp. 260-266; H. Jin et al, "Characterization of novel Inductive Power Transfer Systems for On-Line Electric Vehicles," in *Twenty-Sixth Annual IEEE Applied Power Electronics Conference and Exposition* ("*APEC*"), 2011, 2011, pp. 1975-1979; Y. Nagatsuka et al, "Compact contactless power transfer system for electric vehicles," in *International Power Electronics Conference* ("*IPEC*"), 2010 2010, pp. 807-813.

The primary and secondary circuits may use the same or different pads. In some embodiments, the same pad design may be used on both the primary circuits (e.g., $L_1$ in FIG. 10) and secondary circuits (e.g., $L_2$ in FIG. 23).

Figure 13:
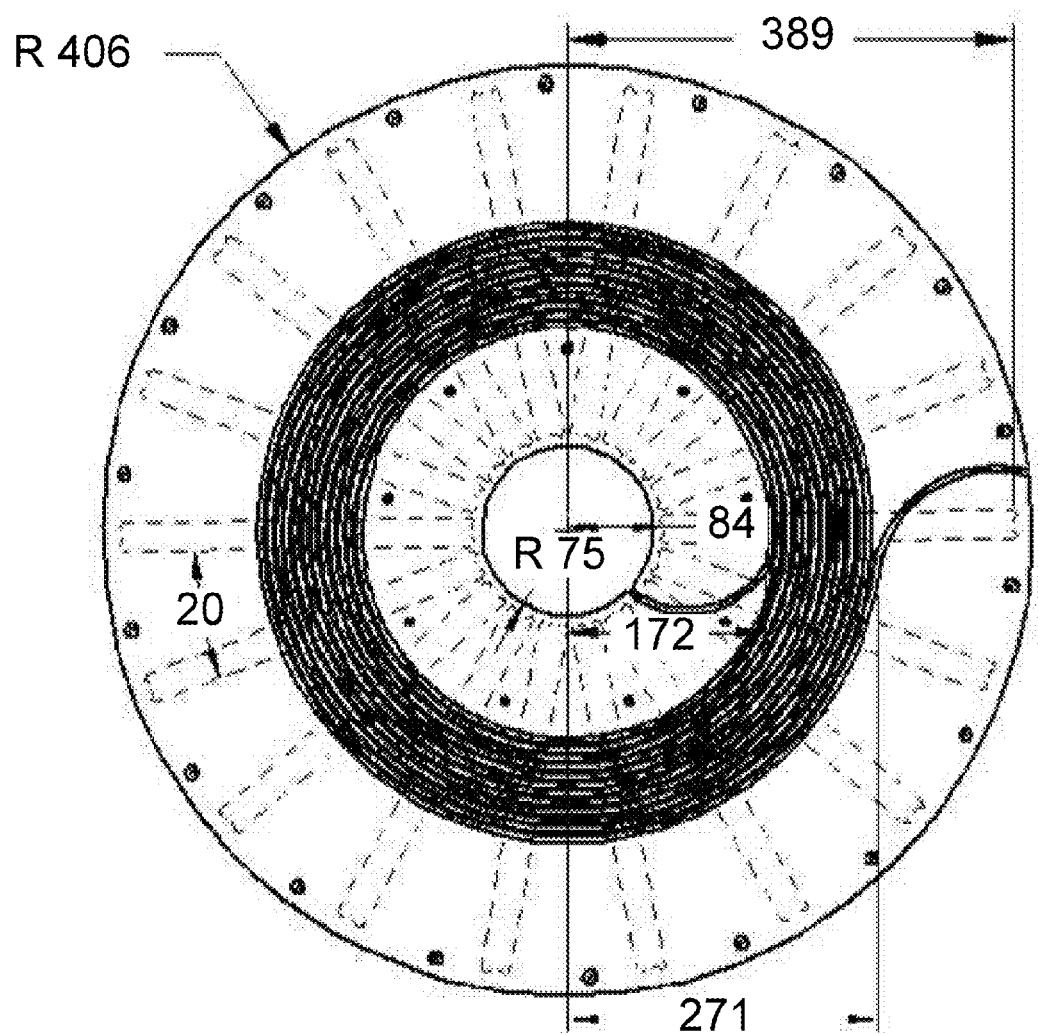
FIG. 13 illustrates an exemplary circular pad structure and dimension (Top View)
Figure 16:
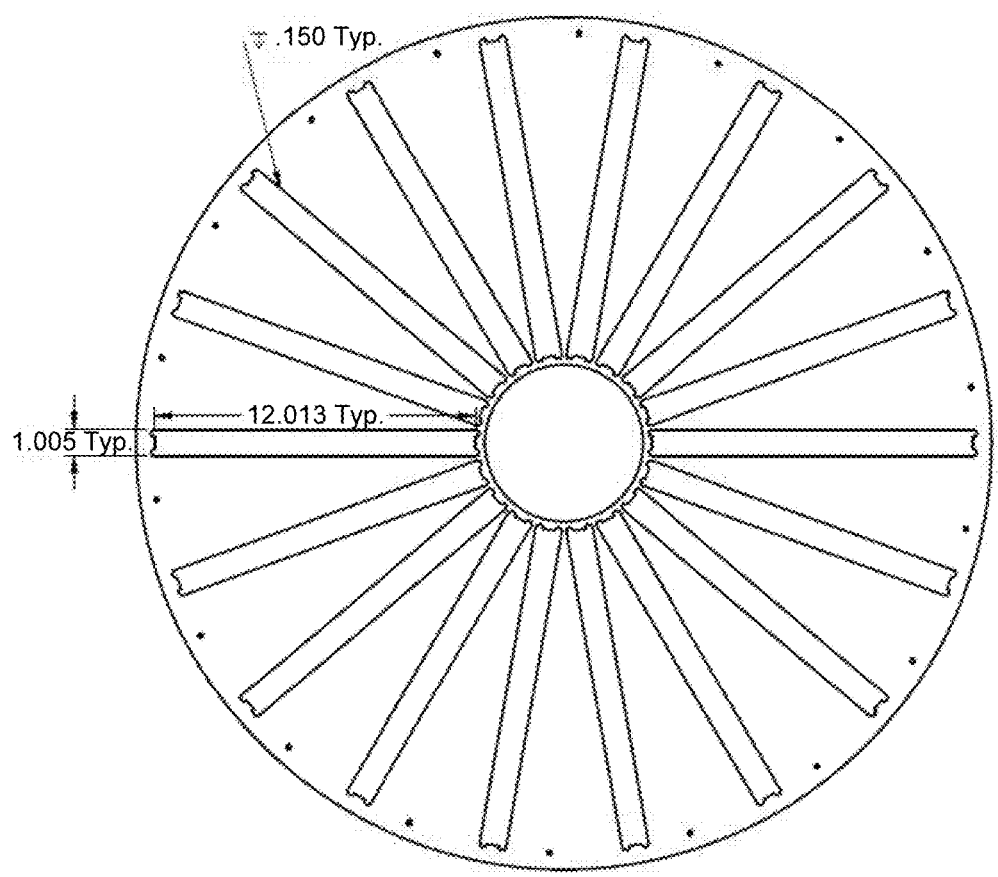
FIG. 16 illustrates the dimensions and configuration of exemplary an ferrite arm support structure.

In vehicular applications, the vehicles width may limit the width of the pad. In addition, to meet magnetic field safety standards and for ease of installation, the size of the pad is preferably much smaller than the width of the vehicle. The pad size may vary in diameter depending on the constraints of the application to be used (e.g., vehicular, industrial, etc.). Pad diameters may include from about 150 mm to 1500 mm, such as 150 mm to 305 mm, 305 to 610 mm, or 610 mm to 1500 mm. For example, in some embodiments, an 813 mm diameter circular pad design (32 inches) with dimensions as illustrated in FIG. 13 and FIG. 16 may be used.

The ferrite bar length, the bar position, and the inner and outer coil radius may follow the design optimization outlined in M. Budhia et al, "Design and Optimisation of Circular Magnetic Structures for Lumped Inductive Power Transfer Systems," *IEEE Transactions on Power Electronics*, vol. PP, pp. 1-1, 2011. The receiver and transmitter pads may be different or identical in structure.

For example, in some embodiments, each long ferrite leg may be composed of 3 linear I cores (OR49925IC) with dimensions of about 101×25×25 mm. The winding, in one embodiment, are composed of about 1300 strands of AWG36 Litz wire. It should be noted that the volume of ferrite bars used is overrated for magnetic flux density saturation purposes and that this pad may transfer up to 10 kW of power at 20 kHz if a larger power converter is used. Each pad weighs about 20.4 kg (45 lbs).

The design principles for choosing the number of ferrite legs and the position and area of the coils are decided in the circular pad design optimization. M. Budhia et al, "Design and Optimisation of Circular Magnetic Structures for Lumped Inductive Power Transfer Systems," *IEEE Transactions on Power Electronics*, vol. PP, pp. 1-1, 2011.

The coil coverage area is typically located in the middle of the ferrite legs and the area, in one embodiment, should be about 40% of leg length. The number of turns may be controlled by the designer for the amp turns required for the particular application. For example, the design example disclosed herein uses 12 turns of litz wire on each of the primary and secondary receiver pads 314, 316.

Figure 14:
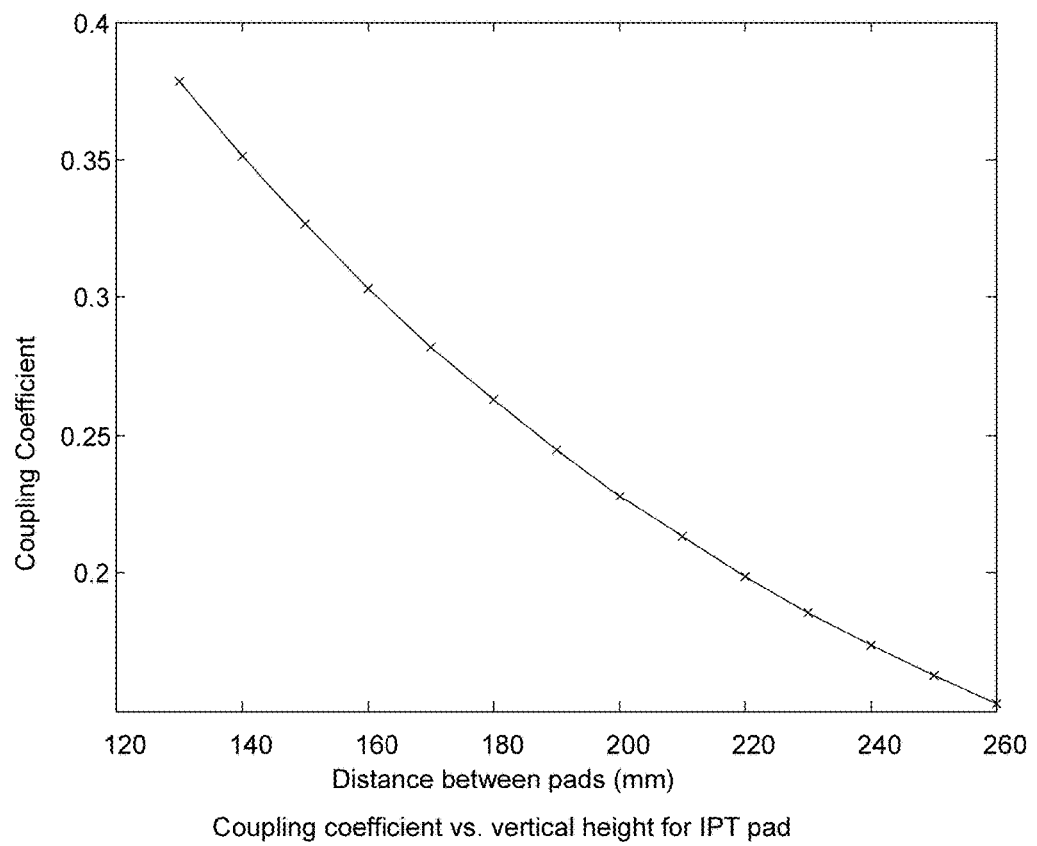
FIG. 14 illustrates coupling coefficient vs. vertical height for an exemplary IPT pad.
Figure 15:
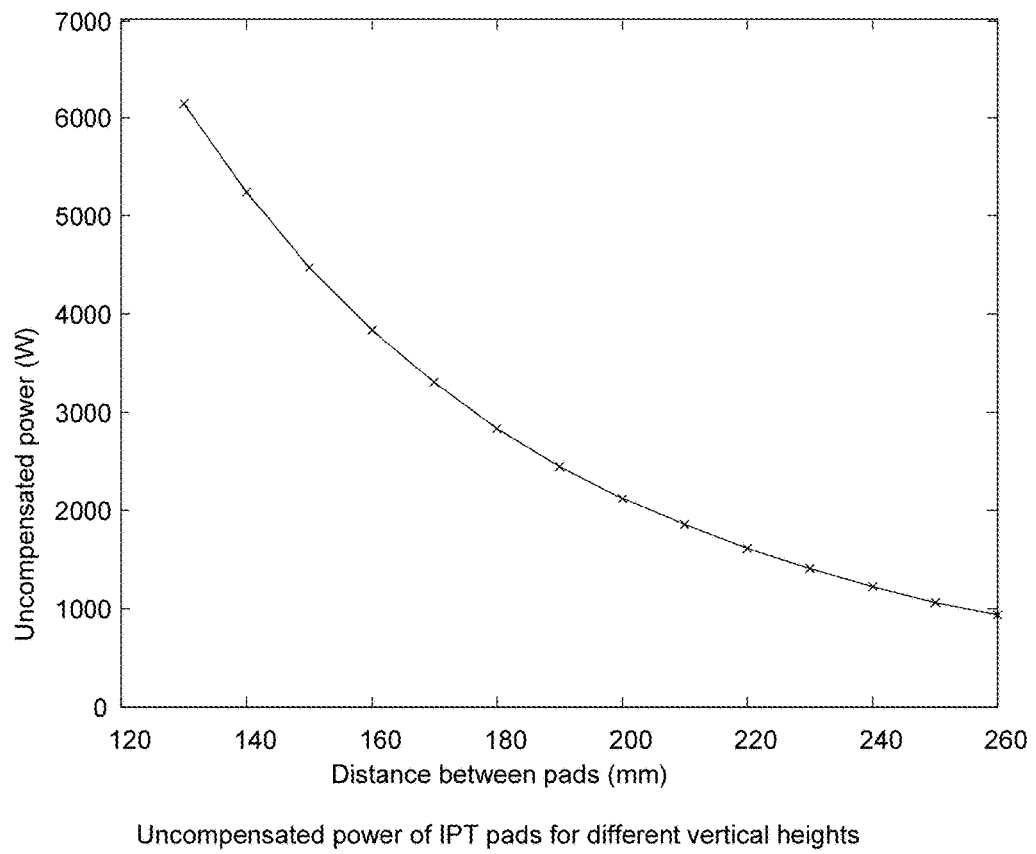
FIG. 15 illustrates uncompensated power of exemplary IPT pads for different vertical heights.

To model how an exemplary pad will behave under different vertical heights, the coupling coefficient vs. height is shown in FIG. 14. In addition, the coupling coefficient data and the primary track current of 40 A is used to predict the highest possible uncompensated power ("SU"), achievable under variations in height. Usually an uncompensated power of above 1 kW is sufficient to guarantee the 5 kW power transfer in a resonant converter assuming that $Q_2$ of 5. This illustrates that the highest operating point achievable for the exemplary pad in FIG. 14 is around 260 mm (10.3"). The uncompensated power is proportional to the coupling coefficient squared. See FIG. 15.

The pad structural design may comprise an all plastic structure that fits around from about 3 to 100 ferrite arms, such as about 18 ferrite arms, in a two part clam shell like configuration. In some embodiments, about three ferrite bars, such as those available from Magnetics Inc., part number 0R49925IC, go into each of the 18 ferrite arms. Any suitable material that does not affect the magnetic performance may be used to fabricate the design. In some embodiments, the clam shell halves are about 0.375 inch thick and the channels cut to accept the ferrite arms are 0.150 inch deep on each half as depicted in FIG. 16. However, these parameters may be adjusted to varying thicknesses and depths depending on the total diameter of the pad and the system capabilities needed for the specific IPT application.

Figure 17:
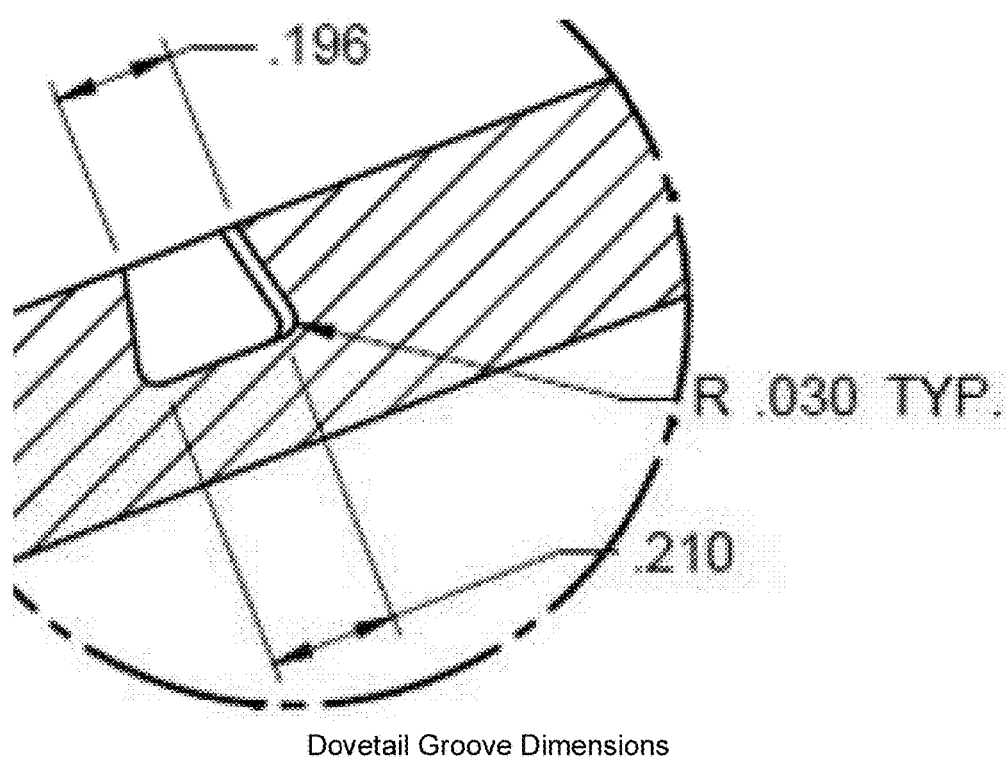
FIG. 17 illustrates exemplary dove tail groove dimensions.

In some embodiments, the fit to the ferrite bar dimensions is nominal to slight clearance fit which can help to hold the bars rigidly and tightly. Suitable adhesive and/or fasteners may also be used to secure the ferrite bars and/or litz wire. In one embodiment, the corners of the channels are radiused as shown in FIG. 17 to allow tool access and aid in assembling or disassembling the bars. On the top portion of one of the two clamshell halves a dove tail groove is included and traverses the desired spiral foot print for positioning of the litz wire. The groove dimensions for one embodiment are depicted in FIG. 17. The application of a capturing dove tail groove to litz wire positioning in inductive wireless power transfer systems is novel and provides advantages. For the depicted embodiment, at assembly placing the litz wire is facilitated since it snaps into place. Further the litz wire may be positioned very accurately (for example +/−0.05 mm or +/−0.025 mm). The accurate positioning helps the magnetic performance of the as built pads to correspond with the analytically modeled magnetic performance. Because of the accurate positioning, the expectations of litz wire length are also accurate. Thus the coil inductance, coil resistance, and other coil electrical parameters are held to a tight tolerance improving performance and efficiency of the system.

In one embodiment, the spiral footprint comprises about 12 evenly growing radius turns of the groove in FIG. 17. It may start with a radius of about 7.0 inches and ends with a radius of about 10.7 inches. However, the radii and number of turns may be adjusted depending on the system needs and target application.

For an example system, typical core losses for the chosen ferrite material are about 696 mW/cm$^3$ at 100 kHz, 200 mT of field and 100° C. The ferrite may be a manganese zinc material and equivalent material and shapes may be procured from various ferrite manufacturers.

In some embodiments, the litz wire that is placed in the spiral groove includes enough length for a twisted pair lead wire going to each pad assembly described. The wire in the dove tail grooves has only nylon serving and the enamel applied to the individual strands. For lead section up to the plastic pad each part of the twisted pair may be wrapped in two layers of Kynar heat shrink insulation (FIT-225 or equivalent). The twisted pair may then be wrapped in a layer of Halar braided tube overwrap protection. Suitable litz wire may include litz wire comprising 1300 strands of 38 gauge copper wire twisted/braided per specification 1300/38S80DN (HM Wire) or equivalent.

IV. Primary Controller

The IPT systems described here may include a primary controller 308, which has both hardware and software associated therewith.

A. Hardware

Any suitable primary controller may be used to control the resonant switching waveform. In some embodiments, a Field Programmable Gate Array ("FPGA") development board using a Xilinx Spartan 3AN FPGA may be used to develop a primary track current controller. A custom wireless communication card may also be added to the development board to accommodate a custom application communication protocol over a wireless protocol layer, such as the standard 802.15.4 wireless protocol layer. The FPGA development platform typically allows for extreme flexibility in an initial IPT system. Additional, more cost effective solutions exist and will typically allow much finer control over the entire system at much higher data throughput rates. One such alternative embodiment for a controller is the use of a Digital Signal Controller ("DSC") or Digital Signal Processor ("DSP") such as the Freescale MC56F84xx or series DSC.

B. Software

1. Overview

In embodiments employing an FPGA, the internal firmware development may be done in a Hardware Design Language ("HDL"). In embodiments employing a DSC or a DSP, the internal firmware development may be done in software coding languages such as C or C++. Such firmware may be broken in to subsections, for example six different subsections. The subsections may include, for example, a Processor subsection, a Communications subsection, an Analog to Digital Converter ("ADC") subsection, an LED Display subsection, a Switch Control subsection, and a Switch Fault and Ready Filter subsection.

Beyond these firmware subsections, additional software may be added as an application layer to the processor subsection and may be done in any suitable language, such as the C or C++ language. Interaction such as manual control and data-logging may be handled independently by any suitable user interface, such as a Graphical User Interface ("GUI") on a PC over a wireless interface. The manual control and interaction may be optional but assists in producing data-rich analysis of the system.

a. Processor

The processor subsection may comprise a processor, such as a 32-bit processor, running at a clock frequency of from about 30 MHz-100 MHz and may require data and program memory. Other suitable processors may be 64-bit or may have a different clock speed or may have single or multiple cores. The primary clock may be adjusted with an external Phase Locked Loop ("PLL") but due to the important nature of the frequency in some embodiments, an HDL block may perform clock timing verification and hold the processor (and all other subsections) in reset (thus preventing power transfer) until timing can be fully verified against a known reference clock signal. The processor subsection, in one embodiment, is fully in charge of the application layer of software. It accepts current and voltage measurements throughout the LCL converter and directly determines the phase angle and hence the primary track current (as described in IV.B.1.e below). Additionally, the processor may be configured to control communications, perform reporting, and implement manual control commands issued by an operator if desired.

b. Communications

The communication subsection, in one embodiment, is configured to translate high-level data transmission into low-level bit encoding required by the wireless communication chips. The communication subsection may ensure proper transmission and reception of wireless data.

c. Analog to Digital Converter ("ADC")

The ADC subsection, in one embodiment, is configured to automatically communicate with external ADC integrated circuits, filter the data, and periodically report critical measurement parameters to the processor subsection.

d. LED Display

The light emitting diode ("LED") display subsection is configured to reduce processor loading by handling visual status reporting. It reads the status of each subsection automatically and, in one embodiment, immediately visually reports any problems that may occur as well as power level status information. The LED display subsection may directly control a set of RGB colored LED's on the FPGA development board.

e. Switch Control

The switch control subsection, in one embodiment, is configured to translate desired phase from the processor to correct waveform control on each full-bridge switch. This subsection requires a clock running faster than the other subsections, such as at 100 MHz-500 MHz (allowing for a direct low-latency control resolution). Because this subsection runs on a separate clock, the HDL may handle the asynchronous issues between clock domains elegantly so as to prevent any potential metastability issues from damaging the system.

Figure 18:
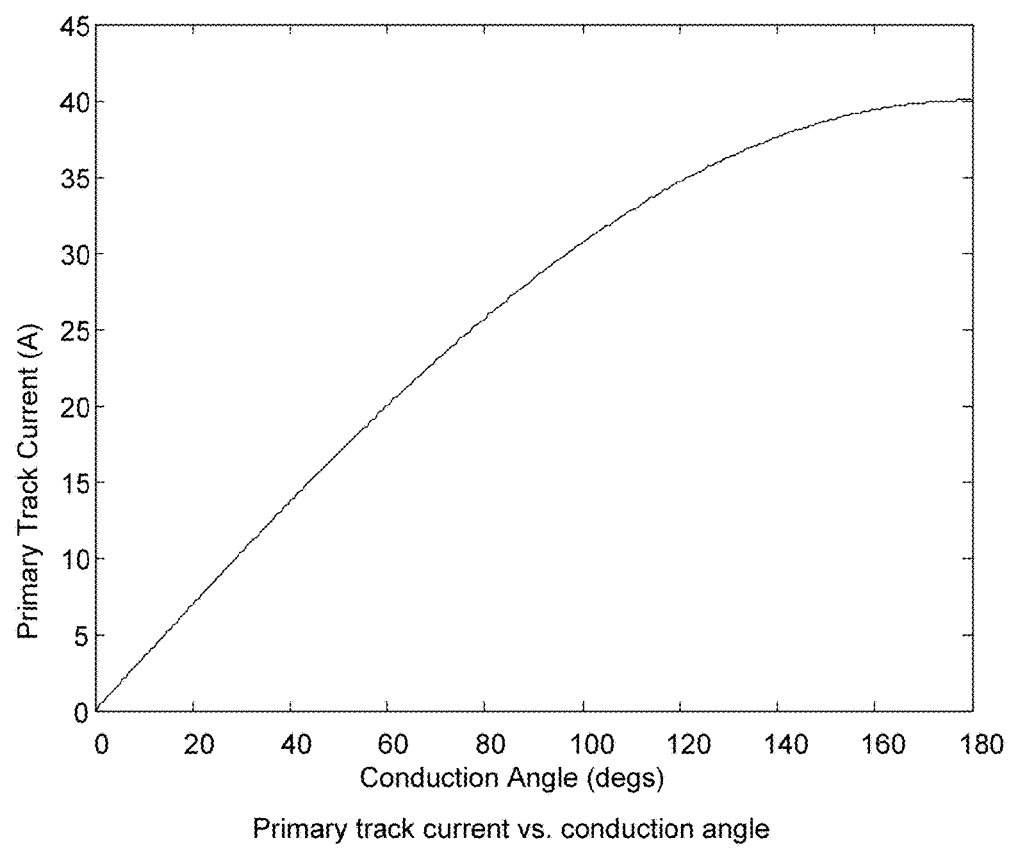
FIG. 18 illustrates primary track current vs. conduction angle.

Symmetric Voltage Cancellation ("SVC") or phase shift ("PS") control may be employed as a method for switch control because of its wide acceptability when using LCL converters. When the conduction angle is varied from 0-180°, the change in primary current is shown in FIG. 18. FIG. 18 shows that the primary track current can be fully controlled from zero up to 40 A. Other embodiments include the use of Asymmetric Voltage Cancellation ("AVC") as described in U.S. patent application Ser. No. 13/642,925, filed Oct. 23, 2012, the entire disclosure of which is herein incorporated by reference in its entirety.

f. Switch Fault and Ready Filter

The switch fault and ready filter subsection is configured to primarily filter false fault and ready signals from the gate drive circuitry. Due to the electrically noisy environment of a switching inverter, digital signal reporting from the high power circuitry can often bounce causing false signals. This subsection digitally filters and debounces the input signals so as to ensure the readings are correct.

2. Dual Side Control and Optimal Efficiency

Figure 1:
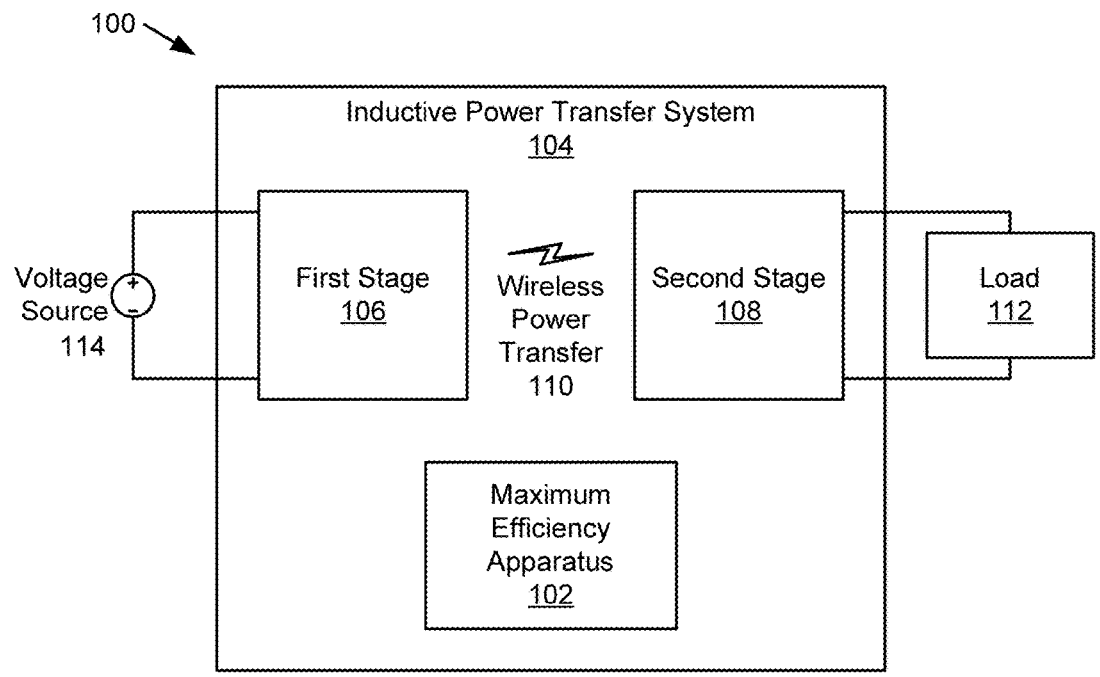
FIG. 1 is a schematic block diagram illustrating one embodiment of a system for maximizing efficiency in an inductive power transfer ("IPT") system.

FIG. 1 is a schematic block diagram illustrating one embodiment of a system 100 for maximizing efficiency in an IPT system. The system 100 includes a maximum efficiency apparatus 102 within an IPT system 104. The IPT system 104 also includes a first stage 106, a second stage 108, wireless power transfer 110 between the first stage 106 and second stage 108. The system 100 includes a load 112 and a voltage source 114. The elements of the system 100 are described below.

The system 100 includes a maximum efficiency apparatus 102 that measures at least voltage and current of the IPT system and iterates to find a maximum efficiency of the IPT system 104 and then adjusts parameters of the first stage 106 and second stage 108 to achieve a higher efficiency. The maximum efficiency apparatus 102 is explained in more detail with regard to the apparatus 200 of FIG. 2 as well as in the subsequent description.

The system 100 includes an IPT system 104. The IPT system 104 transfers power wirelessly 110 from a first stage 106 to a second stage 108. The IPT system 104 may power a vehicle, a battery in an electronic device, or other device that may benefit from wireless power transfer. The IPT system 104 may include various topologies and includes any configuration where efficiency can be measured and where parameters can be manipulated to achieve a higher efficiency. In one embodiment, the first stage 106 transmits energy wirelessly and the second stage 108 receives the wirelessly transferred energy and controls energy transfer to one or more loads 112 via an output bus.

The first stage 106 receives power from a voltage source 114. In one embodiment, the voltage source 114 is a DC voltage source and the first stage 106 receives DC voltage as an input. In another embodiment, the voltage source 114 is an AC voltage source. The first stage 106, in one embodiment, uses AC voltage as an input. In another embodiment, the first stage 106 includes a rectifier stage that rectifies AC voltage to provide DC voltage to another stage in the first stage 106. The voltage source 114 may be from a utility power grid, from a generator, a battery, a fuel cell, or other power source known to those in the art.

The first stage 106, in various embodiments, includes one or more switching power converters or inverters suitable for transmitting power wirelessly. For example, the first stage 106 may include a resonant inverter, resonant converter, or other topology useful for wireless power transfer in an IPT system 104. In one embodiment, the first stage 106 includes a square wave inverter connected to a resonant network. For example, the square wave inverter may be an H-bridge inverter as describe above in relation to FIG. 5. In other embodiments, the first stage 106 may include a full-bridge, a half-bridge, a push-pull or other type of switching power converter that excites a resonant network. The resonant network may include a combination of capacitors, inductors, or other components known in the art. The first stage 106 may include an inverter or converter followed by a resonant network ("RN") followed by a load. The converter/RN/load may be of a variety of combinations, such as voltage source-RN-voltage sink, voltage source-RN-current sink, current source-RN-voltage sink, or current source-RN-current sink.

The resonant network typically includes two or more reactive components, such and inductors and capacitors. The reactive components may be in various series and parallel configurations depnending upon the type of converter/inverter and the type of load. A resonant network may be of a two-element type, a three-element type, or other higher order configuration. One of skill in the art will recognize other configurations suitable for wirelessly transmitting power in an IPT system 104.

In one embodiment, the first stage 106 includes an LCL load resonant converter. The LCL load resonant converter may include the topology described above in relation to FIG. 5. In one embodiment, the first stage 106 also includes a primary receiver pad 314 that serve as a load to the LCL load resonsant converter. In one embodiment, the primary receiver pad 314 is as described above in relation to FIG. 13 to FIG. 17.

The system 100 includes a second stage 108 that provides power to a load 112. In one embodiment, the second stage 108 includes a secondary resonant circuit, a secondary rectification circuit, and a secondary decoupling circuit. The secondary resonant network may include a secondary receiver pad 316 such as described in relation to FIG. 13 to FIG. 17. The secondary resonant network may also include other reactive components, such as inductors and capacitors. The reactive components may be in various series and parallel configurations. In one embodiment, the secondary resonant circuit may be configured as described in relation to FIG. 23.

The second stage 108, in one embodiment, includes a secondary rectification circuit. The secondary rectification circuit rectifies an AC voltage from the secondary resonant circuit. The secondary rectification circuit may be a full bridge rectifier, at half bridge rectifier, or other rectification circuit known to those of skill in the art. The second stage 108 includes a secondary decoupling circuit. The secondary decoupling circuit helps to decouple the load 112 from the secondary rectification circuit and secondary resonant network. In one embodiment, the secondary decoupling circuit is a secondary decoupling converter. The secondary decoupling converter may be a switching power converter, such as a boost converter, a buck converter, or other topology. The secondary decoupling converter may convert a DC voltage from the secondary rectification circuit to another form useful for the load 112. For example, if the load 112 requires a DC voltage, the secondary decoupling converter may be a DC to DC converter.

In one embodiment, the load 112 includes an energy storage element. The energy storage element may be a battery, a capacitor, or other element capable of storing energy. The load 112 may also include additional loads in addition to the energy storage element. For example, a load 112 may be an electric vehicle drive system. The battery may provide power to the electric vehicle drive system. In one embodiment, the second stage 108 and the load 112 are within a vehicle. For example, the first stage 106 may wirelessly transfer power to the second stage 108 when the vehicle aligns the secondary receiver pad 316 in the second stage 108 with the primary receiver pad 314 in the first stage 106. The IPT system 104 may include multiple first stages 106 at locations where a vehicle with the second stage 108 and load 112 will travel and stop.

Figure 2:
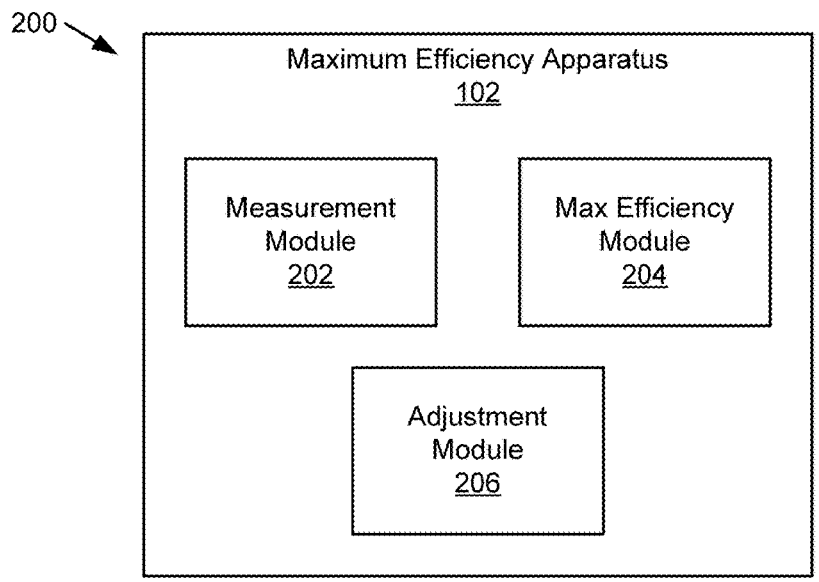
FIG. 2 is a schematic block diagram illustrating one embodiment of an apparatus for maximizing efficiency in an IPT system.

FIG. 2 is a schematic block diagram illustrating one embodiment of an apparatus 200 for maximizing efficiency in an IPT system 104. The apparatus 200 includes one embodiment of a maximum efficiency apparatus 102 with a measurement module 202, a max efficiency module 204, and an adjustment module 206, which are described below.

The apparatus 200 includes a measurement module 202 that measures a voltage and a current of the IPT system 104. The voltage may be an output voltage and/or an input voltage. For example, the measurement module 202 may measure an output voltage on the output bus of the second stage 108 that feeds the load 112. In another embodiment, the measurement module 202 measures an input voltage to the IPT system 104, for example, at the input where the voltage source 114 connects to the first stage 106. The measurement module 202 also measures current. For example, the measurement module 202 may measure an output current/or and an input current. The measurement module 202, in one embodiment, measures the output current at the output bus of the second stage 108. In another embodiment, the measurement module 202 measures the input current measured at an input of the IPT system 104, such as current from the voltage source 114 to the first stage 106.

In another embodiment, the measurement module 202 measures a voltage and/or a current internal to the first stage 106 or second stage 108. For example, the measurement module 202 may measure voltage and/or current between a rectification stage and a converter stage of the first stage 106. The voltage and current measurements may be useful in determining an amount of power transferred to the load 112, a steady-state resistance of the load 112, in put power to the IPT system 104, etc. The measured voltage and current may be useful in evaluating efficiency of the IPT system 104 and iterating to a maximum efficiency. The measured voltage and/or current may be used in equations used in calculating efficiency.

The apparatus 200 includes a max efficiency module 204 that determines a maximum efficiency for the IPT system 104. In one embodiment, the max efficiency module 204 determines a maximum efficiency for the first stage 106 and the second stage 108. The max efficiency module 204 uses parameters of the IPT system 104 along with the measurements of the measurement module 202 to iterate to a maximum efficiency of the IPT system 104. The maximum efficiency determined by the max efficiency module 204 may be based on a particular load 112, a particular amount of power generated by the IPT system 104, an amount of power input to the IPT system 104, etc. The max efficiency module 204 may also use other measurements available within the IPT system 104 to determine a maximum efficiency.

The max efficiency module 204, in one embodiment, determines the maximum efficiency by iterating using one or more variables. For example, the max efficiency module 204 may vary one or more variables over a particular range to determine a maximum efficiency. Some of the variables that the max efficiency module 204 may use are conduction angle of the first stage 106, duty cycle of the second stage 108, size of a gap where the IPT system 104 transfers power wirelessly across the gap, misalignment of the primary receiver pad 314 and the secondary receiver pad 316, power transferred to the one or more loads 112, and a quality factor. One of skill in the art will recognize other variables that the max efficiency module 204 may vary to determine a maximum efficiency of the IPT system 104.

In one embodiment, the max efficiency module 204 determines the maximum efficiency using a model of various elements within the first stage 106 and second stage 108 of the IPT system 104. The max efficiency module 204 may include equations that approximate operation of the various elements within the IPT system 104. Equations for a particular topology of the IPT system 104 are included below, but one of skill in the art will recognize other equations applicable to other topologies suitable for an IPT system 104 that transfers power wirelessly from the first stage 106 to the second stage 108.

The apparatus 200 includes an adjustment module 206 that adjusts one or more parameters in the IPT system 104 consistent with the maximum efficiency calculated by the max efficiency module 204. For example, the adjustment module 206 may adjusts one or more parameters in the IPT system 104 to get the IPT system 104 to an operating condition that matches an operating condition determined by the max efficiency module 204 to correspond to the maximum efficiency determined by the max efficiency module 204.

In one embodiment, the one or more parameters adjusted by the adjustment module 206 include a duty cycle reference that adjusts a duty cycle of the second stage 108 and a conduction angle reference that adjusts conduction angle of the first stage 106. For example, where the first stage 106 includes a resonant converter, a common method of controlling the resonant converter is adjusting a conduction angle. Where the second stage 108 includes a secondary coupling converter, such as a boost converter, common method of controlling the converter is to adjust the duty cycle. A control system controlling the resonant converter may include a reference. A typical control system uses feedback to measure a parameter such as current or voltage and then uses an error signal based on error with respect to a reference to adjust a control parameter, such as conduction angle or duty cycle. Adjusting the conduction angle for a resonant converter may adjust the resonant converter to a different operating point. In addition, adjusting the duty cycle of the secondary decoupling converter may change the operating point of the second stage 108. Typically, the conduction angle for the resonant converter of the first stage 106 and the duty cycle of the secondary decoupling converter of the second stage 108 may be adjusted independently. Adjusting the conduction angle and duty cycle independently may provide a greater flexibility in adjusting the IPT system 104 toward the maximum efficiency calculated by the max efficiency module 204.

Typically, a control loop that adjusts duty cycle for the secondary decoupling circuit in the second stage 108 is a control loop that is relatively fast. Likewise, a control loop that adjusts conduction angle for the resonant converter of the first stage 106 is relatively fast. In one embodiment, where the adjustment module 206 adjusts the duty cycle reference and/or the conduction angle reference, the adjustment module 206 operates as part of an outer loop. In one embodiment, the outer loop is slower than an inner control loop that controls duty cycle for the second stage 108 and an inner control loop that controls conduction angle for the first stage 106. For example, the inner loops may adjust duty cycle and conduction angle on a millisecond or microsecond basis where the outer loop may just the conduction angle reference and the duty cycle reference on a minute or a second basis.

In some embodiments, at least one desirable aspect of the inductive charging systems as described herein is the ability to control the power (or current) used to charge the on-board battery 326. By grouping the formulas (2) and (21), it can be seen from the following formula (5) that the power delivered to the battery 326 is dependent on both control variables duty cycle ("D") and conduction angle ("σ"), which are more conventionally known as decoupling and primary track current control. See G. A. Covic et al, "Self tuning pick-ups for inductive power transfer," in *IEEE Power Electronics Specialists Conference*, 2008. PESC 2008., 2008, pp. 3489-3494; P. Si et al, "Wireless Power Supply for Implantable Biomedical Device Based on Primary Input Voltage Regulation," in *2nd IEEE Conference on Industrial Electronics and Applications*, 2007. ICIEA 2007., 2007, pp. 235-239.

Several ways have been proposed in the past to implement a control algorithm. One possible option is to use primary track current control by itself. See G. B. Joung et al, "An energy transmission system for an artificial heart using leakage inductance compensation of transcutaneous transformer," *IEEE Transactions on Power Electronics*, vol. 13, pp. 1013-1022, November 1998 1998; P. Si et al, "A Frequency Control Method for Regulating Wireless Power to Implantable Devices," *IEEE Transactions on Biomedical Circuits and Systems*, vol. 2, pp. 22-29, March 2008 2008. Another more recent development is to control the primary track current via σ when M varies. Duty cycle control is used against load resistance changes. In essence, $I_1$ is controlled so that it is inversely proportional to M governed by (20) to keep $V_{oc}$ fixed, and D is used to control power output due to load changes by (5). This type of approach will be referred to as secondary decoupling control. However, both of these methods, though they may be implemented In some embodiments, are non-optimal control strategies for obtaining the highest overall system efficiency. In this system according to the embodiments described herein, a new dual side control strategy is used to achieve the highest efficiency for the system with load and coupling variations.

The efficiency analysis approach used in some embodiments described herein breaks the system into separate sections and analyzes the efficiency of each section individually. One assumption of the efficiency analysis is that only conduction losses are considered, because the switching losses of the H-bridge on the LCL converter vary in a very complex nature. Even under pure, real, reflected resistance conditions, one leg may operate with relatively high diode reverse recovery losses (capacitive switching) and the other leg may operate with conventional hard characteristics (inductive switching). See, e.g., H. H. Wu et al, "Design of Symmetric Voltage Cancellation Control for LCL converters in Inductive Power Transfer Systems," in *IEEE International Electric Machines & Drives Conference* ("*IEMDC*"), 2011, 2011, pp. 866-871. In addition, the switching characteristics of each semiconductor device strongly depend on the operating temperature and internal device parameters that have relatively large discrepancies.

Figure 19:
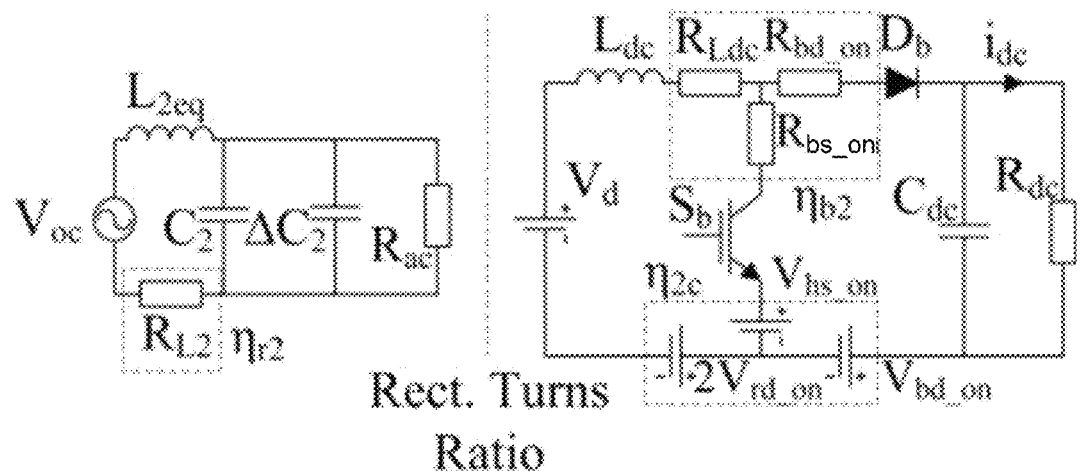
FIG. 19 illustrates equivalent efficiency model circuit diagram of an exemplary secondary decoupling pickup (secondary circuit) (see also FIG. 23)

To aid the explanation of the analysis, FIG. 19 may be referenced. The conduction losses in semiconductor devices, in one embodiment, are modeled separately into two parts, one being the forward voltage drop at zero current ($V_{rd\_on}$, $V_{hs\_on}$, $V_{bd\_on}$), and the other being the equivalent linear resistance in series. Each of these would be considered separately. It should be noted that $R_{Ldc}$ comprises the summation of the ESR in $L_{dc}$ and the linear resistance of the diodes in the rectifier bridge.

The efficiency of the boost converter after the rectifier is given by:

$$\eta_{b2} = \frac{P_{out}}{P_{out} + P_{Ldc} + P_{switch} + P_{diode}} \quad (6)$$

Here only the linear resistance is considered and expanding (6) will result in:

$$\eta_{b2} = \frac{1}{1 + \frac{R_{Ldc} + DR_{bs\_on} + (1-D)R_{bd\_on}}{(1-D)^2 R_{dc}}} \quad (7)$$

$$P_{out} = \frac{V_{dc}^2}{\omega^2} \frac{M^2}{L_{1eq}^2 L_{2eq}^2} R_{dc}(1-D)^3 \sin^2\left(\frac{\sigma}{2}\right) \quad (5)$$

By assuming $R_{bs\_on}$ is approximately equal to $R_{bd\_on}$, (7) can be simplified to:

$$\eta_{b2} = \frac{1}{1 + \frac{8\omega C_2 (R_{Ldc} + R_{bd\_on})}{\pi^2 Q_{2v}}} \quad (8)$$

The losses due to the forward voltage drop of the devices can be derived in a similar manner, and by assuming $V_{hs\_on}$ and $V_{hd\_on}$ are similar, the efficiency can be expressed as:

$$\eta_{c2} = \frac{1}{1 + \frac{\pi V_{rd\_on} + \sqrt{2} V_{bd\_on}}{\sqrt{2}(1-D)V_{out}}} \quad (9)$$

Next, for the secondary resonant circuit, the detuning effect due to pad inductance variations is considered. To simplify the analysis, the pad inductance is mathematically treated as a constant and the parallel tuning capacitor is treated as a variable. In addition, the ESR of the tuning capacitors is neglected as their losses are an order of magnitude lower than other components. The equation for the magnitude of $i_2$ is:

$$|i_2| i_{ac} \sqrt{1 + Q_{2v}^2 (1+\alpha)^2} \quad (10)$$

where $$\alpha = \Delta C_2 / C_2 \quad (11)$$

Following the approach proposed in (6) and using (10), the efficiency is given by:

$$\eta_{r2} = \frac{1}{1 + \frac{\omega C_2 R_{L2}}{Q_{2v}}(1 + Q_{2v}^2 (1+\alpha)^2)} \quad (12)$$

Figure 20:
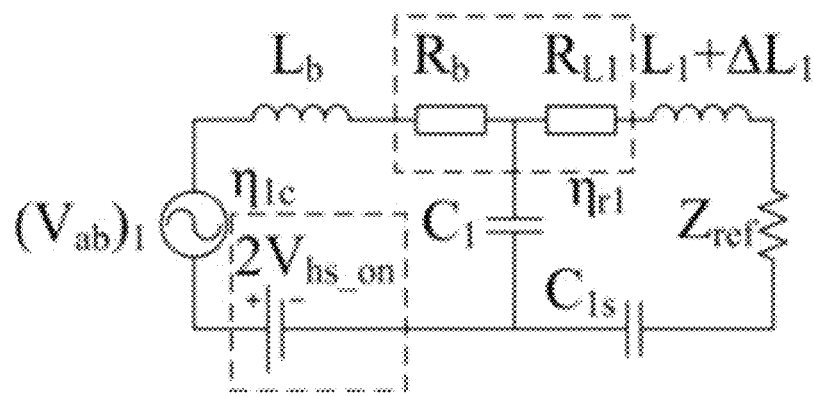
FIG. 20 illustrates equivalent efficiency model circuit diagram of an exemplary primary LCL converter (see also FIG. 5)

If equations (8), (9) and (12) are multiplied together, the result will be the efficiency of the secondary resonant circuit, the secondary rectification circuit, and the secondary decoupling converter of the second stage 108. The next derivation is to determine the efficiency of the LCL load resonant converter and associated resonant network. The equivalent circuit shown in FIG. 20 is used to model the losses. Firstly, the parallel impedance of a secondary detuned resonant circuit is given by:

$$Z_p = R_{ac} \left\| \frac{1}{j\omega \Delta C_2} = \frac{R_{ac}(1 - jQ_{2v}\alpha)}{1 + Q_{2v}^2 \alpha^2} \right. \quad (13)$$

Note that all the ESR losses on the secondary are neglected and because their values are much smaller than the reactance and load resistance components, $i_2$ is given by:

$$I_2 = \frac{V_{oc} - V_{ac2}}{j\omega L_2} = \frac{j\omega M I_1 - \frac{M^2}{L_{2eq}} I_1 \frac{R_{ac}(1-jQ_{2v}\alpha)}{1+Q_{2v}^2\alpha^2}}{j\omega L_{2eq}} \quad (14)$$

From first principles the reflected impedance is:

$$Z_r = \frac{\omega^2 M^2 I_2}{V_{oc}} = \frac{\omega M^2}{L_{2eq}} \frac{Q_{2v}}{1 + Q_{2v}^2 \alpha^2} + j\frac{\omega M^2}{L_{2eq}} \left(-1 - \frac{Q_{2v}^2 \alpha}{1+Q_{2v}^2\alpha^2}\right) \quad (15)$$

It should be noted that (15) simplifies down to (3) if $\Delta C_2$ is set to zero. Similar to before, the linear resistance losses are separated from the forward voltage drop at zero current. By using a similar approach as in (6), the efficiency for the primary is:

$$\eta_{r1} = \frac{1}{1 + \frac{((R_{L1} + \text{Re}(Z_r))^2 + (\omega \Delta L_1 + \text{Im}(Z_r))^2)}{\text{Re}(Z_r)}} \quad (16)$$

Similar to (8), the efficiency due to forward voltage drop is given by:

$$\eta_{c1} = 1 - \frac{\pi V_{hs\_on}}{\omega L_b \sqrt{\frac{2P_{out}}{\text{Re}(Z_r)}}} \quad (17)$$

By grouping (8), (9), (12), (16) and (17) the overall system efficiency is given by:

$$\eta = \eta_{r1} \cdot \eta_{c1} \cdot \eta_{r2} \cdot \eta_{b2} \cdot \eta_{c2} \quad (18)$$

Using (18), in one embodiment the highest efficiency point can be found. However, typically this function is much higher than fourth order against $Q_{2v}$ which means an analytical solution of a global maximum may not be directly determined. Fortunately, through extensive analysis, this function would always have a global maximum and using a simple detection routine, the maximum may be found. The values for the analysis are listed in Table II. $R_b$ is the sum of the ESR of $L_b$ and the linear resistance of the switches. To determine variables M and $\alpha$, FIG. 4 can be used. $Q_{2v}$ is calculated using (14). In this example, an approximate 37 W was used to power the FPGA controller and all the sensors for the 5 kW system.

TABLE II

System Parameters for Efficiency Analysis.

| Parameters | Values | Parameters | Values |
|---|---|---|---|
| $R_{Ldc}$ | 0.0166 Ω | $R_{L1}$ | 0.0636 Ω |
| $R_{bd\_on}$ | 0.035 Ω | $R_b$ | 0.1194 Ω |
| $V_{bd\_on}$ | 0.95 V | $V_{hs\_on}$ | 0.9 V |
| $R_{L2}$ | 0.0569 Ω | $V_{rd\_on}$ | 0.77 V |

Figure 21:
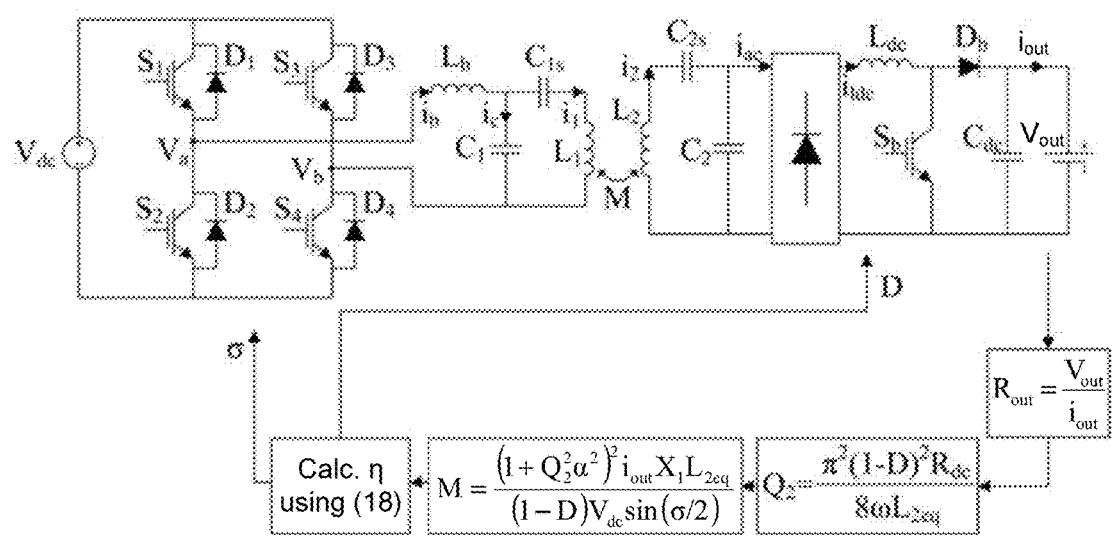
FIG. 21 illustrates an exemplary controller block diagram for optimal efficiency.

To practically implement this system, the controller block diagram shown in FIG. 21 may be used. In one embodiment, the duty cycle D is used as the primary control variable and the conduction angle σ is constantly updated to keep the output power (current) in regulation.

The equivalent load resistance of the battery 326 may be determined by measuring the battery voltage and the charging current. These two sensors are typically necessary for safety reasons when charging large batteries for EVs, hence no additional hardware may be needed. To determine the coupling coefficient, observer equations may be directly used to predict its operating value. Firstly, the track current must be determined, perhaps through measurement using a current transformer ("CT"). However, if the PFC stage can maintain, for example, a constant 400 VDC bus during operation, it is possible to directly estimate $i_1$ using (2) without any extra CT. By using the estimated track current, M (and k) can be directly determined when $i_1$ and $R_{dc}$ are already known:

$$M = \frac{\sqrt{1+Q_2^2\alpha^2}}{1-D} \frac{I_{out}X_1}{V_{dc}\sin(\sigma/2)} L_{2eq} \quad (19)$$

Figure 22:
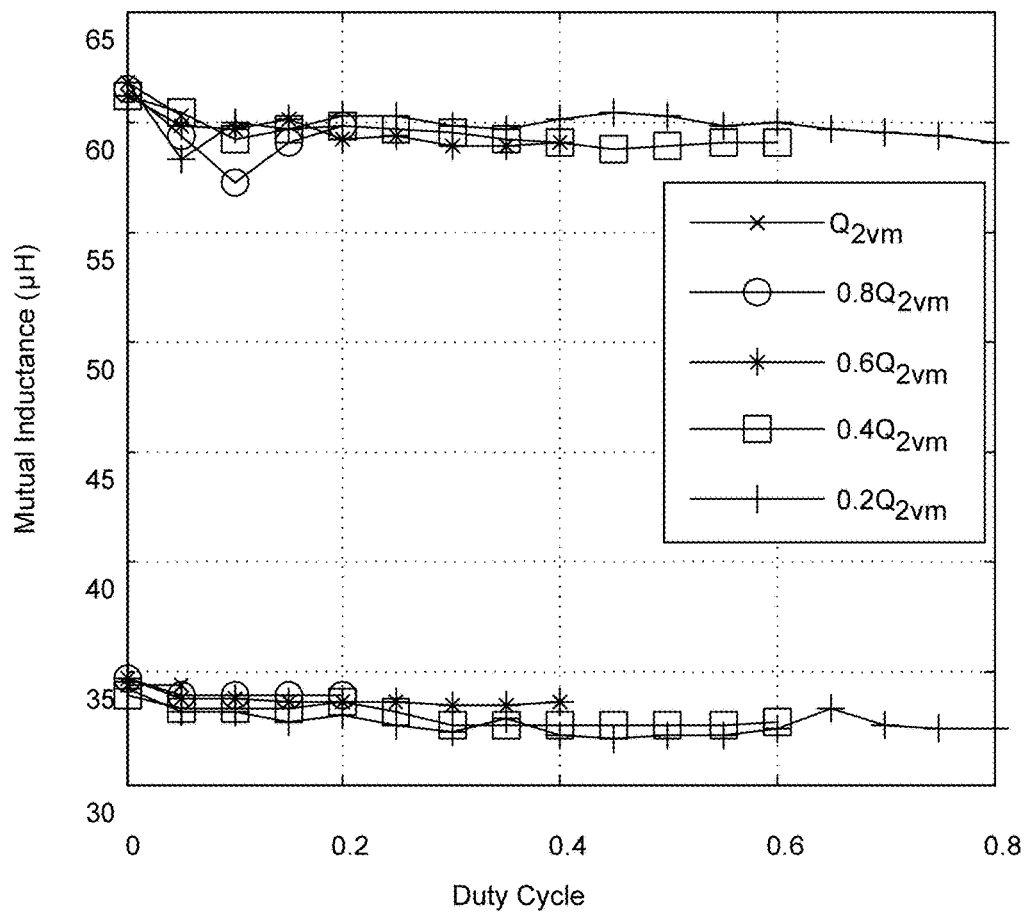
FIG. 22 illustrates coupling coefficient estimation using (21). Blue trace is for $k=2k_{min}$ (M=60 µH) and Red trace is for $k=1.14\ k_{min}$ (M=34.2 µH)

FIG. 22 shows that the mutual inductance (or coupling) can be determined without much error over a wide range of load and duty cycle conditions. Estimates of the system parameters in Table II are needed for optimal efficiency control using (18). One method of creating accurate estimates is to directly measure during manufacturing the ESR values of each component and then program the controller for each unit with the measured parasitic values. A potential shortcoming of this technique is that the ESR of the two IPT pads can vary if stray metal objects are bought into close proximity during operation. There are several ways to accurately detect pad ESR during operation which can be alternatively applied. In some embodiments, an alternative method may be undertaken by installing an input voltage and current sensor before the resonant converter with a nominal added cost, the input power may be measured directly. With access to the input and output power of the system, the efficiency may be determined and the optimum may be found by searching for the peak. This is a practical implementation approach taken in some embodiments in the systems described herein for the closed loop controller. Although it can be argued that measuring efficiency in this way is not completely accurate, the general trend may still be determined using sensors that may have 1% measurement error. The peak of the function shown in FIG. 33 may be tracked quite accurately.

In some embodiments, the processor on the primary controller 308 is configured to be responsible for tracking the system efficiency and optimizing primary SVC control and secondary decoupling control to ensure optimal system efficiency.

V. Secondary Tuned Network (Secondary Circuit 318, FIG. 23)

The IPT systems described herein may include a secondary tuned network.

A. Capacitive Network of the Secondary Resonant Circuit

Figure 23:
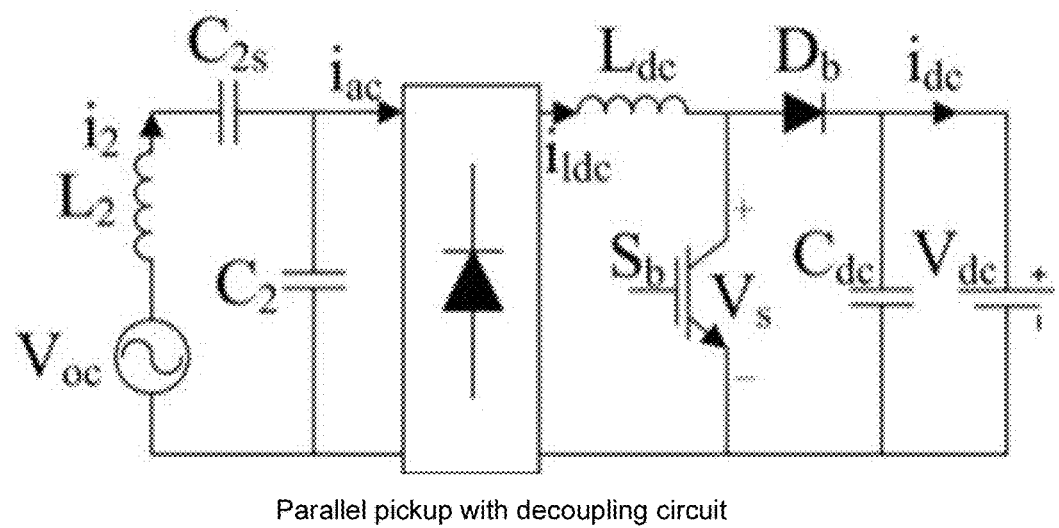
FIG. 23 illustrates an exemplary parallel pickup or secondary circuit with a secondary resonant circuit, a secondary rectification circuit, and a secondary decoupling circuit (in the form of a secondary decoupling converter)

In some embodiments, the capacitive network shown with a secondary decoupling converter and illustrated in FIG. 23 may include a series compensation capacitor ($C_{2s}$) and a parallel tank capacitor ($C_2$). To determine the capacitances for this system, in one embodiment the following method may be used:

1. Determine desired operating angular frequency $\omega=2*\pi*f$ where f is the frequency in Hertz.
2. Determine input DC voltage to primary ($V_{dc1}$), desired output voltage ($V_{dc2}$), and desired output current ($I_{dc2}$). Output Power, $P_{out}=V_{dc2}*I_{dc2}$.
3. For a given pad set, determine the coupling coefficient (k) range and nominal air gap between primary and secondary receiver pads 314, 316.

$$k = \sqrt{1 - \frac{(L_1)_s}{(L_1)_o}}$$

where $(L_1)_s$ is the primary receiver pad inductance with the secondary receiver pad 316 shorted at a given height and $(L_1)_o$ is the primary receiver pad inductance with the secondary receiver pad 316 open circuit at a given height. $k_0$ is thus the coupling coefficient k with the pads set at nominal air gap.

4. Determine maximum primary RMS AC Voltage ($V_{ac1}$) where $$V_{ac1} = V_{dc1} * \frac{2\sqrt{2}}{\pi}\sin\left(\frac{\sigma}{2}\right)$$

when $\sigma=180°$. And determine required maximum RMS AC Track Current ($I_{1max}$) using IPT modeling. The desired primary reactance ($X_{1\_des}$) is thus $$X_{1\_des} = \frac{V_{ac1}}{I_{1max}}.$$

5. Determine secondary receiver pad inductance when at the nominal height above primary and primary receiver pad 314 is open circuit ($L_{20}$) and associated reactance ($X_{20}$). $X_{20}=\omega*L_{20}$ where $\omega$ is the angular frequency of the system.
6. Determine open circuit voltage ($V_{oc}$) at maximum height (i.e. $k_{min}$) $V_{oc}=I_{1max}*X_{20}*k_{min}$ (assuming primary and secondary receiver pad inductances are very close to each other) and from that determine the desired secondary reactance $$(X_{2\_des}),\ X_{2\_des} = \frac{V_{oc}}{I_{dc2}}$$

7. For the given secondary resonant circuit (shown in FIG. 23) determine required secondary series compensation capacitance ($C_{2s}$) and secondary parallel tank capacitance ($C_2$) using the following equations $C_{2s}=[\omega*(X_{20}-X_{2\_des})]^{-1}$ and $C_2=[\omega*X_{2\_des}]^{-1}$
8. Determine the nominal primary receiver pad inductance ($L_{10}$) and reactance ($X_{10}$) with secondary at maximum height and secondary coil shorted in series with the secondary series compensation capacitance $C_{2s}$.
9. For the given primary LCL tuning circuit (shown in FIG. 10) determine required primary series compensation capacitance ($C_{1s}$) and primary parallel tank capacitance ($C_1$) using the following equations $C_{1s}=[\omega*(X_{10}-X_{1\_des})]^{-1}$ and $C_1=[\omega*X_{1\_des}]^{-1}$
10. The primary bridge inductance ($L_b$) can thus be determined $$L_b = \frac{X_{1\_des}}{\omega}.$$

If the bridge inductance is split between both legs of the inverter, the associated inductance is halved for each inductor.

B. Coil Interaction $L_2$ as shown in FIG. 23 is the magnetic pad design used to transfer power to a secondary circuit 318. In the secondary of a wireless IPT converter, the secondary magnetic pad (secondary receiver pad 316) acts as the secondary half of a loosely coupled transformer with some amount of self-inductance and mutual inductance. The self-inductance is used (as discussed above) to tune the circuit; therefore the system, in general, must be fairly tolerant to this change in self-inductance to maintain efficiency in resonant power transfer. It should be noted however that the secondary self-inductance changes much less than the primary self-inductance.

VI. Secondary Rectification Circuit

Depending on the end point load, the IPT systems described herein may include an optional secondary rectification circuit. When employed, the secondary rectification circuit is configured to transform the high frequency AC waveform into a DC waveform. The secondary rectification circuit may be a standard full-wave bridge rectifier consisting of four high-speed diodes selected for low loss operation. For example, in some embodiments, four Fairchild RHRG75120 diodes were selected to perform the rectification. The diodes used for rectification may be configured to have very fast diode reverse recovery times, low voltage drops, high voltage ratings, and high current ratings. Other embodiments include synchronous rectification techniques employing switches to perform low-loss rectification.

VII. Secondary Decoupling Circuit

The IPT systems may optionally include a secondary decoupling circuit. Any suitable decoupling circuit may be used. A secondary decoupling circuit may include a switching power converter, such as a boost converter. For example, a parallel pickup (secondary circuit 318) with decoupling control shown in FIG. 23 was used in some exemplary embodiments. See, e.g., J. T. Boys et al, "Stability and control of inductively coupled power transfer systems," *IEE Proceedings—Electric Power Applications*, vol. 147, pp. 37-43, 2000; G. A. Covic et al, "Self tuning pick-ups for inductive power transfer," in *IEEE Power Electronics Specialists Conference*, 2008. PESC 2008., 2008, pp. 3489-3494; N. A. Keeling et al, "A Unity-Power-Factor IPT Pickup for High-Power Applications," *IEEE Transactions on Industrial Electronics*, vol. 57, pp. 744-751, 2010; J. T. Boys et al, "Single-phase unity power-factor inductive power transfer system," in *IEEE Power Electronics Specialists Conference*, 2008. PESC 2008., 2008, pp. 3701-3706; Y. Xu et al, "Modeling and controller design of ICPT pick-ups," presented at the International Conference on Power System Technology, 2002. Proceedings. PowerCon 2002., 2002.

In some embodiments, the secondary decoupling circuit described above has the following advantages:

The parallel resonant circuit acts as a current source under steady state conditions (see, e.g., G. A. Covic et al, "Self tuning pick-ups for inductive power transfer," in *IEEE Power Electronics Specialists Conference*, 2008. PESC 2008., 2008, pp. 3489-3494.), and may function well for charging most types of batteries.

The secondary decoupling controller 320 may be easy to use and may be capable of regulating the output voltage of the pickup to any desired value by simply controlling the duty cycle of the switch $S_b$. See J. T. Boys et al, "Stability and control of inductively coupled power transfer systems," *IEE Proceedings—Electric Power Applications*, vol. 147, pp. 37-43, 2000. In addition, the secondary side control acts as a protection feature to the batteries if the wireless communications link is temporarily not operational.

Operating the secondary decoupling controller switch at high switching frequencies produces a reflected impedance to the primary ($Z_r$) that is constant, and current drawn from the power supply will have the ability to ideally have minimal EMI from the secondary side compared to slow switching operation. Here, the open circuit voltage from first principles is given by:

$$V_{oc} = j\omega M I_1 \tag{20}$$

And if the battery 326 can be modeled as an equivalent DC resistance under steady state, then the output power is given by:

$$P_{out} = P_{max}(1-D) = \omega I_1^2 \frac{M^2}{L_{2eq}} Q_{2v}(1-D) \tag{21}$$

where $$Q_{2v} = \frac{R_{ac}}{X_2} = \frac{\pi^2(1-D)^2 R_{dc}}{8\omega L_{2eq}} \tag{22}$$

$$L_{2eq} = \frac{(\omega L_2 - 1/\omega C_{2s})}{\omega} \tag{23}$$

$Q_{2v}$ in (22), is different from the $Q_2$. $Q_2$ is the overall quality factor and can be defined as the product of the voltage Q ($Q_{2v}$) and current Q ($Q_{2i}$). See N. A. Keeling et al, "A Unity-Power-Factor IPT Pickup for High-Power Applications," *IEEE Transactions on Industrial Electronics*, vol. 57, pp. 744-751, 2010. Here, $Q_{2v}$ is treated the same way and $Q_{2i}$ is self-contained during the definition of tuning by $L_{2eq}$ and $L_{1eq}$. The key part of the design strategy is to choose an $L_{2eq}$ in (23) that will meet the power requirements in (21). The design parameters are shown in Table III. The $V_{oc}$ parameter is not given here, since it is dependent on the coupling condition and primary track current used. The main purpose of $L_{dc}$ is to keep the rectifier current continuous and the guidelines to choosing it can be found in, for example, P. Si et al, "Analyses of DC Inductance Used in ICPT Power Pick-Ups for Maximum Power Transfer," in 2005 *IEEE/PES Transmission and Distribution Conference and Exhibition: Asia and Pacific*, 2005 pp. 1-6.

TABLE III

Design Parameters for IPT Pickup.

| Parameter | Value | Parameter | Value |
|---|---|---|---|
| $V_{out}$ | 300 V | $L_{dc}$ | 550 µH |
| $X_2$ | 9.81 Ω | $i_{out}$ | 0-17 A |
| $C_2$ | 811.19 nF | Diode ($D_b$) | IDT16S60C |
| $L_2$ | 177-188 µH | Switch | IRG7PH42UPBF |
| $C_{2s}$ | 611.19 nF | Diode (Rectifier) | RHRG75120 |

Figure 24:
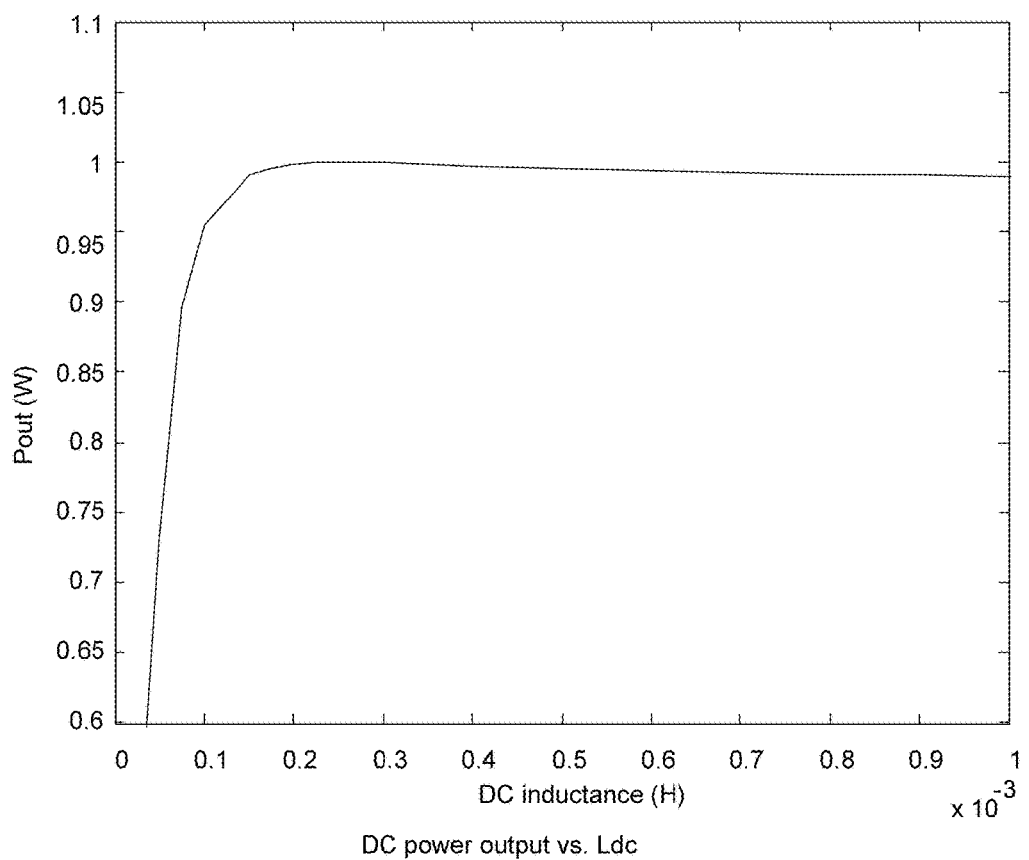
FIG. 24 illustrates DC power output vs. Ldc.
Figure 25:
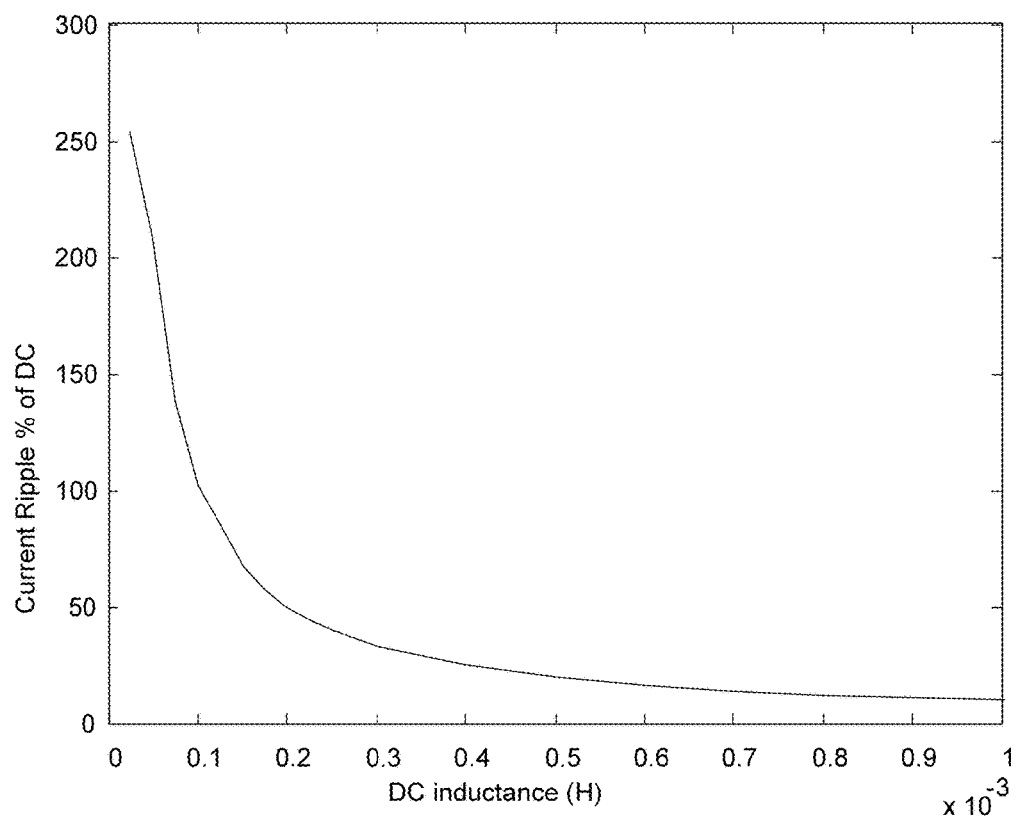
FIG. 25 illustrates AC current peak to peak amplitude normalized against DC average value vs. Ldc.

In some embodiments, a process for choosing a particular $L_{dc}$ for the parallel resonant pickup may be used. For example, a process may be followed to analyze the required minimum DC inductance for the circuit. One direct method is to measure the amount of output power that can be drawn normalized against the maximum, and a reasonable $L_{dc}$ can be chosen (FIG. 24). However, the process is slightly more complicated, because even if the power is available there may be large harmonic ripples on the DC current which reversed through the rectifier may result in a non-unity displacement power factor. See also P. Si et al, "Analyses of DC Inductance Used in ICPT Power Pick-Ups for Maximum Power Transfer," in 2005 *IEEE/PES Transmission and Distribution Conference and Exhibition: Asia and Pacific,* 2005 pp. 1-6. This phenomenon when reflected back to the primary converter may result in extra loading on the H-bridge network and it may be better to reduce the ripple current to less than 20% during operation to avoid significant reflection. As such, the plot in FIG. 25, shows that the ripple can be reduced to 20% when the DC inductance is increased to around 500 μH.

Figure 26:
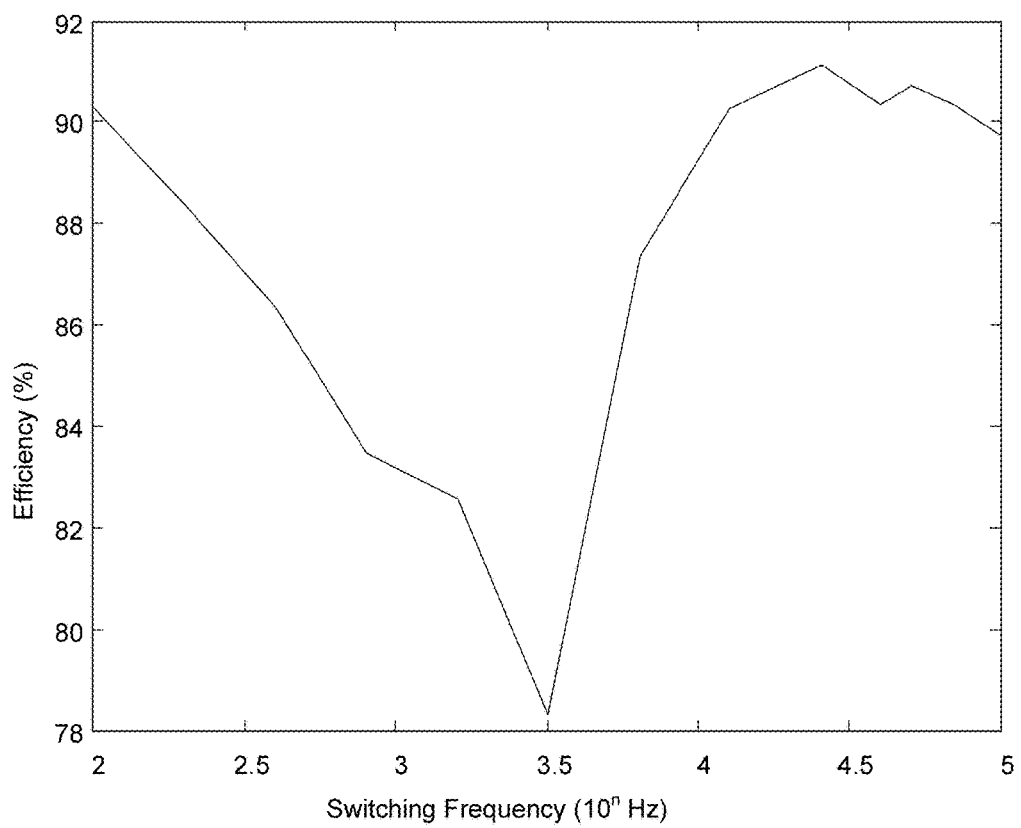
FIG. 26 illustrates secondary decoupling pickup efficiency vs. switching frequency of an exemplary decoupling circuit.

Next, the analysis of the switching frequency for the secondary decoupling controller 320 may be somewhat complex and there is an optimal frequency at which the system can operate during fast switching. There may be also a significant efficiency drop to 78% when the switching frequency is selected at the resonant pole of $L_{dc}$ and the parallel resonant tank. As such, a much higher or lower frequency may be selected. Lower switching frequency is not typically used in systems described herein because it creates EMI back on the grid when the pickup is being switched on and off. As such, high switching frequency is preferred. It can be seen in FIG. 26 that once the frequency is above 10 kHz its efficiency is maintained quite high.

Figure 27:
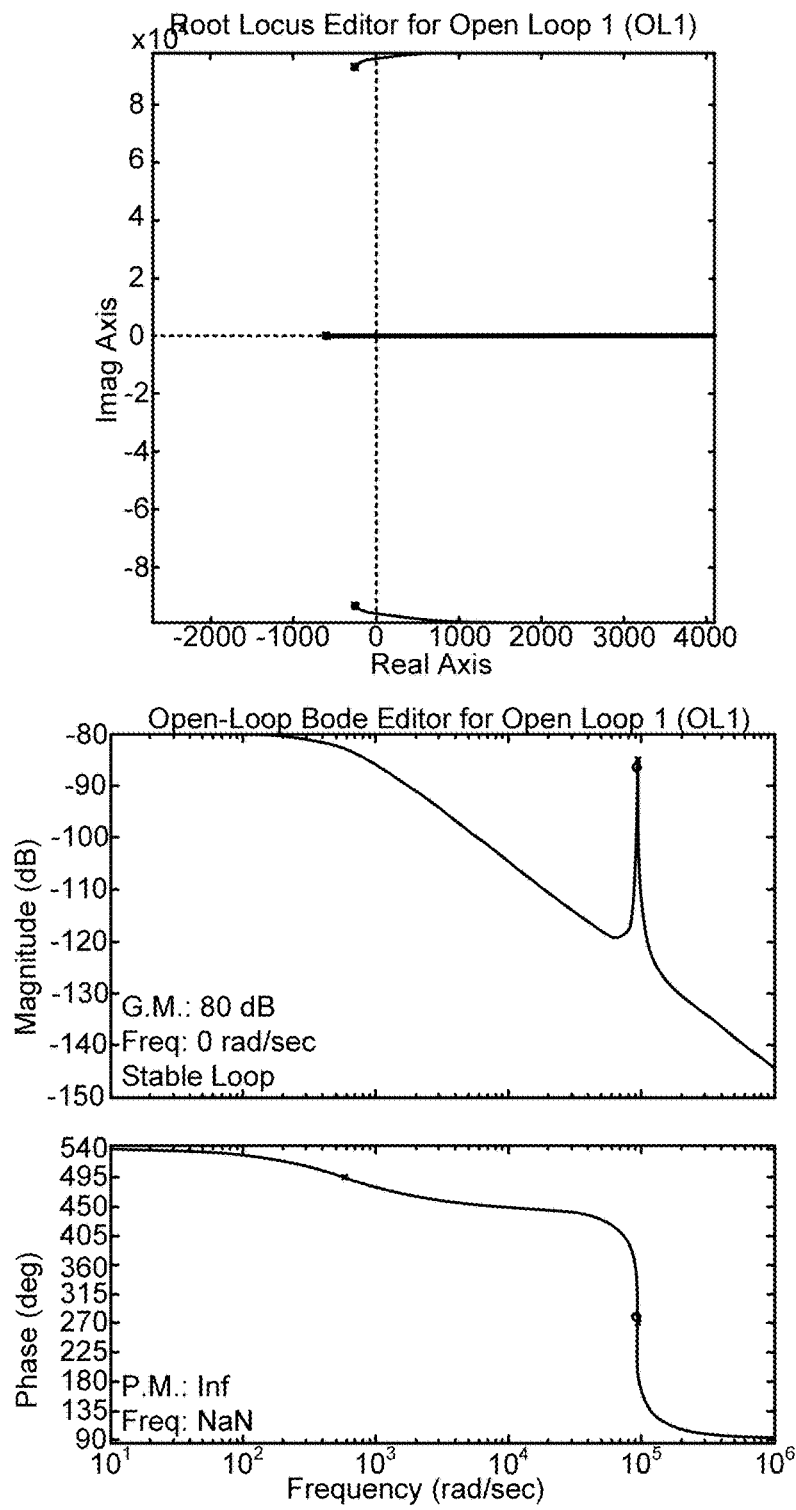
FIG. 27 illustrates root locus and bode plot of an exemplary decoupling circuit.

Using the DC equivalent circuit theory and state space averaging (see, e.g., J. T. Boys et al, "Controlling inrush currents in inductively coupled power systems," in *The 7th International Power Engineering Conference,* 2005. *IPEC* 2005, 2005, pp. 1046-1051.), the following transfer function for a parallel tuned decoupling circuit is shown in equation (24). The root locus plot of this transfer function using the system parameters is shown in FIG. 27. This root locus depicts that there are three poles and two zeros. It should be noted that the zeros is a right hand plane zero which means that the output would always act in the negative direction of what is expected when a step function is at the input. With this in consideration, there are still significant assumptions in the analysis model and pushing the system close to the verge of instability is not a wise choice.

$$\frac{V_o(s)}{d(s)} = \frac{-\frac{I_{d'}}{C_{dc}}\left(s^2 + \left(\frac{r}{L_{dc}} - \frac{R_L(1-D)^2}{L_{dc}}\right)s + \frac{1}{L_{dc}C_{2'}}\right)}{s^3 + \left(\frac{1}{C_{dc}R_L} + \frac{r}{L_{dc}}\right)s^2 + \left(\frac{1}{C_{2'}L_{dc}} + \frac{r}{L_{dc}R_L C_{dc}} + \frac{(1-D)^2}{L_{dc}C_{dc}}\right)s + \frac{1}{C_{2'}L_{dc}R_L C_{dc}}} \quad (24)$$

A. Switch and Diode Selection

Any suitable switch and diode combination may be used for the systems described herein. For example, in some embodiments, for simplicity, cost, and to avoid loss caused by adding snubbing devices to MOSFET type switches, the same International Rectifier IGBT IRG7PH42UPBF switch (identical to the switch used in the primary tuned LCL load resonant converter) may be used for a secondary decoupling control switch $S_b$ shown in FIG. 23. The gate drive circuitry is also similar to that shown in FIG. 9. The diode $D_b$ shown in FIG. 23 may be selected from any suitable component or component set, such as two paralleled IDH16S60C Silicon Carbide ("SiC") schottky diodes from Infineon. The SiC diodes have a positive temperature coefficient; therefore, no additional balancing care is required to ensure thermal runaway does not occur as would be the case in typical silicon schottky diodes. Additionally, the SiC diodes exhibit very low conduction loss and near zero reverse recovery time.

The switches and diodes on the secondary electronics may be configured to use the same bottom configuration and same heat spreader wafers with thermal paste as those on the primary (FIG. 8). The aluminum heat sink may have a moderate capacity and surface area extrusion, such as MM32647 or equivalent, available from M&M Metals. Both the primary and secondary electronics assemblies may include an air cooling fan directed down the heat sink fin channels. The fans may be 12 volt DC high capacity, low power, low noise designs consuming less than 5 watts. Model number D7025V12 from Sofasco or equivalent may be suitable. The secondary thermal configuration is similar to that depicted in FIG. 8.

VIII. Secondary Decoupling Controller

The IPT systems described here may optionally include a secondary decoupling controller 320, which has both hardware and software associated therewith.

A. Hardware

Any suitable secondary decoupling controller 320 may be used to control decoupling switch waveforms. In some embodiments, a Field Programmable Gate Array ("FPGA") development board using a Xilinx Spartan 3AN FPGA may be used to develop a secondary decoupling controller 320. A custom wireless communication card may also be added to the development board to accommodate a custom application communication protocol over a wireless protocol layer, such as the standard 802.15.4 wireless protocol layer. The FPGA development platform may allow for a high amount of flexibility in an initial IPT system. Additional, more cost effective solutions exist and may allow much finer control over the entire system at much higher data throughput rates. One such alternative embodiment for a secondary decoupling controller 320 is the use of a Digital Signal Controller ("DSC") or Digital Signal Processor ("DSP") such as the Freescale MC56F84xx or series DSC.

B. Software

1. Overview

In some embodiments employing an FPGA or alternate processor, the internal firmware development may be done in a Hardware Design Language ("HDL"). In some embodiments employing a DSC or a DSP, the internal firmware development may be done in software coding languages such as C or C++. Such firmware may be broken in to subsections, for example five different subsections. The subsections may include, for example, a Processor subsection, a Communications subsection, an Analog to Digital Converter ("ADC") subsection, an LED Display subsection, and a Switch Control subsection.

Beyond these firmware subsections, additional software may be added as an application layer to the processor subsection and may be done in any suitable language, such as the C or C++ language. Interaction such as manual control and data-logging may be handled independently by any suitable user interface, such as a Graphical User Interface ("GUI") on a PC over a wireless interface. The manual control and interaction is optional but assists in producing data-rich analysis of the system.

a. Processor

The processor subsection may comprise a processor, such as a 32-bit processor running at a clock frequency of from about 30 MHz-100 MHz and required data and program memory. Other suitable processors may be used. The primary clock may be adjusted with an external PLL but due to the important nature of the frequency, an HDL block may perform clock timing verification and hold the processor (and all other subsections) in reset (thus preventing power transfer) until timing can be fully verified against a known reference clock signal. The processor subsection may be fully in charge of the application layer of software. It accepts current and voltage measurements throughout the secondary decoupling controller 320 and directly helps to determine the power transfer of the IPT system 104 in dual side control (as described in IV.B.2). Additionally, in some embodiments the processor may be configured to control communications, perform reporting, and implement manual control commands issued by an operator if desired.

b. Communications

The communication subsection may be configured to translate high-level data transmission into low-level bit encoding required by the wireless communication chips. The communication subsection, in one embodiment, may help to ensure proper transmission and reception of all wireless data.

c. Analog to Digital Converter ("ADC")

The ADC subsection may be configured to automatically communicate with external ADC integrated circuits, filter the data, and periodically report measurement parameters to the processor subsection.

d. LED Display

The LED display subsections may be configured to reduce processor loading by handling all visual status reporting. It reads the status of each subsection automatically and visually reports problems that may occur as well as power level status information. The LED display subsection, in one embodiment, directly controls a set of RGB colored LED's on the FPGA development board.

e. Switch Control

The switch control subsection may be configured to translate the desired decoupling duty cycle from the processor to correct waveform control on the decoupling switch. This subsection helps to ensure that duty cycle control is timed so that new values are reloaded at appropriate intervals regardless of when the processor requests the change in duty cycle. This subsection, in one embodiment, produces a fault-tolerant Pulse Width Modulated ("PWM") signal that may automatically decouple the secondary circuit 318 in case of a detected failure.

IX. Wirelessly Powered Load

Figure 28:
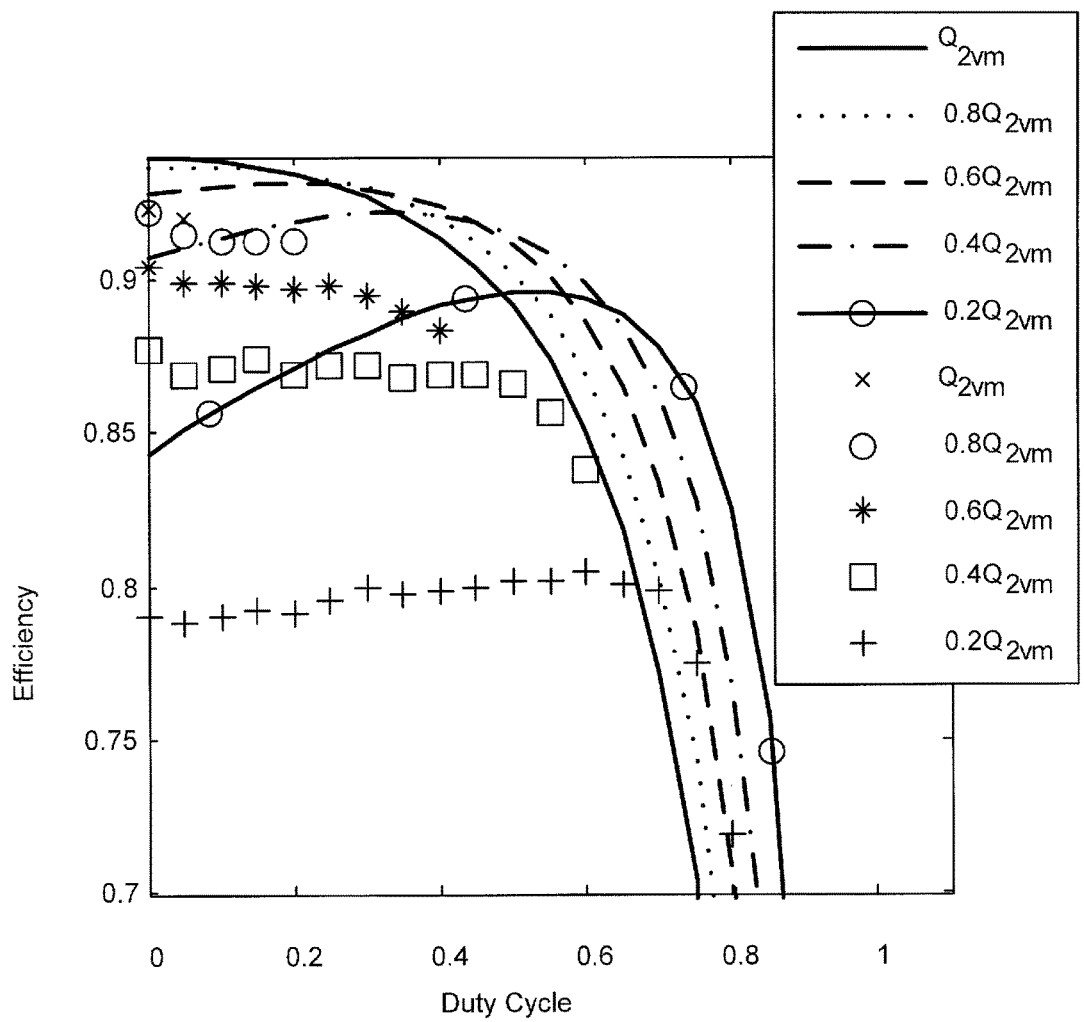
FIG. 28 illustrates efficiency of an exemplary system @ $k=1.14\ k_{min}$ (v=246 mm, h=0 mm). Line represents analytically calculated results and markers represented experimental measured results. The data is taken for different loading conditions, when matched to a percentage of the maximum $Q_{2v}$ loading condition.
Figure 29:
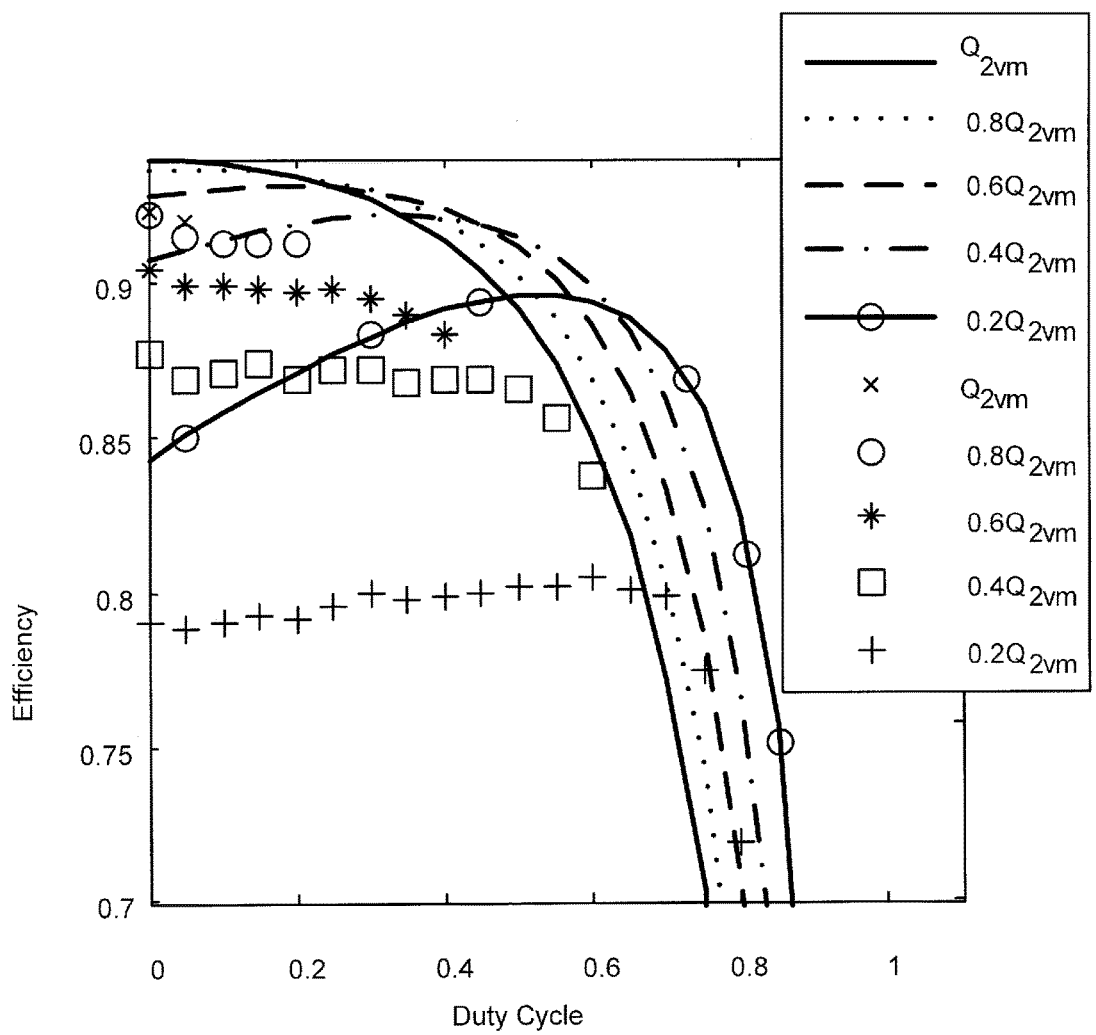
FIG. 29 illustrates efficiency of an exemplary system @ $k=2.0\ k_{min}$ (v=172 mm, h=0). Line represents analytically calculated results and markers represented experimental measured results. The data is taken for different loading conditions, when matched to a percentage of the maximum $Q_{2v}$ loading condition.
Figure 30:
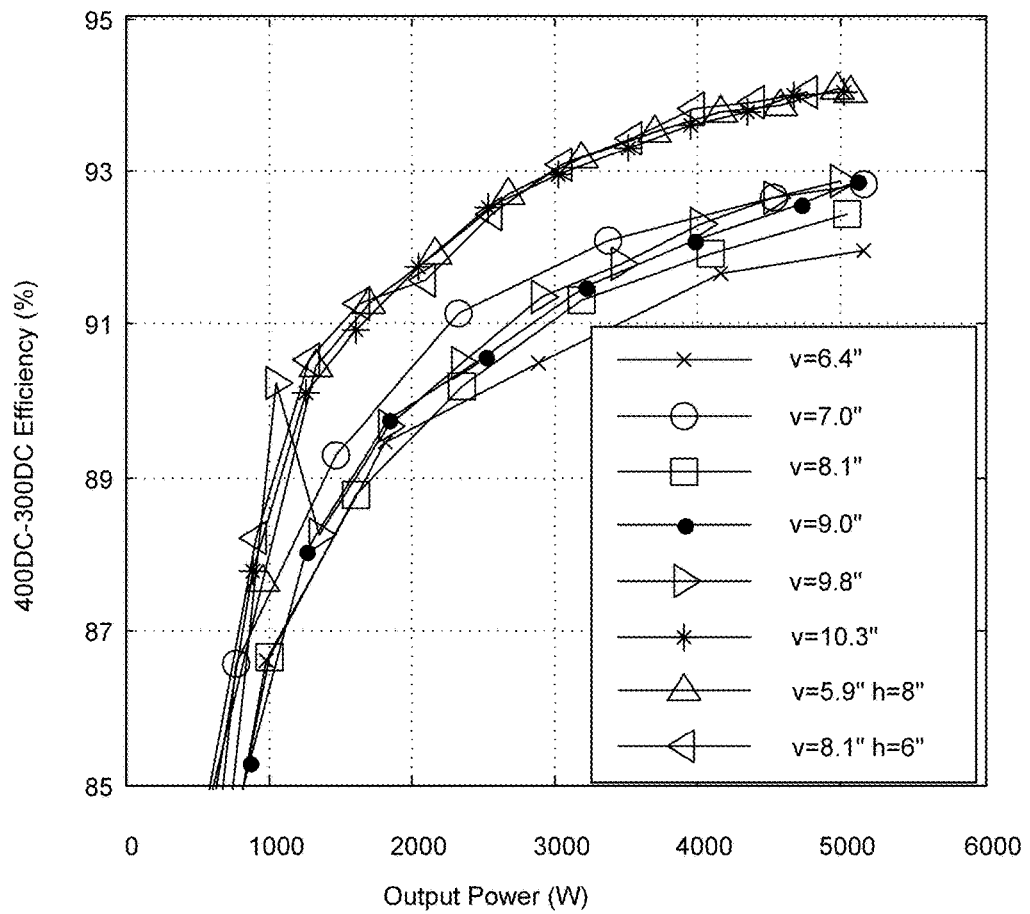
FIG. 30 illustrates practical overall system efficiency measurements when output voltage is allowed to vary. 5 kW transfer occurs when the DC output is 300 V.

FIG. 28 and FIG. 29 illustrate overall wireless IPT efficiency when using dual side control and hence secondary decoupling control (shown as Duty Cycle) from grid input on the primary to DC output on the secondary under fixed output voltage conditions (300 V) and under worst case coupling conditions. It should be noted that most loads attached to high power IPT systems will likely require a constant DC voltage output such as electric vehicles when charging batteries; however, if the system output voltage is allowed to vary under varying loading conditions the overall system efficiency can be improved under light load conditions. FIG. 30 shows overall system efficiency without dual side control but with the output voltage varying under several different vertical and horizontal magnetic pad misalignment conditions.

X. Fault Protection and Safety

Fault protection is an important aspect of high voltage and high power systems to ensure human and property safety. The 5 kW or greater wireless IPT systems described herein may use three layers of hardware fault tolerance and multiple additional layers of software fault protection.

A. Hardware Fault Protection

In some embodiments, the first layer of hardware fault protection may exist on each of the primary switch gate drivers and at the input of the AC-DC power factor stage. In addition to standard fuse protection, the AC-DC power factor stage, in one embodiment, has the ability to detect unusually high current spikes and power down the system until a manual reset is performed. On the LCL converter, the gate drive circuitry of each switch has desaturation protection such that if any switch is detected to be in desaturation (i.e. failure mode), all gate drivers will be shut down and the system will report a switch fault. Should additional safety be required on this layer of fault protection, a standard normally-open contactor can be added to the input or output of the AC-DC power factor stage.

In some embodiments, the second layer of hardware fault protection may exist in both the primary and secondary resonant networks. In one embodiment, a Metal Oxide Varistor ("MOV") from Littelfuse (part number V25S750P) is placed in parallel with the parallel tuning capacitor $C_1$ in FIG. 10 and the parallel tuning capacitor $C_2$ in FIG. 23. Each MOV typically protects against transient voltages above 750 VAC or 970 VDC and has the ability to dissipate 890 J of energy which is sufficient in the embodiment to remove the capacitive energy storage in the system and help to ensure human safety. In the unlikely event that the MOV itself fails, the most likely mode of failure is a short which effectively detunes the IPT system and prevents additional power transfer.

In some embodiments, the third layer of hardware fault protection may exist on the secondary decoupling circuit. In the very unlikely event that all software fails to control the output power properly and the primary continuously provides constant track current without regard to output power, a Schmitt trigger circuit automatically decouples the secondary and regulates the output voltage between 310 V and 330 V thus keeping all systems operating properly without overvoltage conditions. This layer of fault protection is particularly unique as many similar systems either do not have secondary decoupling control or if they do, the control remains purely in software. Furthermore, this level of fault protection allows trending toward dynamic in-motion wireless inductive power transfer.

B. Software Fault Protection

In some embodiments, the software on board the primary controller 308 and secondary decoupling controller 320 may be configured to constantly monitor current levels and voltage levels throughout the entire IPT system. If at any time, any current or voltage exceeds a predefined maximum, each independent controller prevents further power transfer and reports the appropriate overvoltage or overcurrent error to the user. Additionally, communication is monitored for consistency and reliability. If communication is deemed unreliable or a certain period has passed without communication, each independent controller prevents further power transfer and reports the appropriate communication error to the user.

Another important aspect of safety is ensuring that no ferrimagnetic objects between primary and secondary magnetic coils (primary and secondary receiver pads 314, 316) are heating due to eddy currents. The software on the primary controller 308 and secondary decoupling controller 320 constantly monitors system efficiency and can detect if any efficiency drop occurs due to unrecognized ferrimagnetic material. In the event that such a drop is detected, the IPT system prevents heating of such objects by shutting down each individual controller and reporting the appropriate error message to the user.

C. Magnetic Safety

The International Commission on Non Ionizing Radiation Protection ("ICNIRP") guidelines, a standard currently adopted in many EU and Oceania countries, is commonly used to determine the maximum magnetic field exposed to humans by a wide range of new inductive charging standards (such as SAE-J2954, ISO/IEC PT61980).

Figure 31:
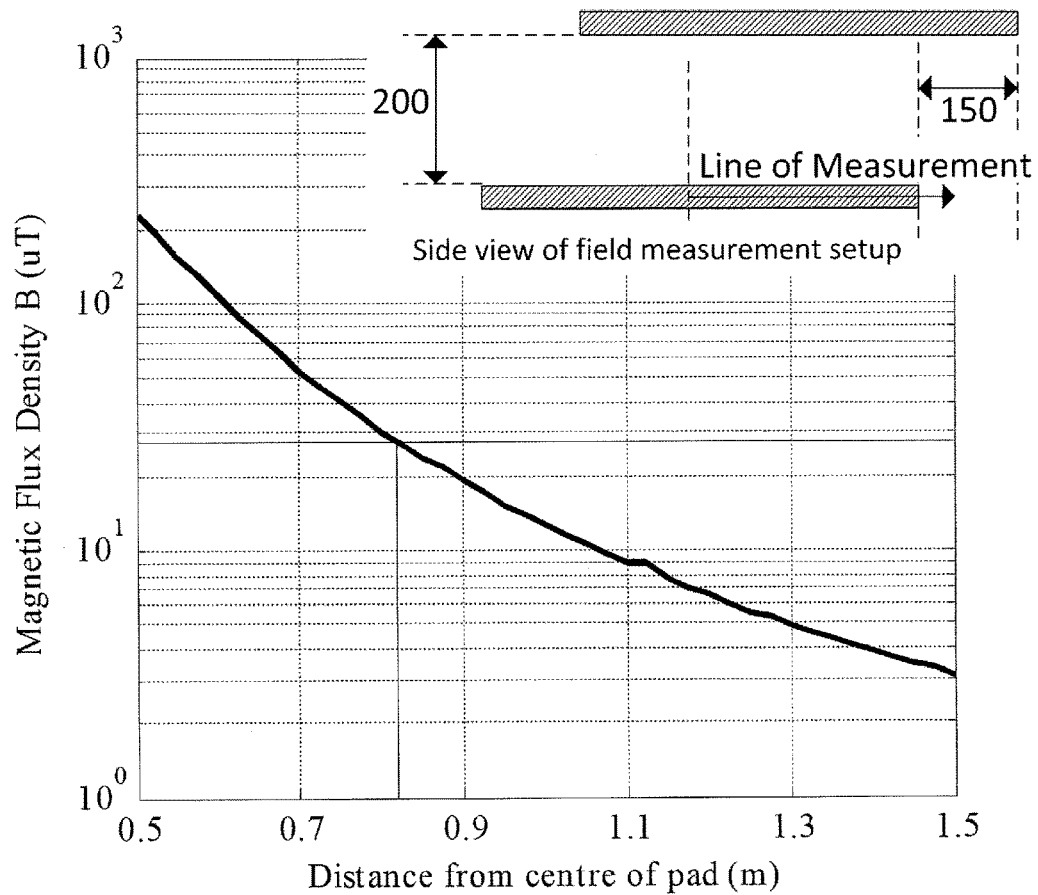
FIG. 31 illustrates magnetic field measurement results for an exemplary 5 kW system operating under worst conditions. The highest field strength was found at vertical height of 200 mm and horizontal misalignment of 150 mm.
Figure 32:
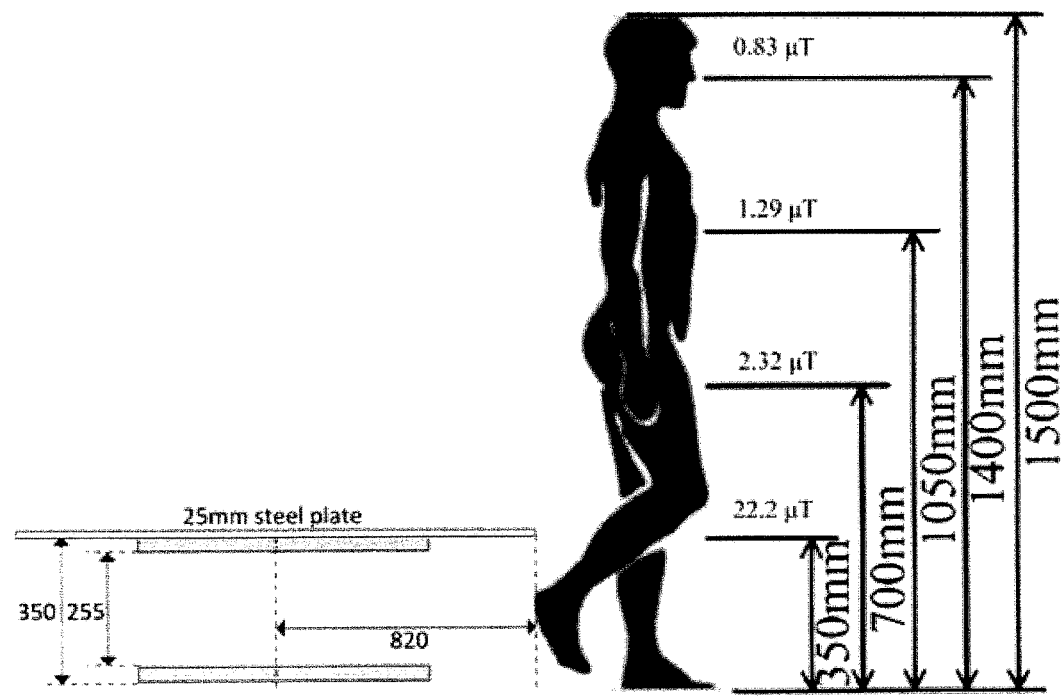
FIG. 32 illustrates body average measurement from 4 measurement points on a 1500 mm tall female human body. The highest field strength was found at vertical height of 255 mm and zero horizontal misalignment.

The magnetic field measurements of the disclosed IPT systems, in various embodiments, meet the stringent ICNIRP standards by using the measurement technique proposed by ARPANSA. See M. Budhia et al, "Design and Optimisation of Circular Magnetic Structures for Lumped Inductive Power Transfer Systems," *IEEE Transactions on Power Electronics*, vol. PP, pp. 1-1, 2011. There are typically two limits to meet: 1) Absolute maximum magnetic field exposed to the body must not exceed 27.3 µT and 2) The average field strength by taking measurements at the head, chest, groin and knees must be below 6.25 µT. FIG. 31 shows that for one embodiment, the absolute maximum magnetic field strength can be met at 0.82 m, which is less than half of the width of a typical passenger vehicle. The measurement was taken for all possible operating conditions and the worst case alignment conditions are shown in FIG. 31. FIG. 32 shows that the body average of 4.36 µT is measured using the four point measurement and as a standard case scenario (see M. Budhia et al, "Design and Optimisation of Circular Magnetic Structures for Lumped Inductive Power Transfer Systems," *IEEE Transactions on Power Electronics*, vol. PP, pp. 1-1, 2011.), a minimum height female of 1500 mm is used as the worst case. Note that maximum and average field strength shown here corresponds to different height and misalignment conditions for the absolute worst case.

XI. System Results

Figure 33:
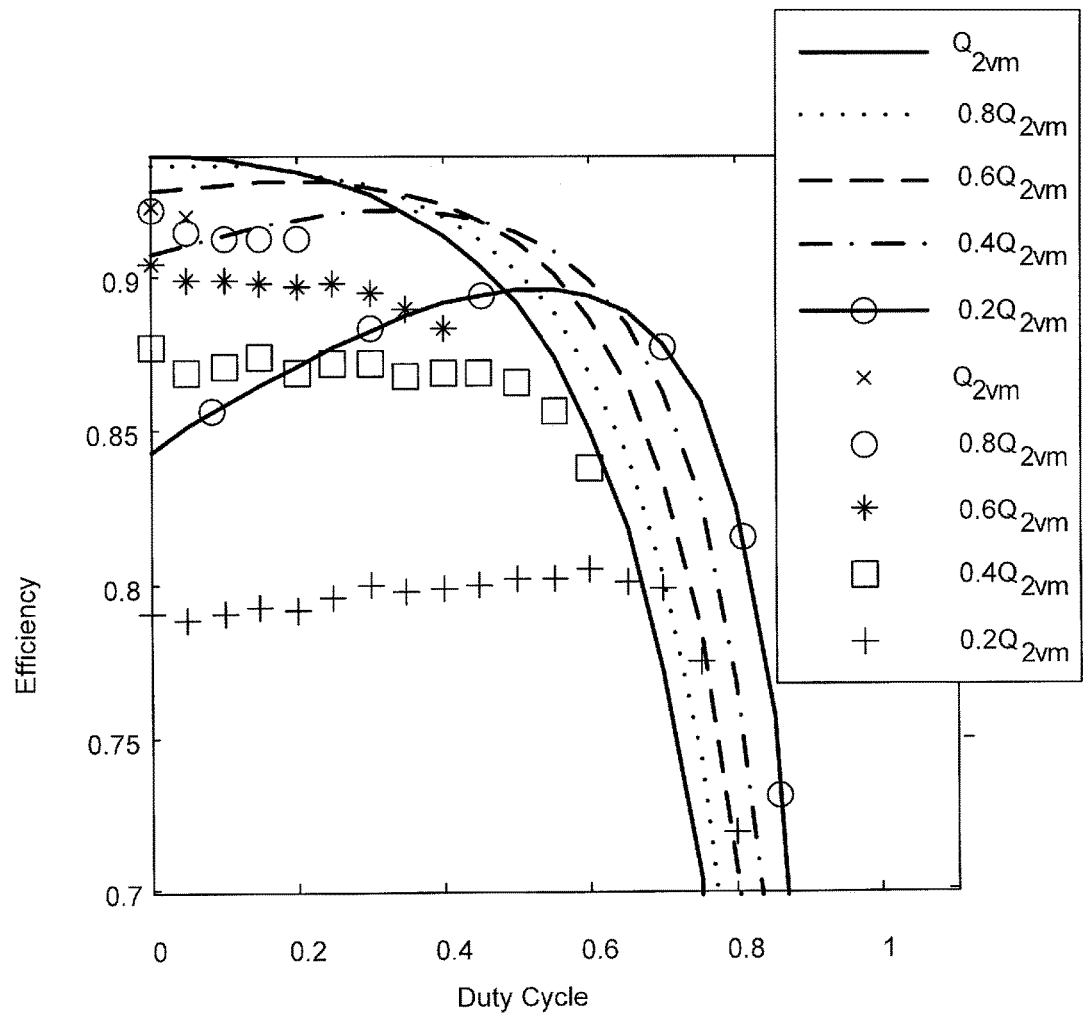
FIG. 33 illustrates efficiency of an exemplary system @ $k=1.14\ k_{min}$ (v=246 mm, h=0 mm). Line represents analytically calculated results and markers represented experimental measured results. The data is taken for different loading conditions, when matched to a percentage of the maximum $Q_{2v}$ loading condition.
Figure 34:
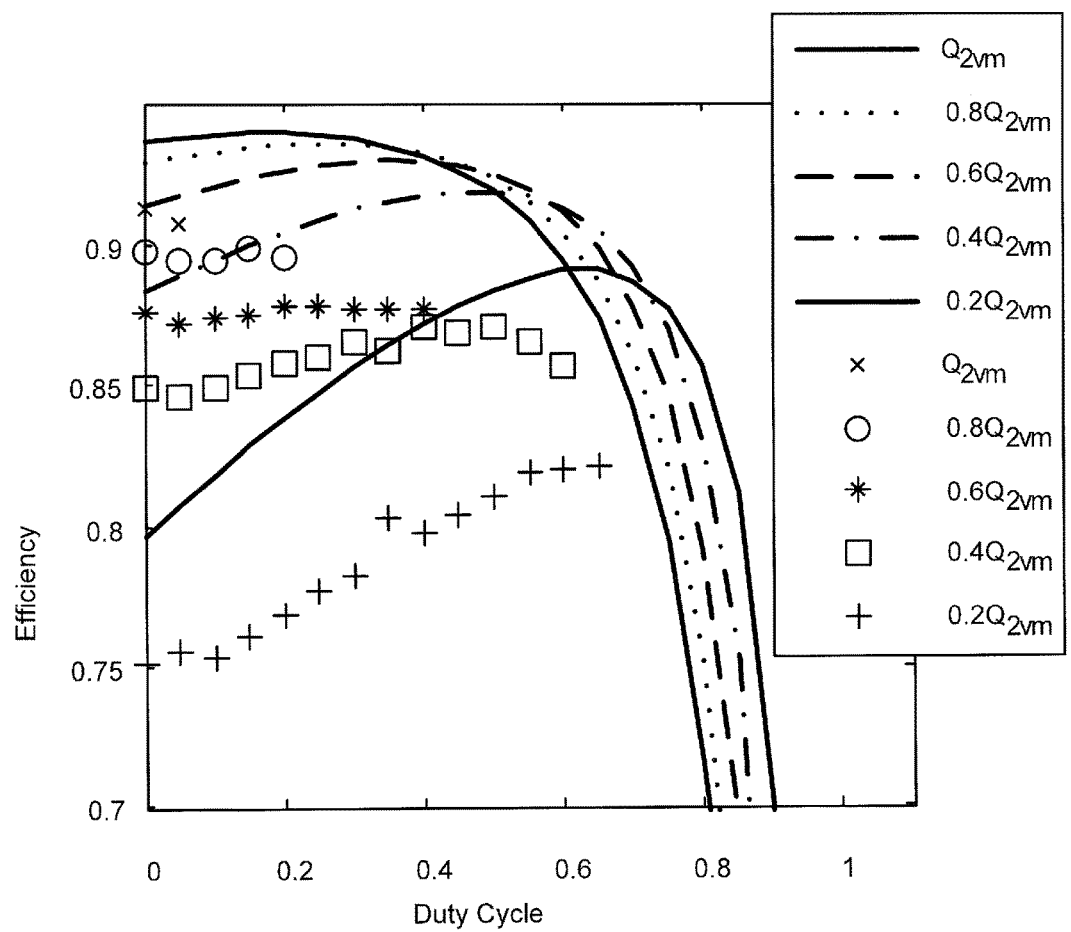
FIG. 34 illustrates efficiency of an exemplary system @ $k=2.0\ k_{min}$ (v=172 mm, h=0). Line represents analytically calculated results and markers represented experimental measured results. The data is taken for different loading conditions, when matched to a percentage of the maximum $Q_{2v}$ loading condition.

Practical experimental measurements have been used to validate the system efficiency analysis from the previous section on dual side control. FIG. 33 and FIG. 34 show the analytical and experimental results against changes in duty cycle during operation under different coupling conditions. $Q_{2vm}$ is the maximum $Q_{2v}$ achievable and used to denote the specific loading condition. For example, $Q_{2vm}$ refers to 5 kW output and 0.8 $Q_{2vm}$ refers to 4 kW output, and so on. For the experimental results, duty cycle is limited at higher $Q_{2v}$ (load conditions), to keep within the component tolerances of the physical system. Although there are differences in the absolute values between predicted and measured efficiency, the duty cycle at which the highest efficiency occurs is nearly the same and the slopes of the waveforms are nearly identical. The large differences in efficiency value at lower power are due to the assumption of neglecting the switching losses in the system. When switching losses are included in the system level simulation, the simulation results directly match on top of the experimental results; however, it is not shown here for purposes of clarity. Using these figures, a direct comparison between the efficiency of each control scheme is possible.

For primary side control, duty cycle is always maintained at zero, and it can be seen that at lower $Q_{2v}$, the efficiency obtained is definitively lower than the optimal peak that appears in the measurement. For secondary side control, the duty cycle is controlled to keep the output voltage constant against load resistance variations by keeping $D=(1-R_{dc\_min}/R_{dc})$. Similarly, it can be seen that the efficiency of secondary decoupling control is not optimal. To make a clear comparison, the experimental results from FIG. 33 and FIG. 34 are listed in Table IV. It can be seen when $k=1.14\ k_{min}$, primary control efficiency is slightly better than secondary decoupling control efficiency; however, the optimal control is better than both. When $k=2\ k_{min}$, the secondary decoupling control is better than the primary; however, the optimal is still the best. It should be noted that when $k=2\ k_{min}$ and $P_{out}=1$ kW, an efficiency improvement of ~7% and loss reduction of ~25% is achieved compared against secondary decoupling control.

TABLE IV

System efficiency measurements at $1.14k_{min}$ and $2k_{min}$. The first value is analytical results and second value is experimental measurement.

| Efficiency | K | 5 kW ($R_{dc}$ = 18 Ω) | 4 kW ($R_{dc}$ = 22.5 Ω) | 3 kW ($R_{dc}$ = 30 Ω) | 2 kW ($R_{dc}$ = 45 Ω) | 1 kW ($R_{dc}$ = 90 Ω) |
|---|---|---|---|---|---|---|
| Primary | $1.14k_m$ | 0.945/ 0.923 | 0.942/ 0.922 | 0.934/ 0.904 | 0.915/ 0.877 | 0.856/ 0.791 |
| Secondary | $1.14k_m$ | 0.945/ 0.923 | 0.941/ 0.913 | 0.932/ 0.883 | 0.911/ 0.837 | 0.845/ 0.719 |
| Optimal | $1.14k_m$ | 0.945/ 0.923 | 0.943/ 0.922 | 0.938/ 0.904 | 0.931/ 0.877 | 0.909/ 0.804 |
| Primary | $2k_m$ | 0.943/ 0.912 | 0.936/ 0.898 | 0.923/ 0.876 | 0.895/ 0.850 | 0.819/ 0.751 |
| Secondary | $2k_m$ | 0.943/ 0.912 | 0.941/ 0.896 | 0.939/ 0.877 | 0.929/ 0.856 | 0.896/ 0.744 |
| Optimal | $2k_m$ | 0.946/ 0.912 | 0.943/ 0.899 | 0.939/ 0.878 | 0.930/ 0.871 | 0.907/ 0.820 |

Figure 35:
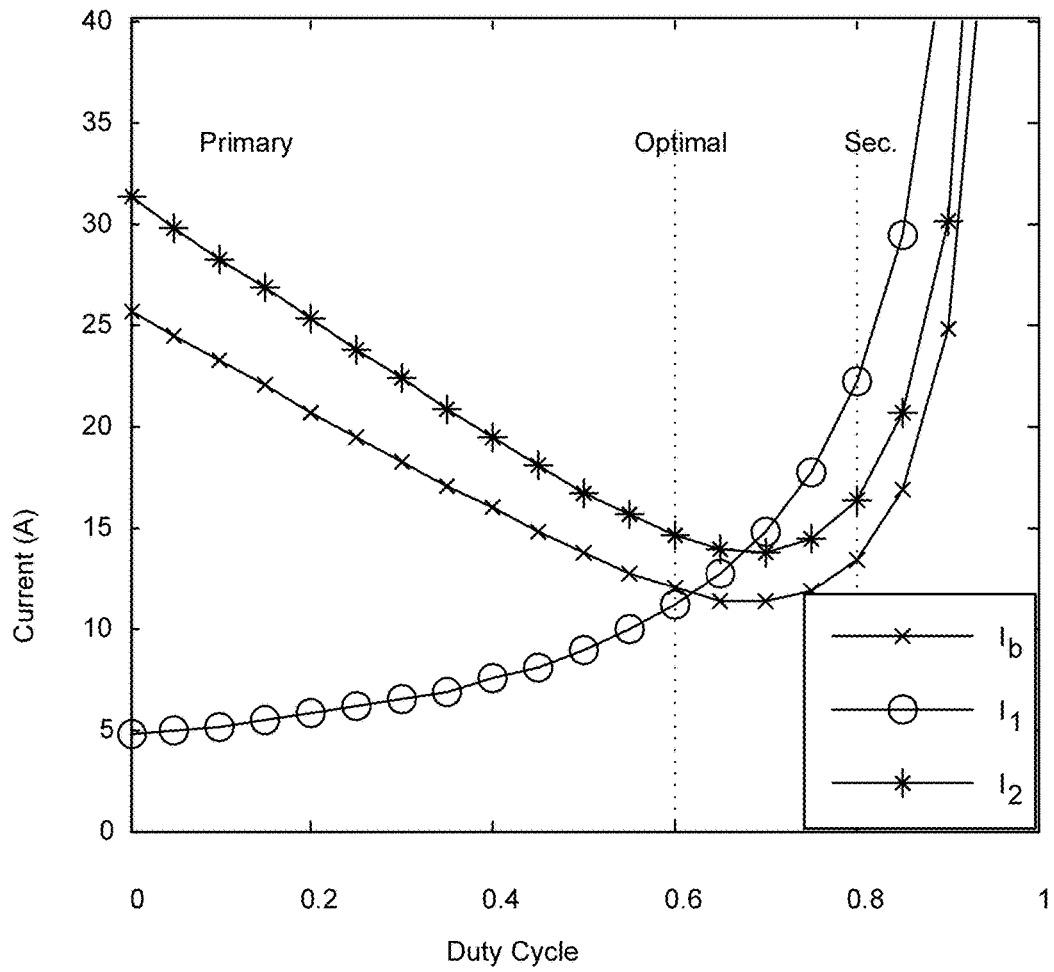
FIG. 35 illustrates current values for waveforms $i_b$, $i_1$, and $i_2$ for $Q_{2v}=0.2\ Q_{2vm}$ and $k=2\ k_{min}$.

For a typical IPT system, one may assume that the highest efficiency is achieved when the minimum primary track current is used for the required power transfer. However, due to high conduction losses in the H-bridge in (16) and (17) at low σ, the highest efficiency no longer occurs at the minimum primary current. To illustrate the large efficiency differences at $k=2\ k_{min}$ and $Q_{2v}=0.2Q_{2m}$, the RMS values of the key waveforms are shown in FIG. 35. It can be seen that the highest efficiency, which occurs at D=0.6 in FIG. 34, corresponds very close to the minimum $i_b$ in FIG. 35. In comparison to primary side control, $i_1$ and $i_2$ are much smaller for optimal control. In comparison to secondary side control, $i_b$ is much smaller for optimal control.

Figure 36:
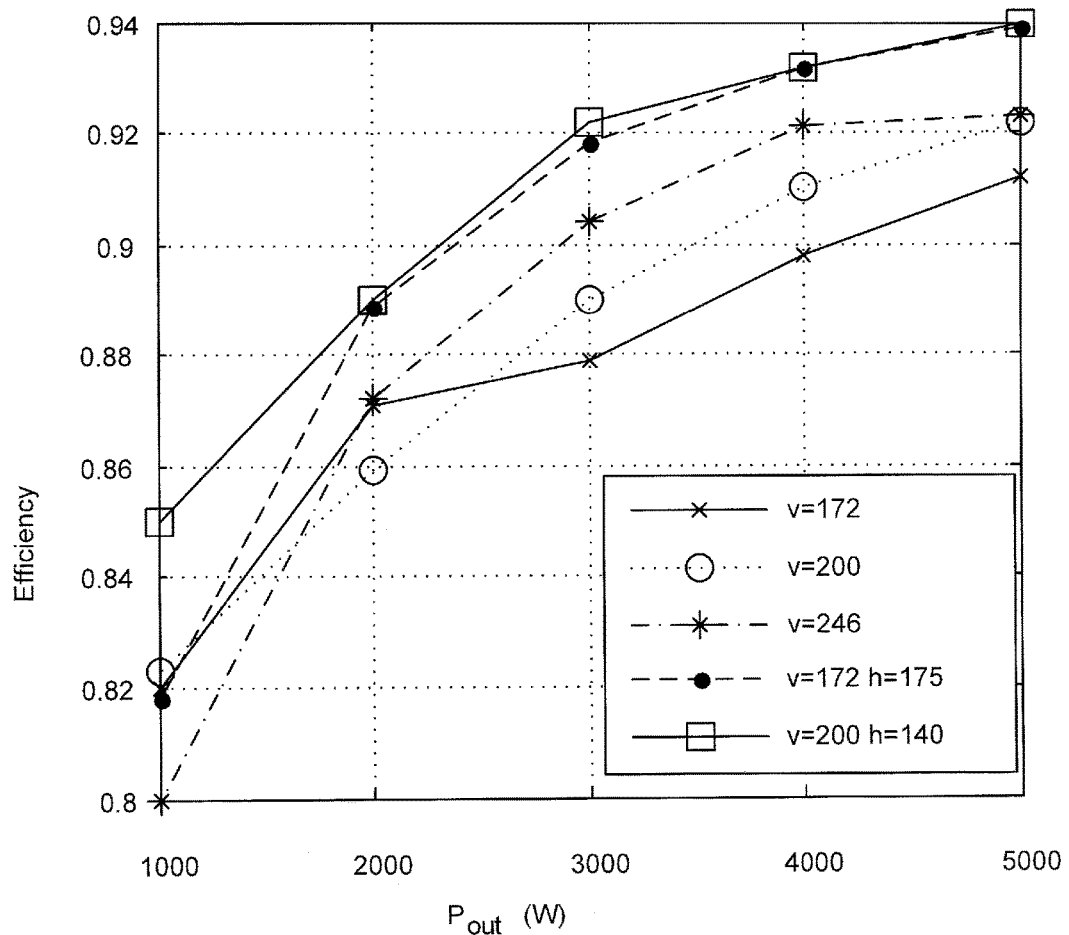
FIG. 36 illustrates efficiency measurement of an exemplary system under a wide range of operating conditions. v=172 is for a vertical height of 172 mm with zero horizontal misalignment. v=200, h=140 is for a vertical height of 200 m and horizontal misalignment of 140 mm.

The system level charging efficiency from 400 VDC to 300 VAC is shown in FIG. 36 for a range of vertical and horizontal heights. This efficiency does not include the front PFC and rectification stage. With these features, it may be shown that the efficiency from this stage can reach as high as 98%. See F. Musavi et al, "A High-Performance Single-Phase Bridgeless Interleaved PFC Converter for Plug-in Hybrid Electric Vehicle Battery Chargers," *IEEE Transactions on Industry Applications*, vol. 47, pp. 1833-1843, 2011. Factoring this component, the efficiency during normal operation over a wide range of coupling conditions can still be around or above 90% from grid to battery 326. This practical result is an important achievement as it shows that recent advances in IPT and device technology have allowed level 2 inductive charging to reach very high efficiencies. Thus, previous assumptions that inductive charging is much less efficient than plug-in systems no longer apply.

Figure 37:
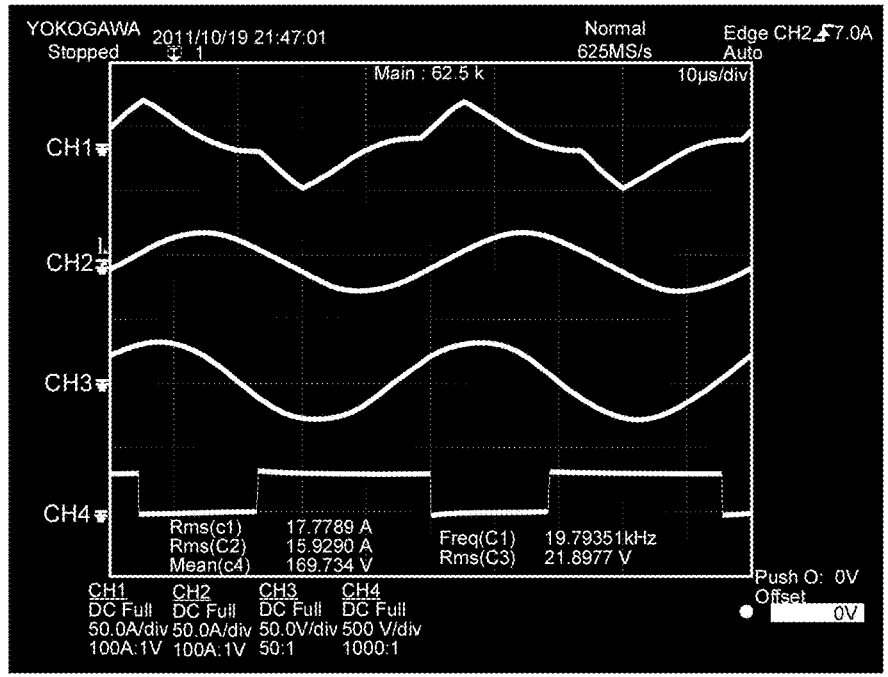
FIG. 37 illustrates waveforms of an exemplary operating IPT system with the following parameters: (a) P=2 kW, (b) P=5 kW @ v=172 mm h=0 mm. Top to bottom trace, $i_b$ (FIG. 5), $i_1$ (FIG. 5), $i_2$ (FIG. 23), and $V_s$ (FIG. 23) (inverse of duty cycle)
Figure 37:
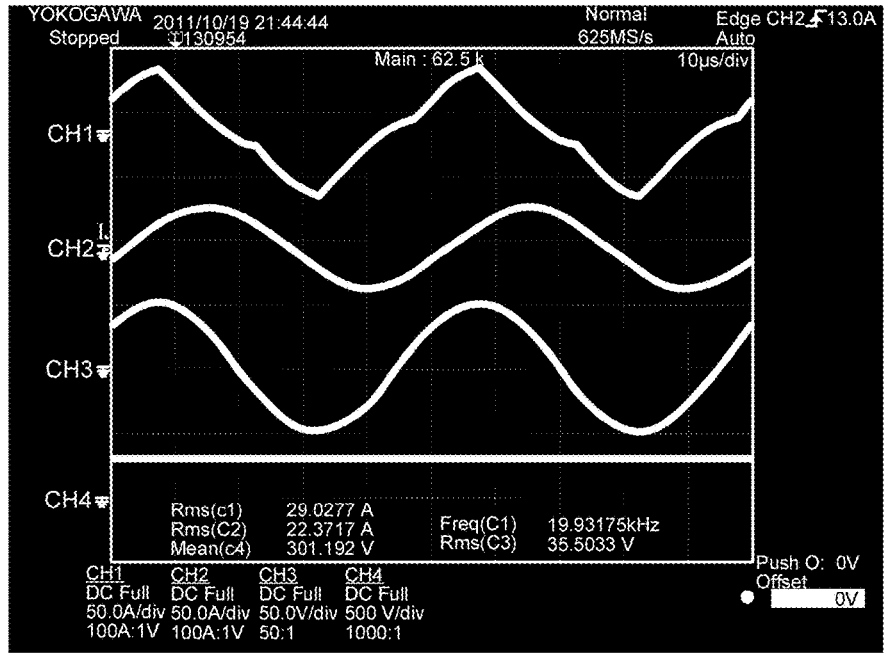
Figure 38:
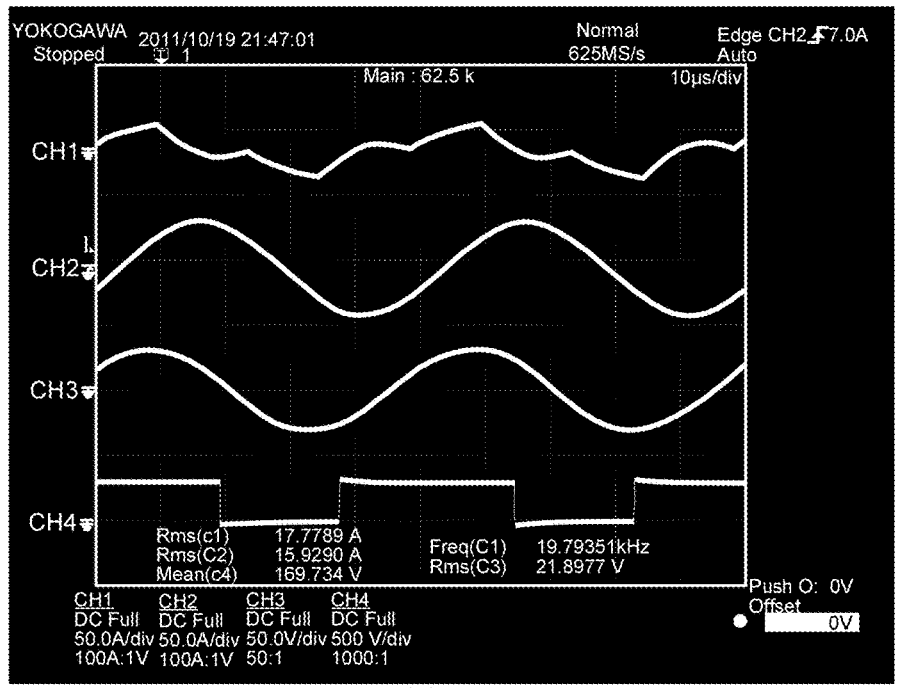
FIG. 38 illustrates waveforms of an exemplary operating IPT system with the following parameters: (a) P=2 kW, (b) P=5 kW @ v=246 mm h=0 mm. Top to bottom trace, $i_b$ (FIG. 5), $i_1$ (FIG. 5), $i_2$ (FIG. 23), and $V_s$ (FIG. 23) (inverse of duty cycle)
Figure 38:
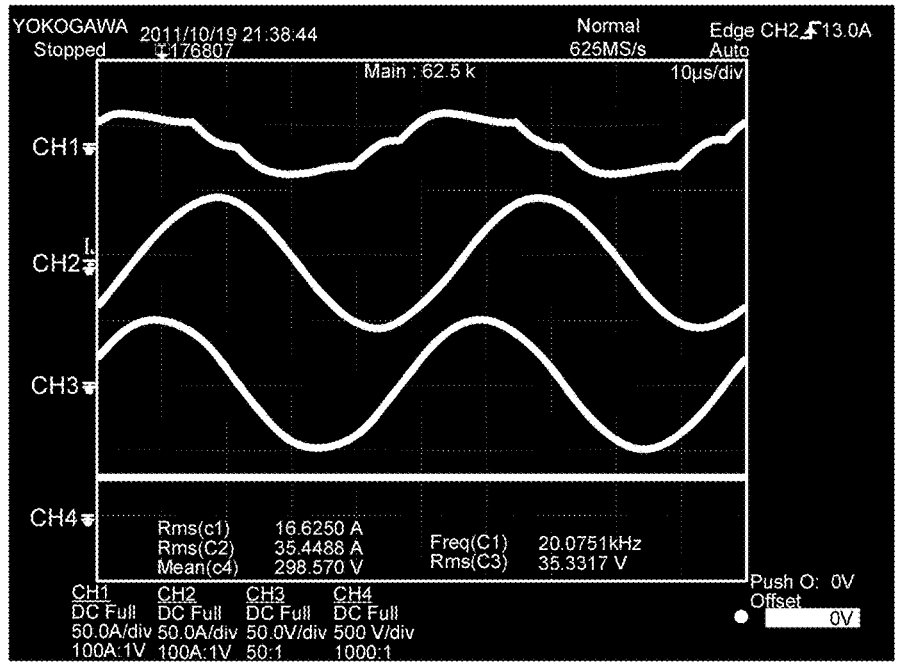

The operating waveforms are shown in FIG. 37 and FIG. 38 for the two coupling conditions of $k=1.14\ k_{min}$ and $k=2\ k_{min}$. At the maximum of 5 kW, the duty cycle is set to zero and the RMS waveforms are much higher than at 2 kW. When $k=1.14\ k_{min}$, the bridge current is much higher than $k=2\ k_{min}$, because a higher current is required to compensate for the low input voltage, which is limited by the low conduction angle of the LCL converter to reduce primary track current shown in (2). Note that for optimal efficiency dual side control, a 2 kW power corresponds to a duty cycle of around 0.4.

XII. Methods for Dual Side Control

Figure 39:
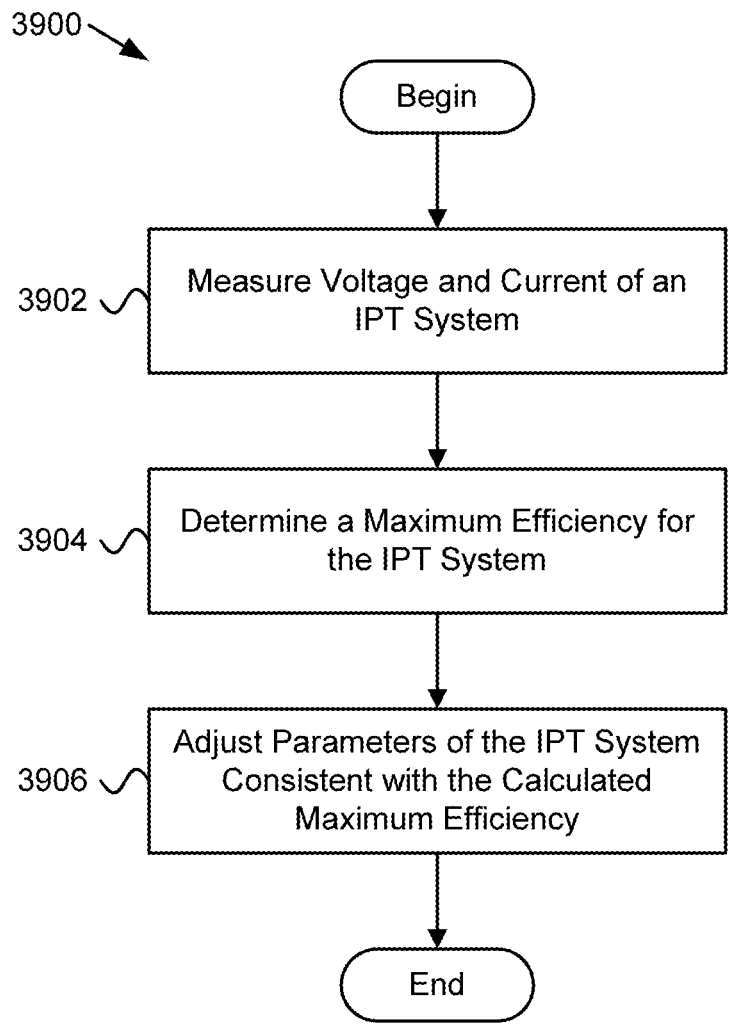
FIG. 39 is a schematic flow chart diagram illustrating one embodiment of a method for dual side control in accordance with the present invention.

FIG. 39 is a schematic flow chart diagram illustrating one embodiment of a method 3900 for dual side control leveling in accordance with the present invention. The method 3900 begins and measures 3902 voltage and current of an IPT system 104. In one embodiment, the method 3900 measures 3902 voltage and current at an output of the IPT system 104, such as an output of a second stage 108. In another embodiment, the method 3900 measures 3902 input voltage and current. The input voltage and current or output voltage and current may be used to determine an input power and/or an output power of the IPT system 104. For example, the measurement module 202 may measure a voltage and current of the IPT system 104.

The method 3900 determines 3904 a maximum efficiency for the IPT system 104 using parameters of the IPT system 104 to iterate to a maximum efficiency. For example, the max efficiency module 204 may determine 3904 a maximum efficiency for the IPT system 104. The method 3900 adjusts 3906 one or more parameters in the IPT system 104 consistent with the calculated maximum efficiency, and method 3900 ends. For example, the adjustment module 206 may adjust 3906 the one or more parameters of the IPT system 104. The adjustment module 206 may adjust a reference for a conduction angle of the first stage 106 and/or a reference for a duty cycle for the second stage 108.

Figure 40:
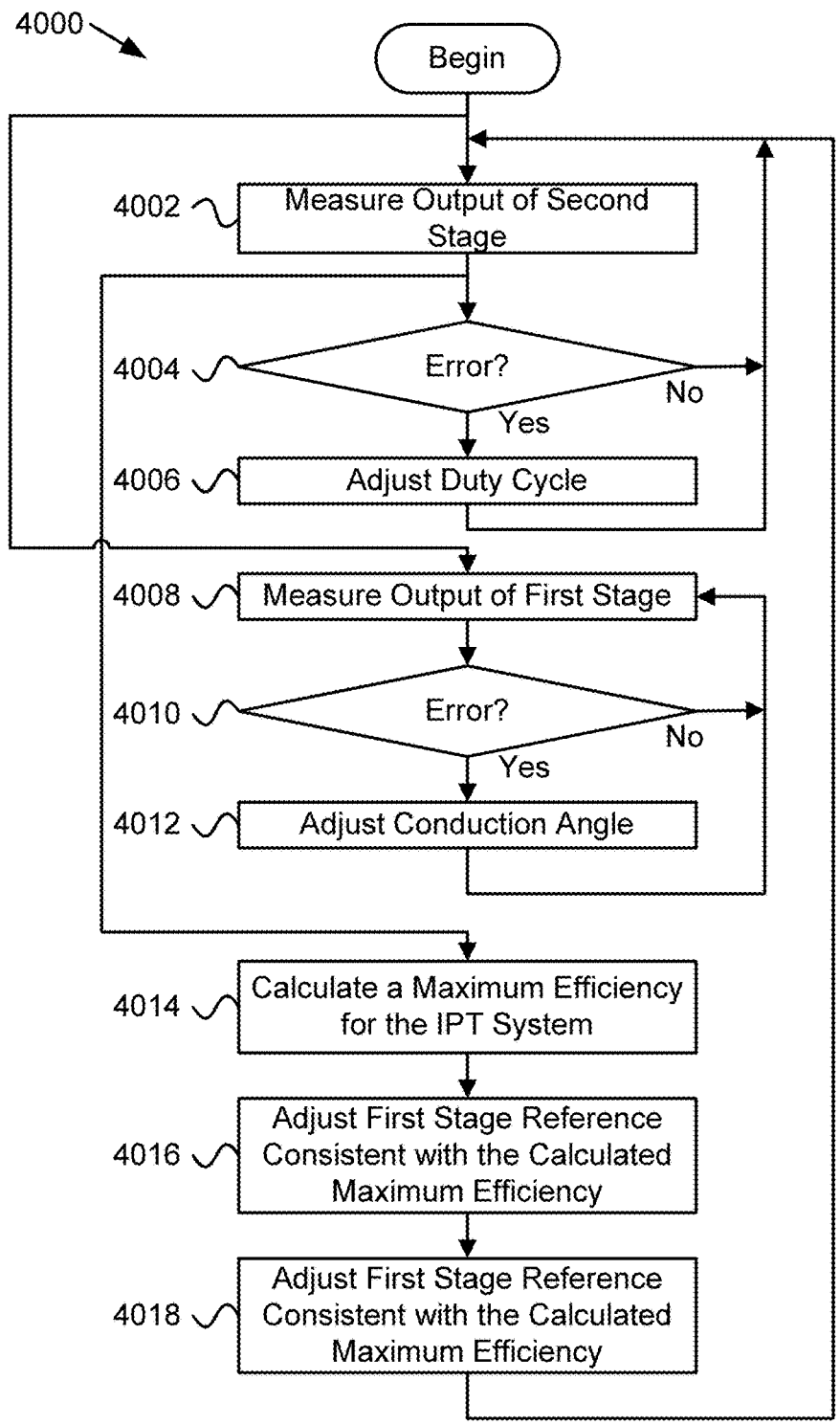
FIG. 40 is a schematic flow chart diagram illustrating another embodiment of a method for dual side control in accordance with the present invention.

FIG. 40 is a schematic flow chart diagram illustrating another embodiment of a method 4000 for dual side control in accordance with the present invention. The method 4000 begins and measures 4002 an output of the second stage 108 of the IPT system 104. In one embodiment, the output is an output voltage and/or an output current of the second stage 108. The method 4000 determines 4004 if there is an error. For example, where the second stage 108 include a secondary decoupling circuit that is a converter (secondary decoupling converter), such as a boost converter, the secondary decoupling converter may control duty cycle of the secondary decoupling converter. The secondary decoupling converter may include a feedback loop that controls output voltage or output current. The feedback loop may be compared to a reference signal. The method 4000 determines 4004, in one embodiment, if there is an error signal. If the method 4000 determines 4004 that there is not an error, the method 4000 returns and measures 4002 an output of the second stage 108. If the method 4000 determines 4004 that there is not an error, the method 4000 adjusts 4006 the duty cycle of the secondary decoupling converter based on the error signal and again measures 4002 an output of the second stage 108.

The method 4000 measures 4008 an output of the first stage 106. For example, the first stage 106 may include an LCL load resonant converter that is controlled by controlling conduction angle. The LCL load resonant converter may include a feedback loop to control conduction angle. The feedback look may compare an output of the first stage 106 to a reference signal to determine an error. The method 4000 determines 4010 if there is an error. If the method 4000 determines 4010 that there is not an error, the method 4000 returns and measures 4008 an output of the first stage 106. If the method 4000 determines 4010 that there is an error, the method 4000 adjusts 4012 the conduction angle of the first stage 106 and returns and measures 4008 an output of the first stage 106.

The method 4000 uses the output of the second stage 108 and calculates 4014 a maximum efficiency of the IPT system 104. The method 4000 adjusts 4016 a reference of the first stage 106 and adjusts 4018 a reference of the second stage 108 consistent with the calculated maximum efficiency, and the method 4000 returns and measures 4002 and output of the second stage 108. For example, the method 4000 may adjust 4016 a reference of the first stage 106 that adjusts conduction angle of the LCL load resonant converter of the first stage 106. In another example, the method 4000 may adjust 4018 a reference of the second stage 108 that adjusts duty cycle of the secondary decoupling converter of the second stage 108. Typically, the feedback loop that calculates 4014 maximum efficiency of the IPT system 104 and then adjusts 4016, 4018 references is a slower loop than the feedback loops that adjust 4006, 4012 duty cycle and conduction angle.

XIII. Nomenclature

The following is a list of nomenclature included herein:

$V_{dc}$ DC input voltage to the primary LCL load resonant converter $Q_2$ Total quality factor of the secondary resonant circuit (J. T. Boys et al, "Stability and control of inductively coupled power transfer systems," *IEE Proceedings—Electric Power Applications*, vol. 147, pp. 37-43, 2000.)

$Q_{2v}$ Voltage quality factor of the secondary resonant circuit (N. A. Keeling et al, "A Unity-Power-Factor IPT Pickup for High-Power Applications," *IEEE Transactions on Industrial Electronics*, vol. 57, pp. 744-751, 2010.)

$Q_{2i}$ Current quality factor of the secondary resonant circuit (N. A. Keeling et al, "A Unity-Power-Factor IPT Pickup for High-Power Applications," *IEEE Transactions on Industrial Electronics*, vol. 57, pp. 744-751, 2010.)

$Q_{2vm}$ Maximum voltage quality factor when at minimum coupling and maximum load condition $Q_1$ Quality factor of primary LCL load resonant converter $R_{dc}$ DC equivalent resistance of the battery 326 under steady state $R_{dc\_min}$ Maximum loading condition k Coupling coefficient $k_{min}$ Minimum coupling coefficient within operating range $k_{max}$ Maximum coupling coefficient within operating range M Mutual inductance between primary and secondary receiver pads 314, 316

Figure 5:
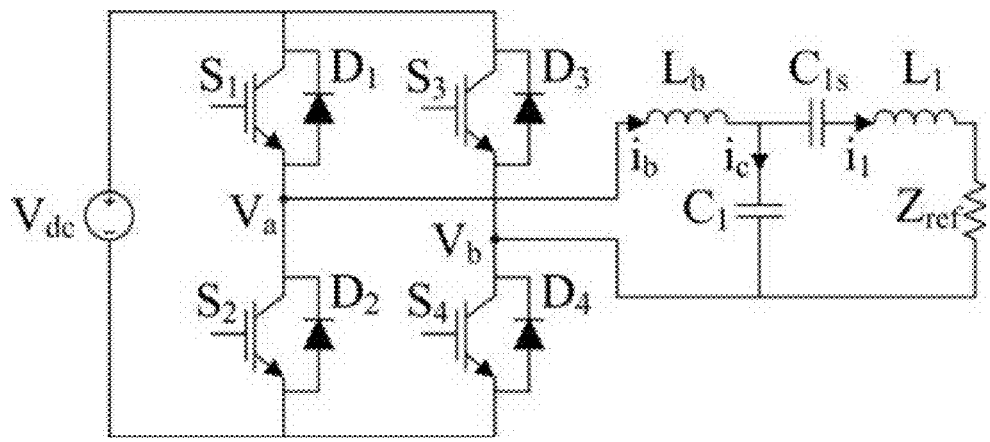
FIG. 5 illustrates an exemplary LCL load resonant converter.

$L_1$ Self-inductance of primary receiver pad 314 (FIG. 5)

$L_2$ Self-inductance of secondary receiver pad 316 (FIG. 23)

$C_{2s}$ Series tuning capacitor on the secondary resonant circuit (FIG. 23)

$C_2$ Parallel tuning capacitor on the secondary resonant circuit (FIG. 23)

$C_{1s}$ Series tuning capacitor on the primary LCL load resonant converter (FIG. 5)

$C_1$ Parallel tuning capacitor on the primary LCL load resonant converter (FIG. 5)

$L_{dc}$ DC inductance of secondary decoupling circuit $L_b$ Bridge inductance of LCL load resonant converter SU Uncompensated power of a receiver pad (defined as $V_{oc}*I_{sc}$ (G. Elliott et al, "Multiphase Pickups for Large Lateral Tolerance Contactless Power-Transfer Systems," *IEEE Transactions on Industrial Electronics*, vol. 57, pp. 1590-1598, 2010.))

$i_1$ Primary track current (or current flowing through inductor coil) (FIG. 5)

$i_{1\_max}$ Maximum primary track current in LCL load resonant converter (FIG. 5)

$I_{sc}$ Current measured when secondary receiver pad 316 is short circuited $V_{oc}$ Voltage measured when secondary receiver pad 316 is open circuited $\omega$ Operating frequency of IPT system $X_1$ Reactance of the LCL load resonant converter (M. Borage et al, "Analysis and design of an LCL-T resonant converter as a constant-current power supply," *IEEE Transactions on Industrial Electronics*, vol. 52, pp. 1547-1554, 2005.)

$X_2$ Reactance of the secondary resonant circuit (parallel equivalent)

σ Conduction angle control variable of the first stage (H. H. Wu et al, "Design of Symmetric Voltage Cancellation Control for LCL converters in Inductive Power Transfer Systems," in *IEEE International Electric Machines & Drives Conference* ("*IEMDC*"), 2011, 2011, pp. 866-871.)

$Z_r$ Reflected impedance on the primary from secondary side $Z_2$ Equivalent impedance of secondary circuit 318 measured from $V_{oc}$ (C.-S. Wang et al, "Design considerations for a contactless electric vehicle battery charger," *IEEE Transactions on Industrial Electronics*, vol. 52, pp. 1308-1314, October 2005 2005.)

$L_{1eq}$ Equivalent primary receiver pad inductance with series tuning (1)

$L_{2eq}$ Equivalent secondary receiver pad inductance with series tuning (23)

$V_{ab}$ AC output voltage of H-bridge (FIG. 5)

$(V_{ab})_1$ Fundamental component of AC output voltage $V_{ac2}$ Voltage across secondary parallel resonant capacitor $\Delta L_1$ Change in primary receiver pad inductance due to height variations $\Delta L_2$ Change in secondary receiver pad inductance due to height variations $\Delta C_2$ Equivalent change in secondary tuning capacitance due to variations in $L_2$ $P_{max}$ Maximum transferable power of IPT system $P_{out}$ Current output power transferred in IPT system D Control duty cycle of secondary boost converter (secondary decoupling circuit)

$R_{ac}$ Equivalent AC resistance of load from resonant tank (FIG. 19)

$V_{out}$ DC output voltage of secondary decoupling circuit $I_{out}$ DC output current of secondary decoupling circuit $R_{L2}$ ESR of secondary receiver pad 316

$R_{Ldc}$ ESR of DC inductor and two times linear on resistance of rectifier bridge $R_{bd\_on}$ Linear on resistance portion of boost converter diode $V_{bd\_on}$ Voltage drop portion of boost converter diode $R_{hs\_on}$ Linear on resistance portion of switching devices of the LCL load resonant converter (in one embodiment IGBT IRG7PH42UPBF)

$V_{hs\_on}$ Voltage drop portion of switching devices of the LCL load resonant converter (in one embodiment IGBT IRG7PH42UPBF)

$V_{rd\_on}$ Voltage drop portion of secondary rectifier circuit diodes

α Normalized detuning capacitance (11)

$\eta_{b2}$ Efficiency of secondary boost converter (secondary decoupling circuit) without voltage drop $\eta_{c2}$ Efficiency of secondary boost converter (secondary decoupling circuit) with linear resistance loss $\eta_{r2}$ Efficiency of secondary resonant circuit $\eta_{r1}$ Efficiency of primary LCL load resonant converter without voltage drop $\eta_{c1}$ Efficiency of primary LCL load resonant converter without linear resistance loss η Efficiency of system neglecting switching losses The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a measurement module that measures a voltage and a current of an inductive power transfer ("IPT") system, the voltage comprising one or more of an output voltage and an input voltage, the current comprising one or more of an output current and an input current, the output voltage and the output current measured at an output of the IPT system, the input voltage and the input current measured at an input of the IPT system;
   a max efficiency module that determines, using the voltage and current measured by the measurement module, a maximum efficiency for the IPT system, the max efficiency module using one or more models of elements of the IPT system and varying parameters of the IPT system within the one or more models of the IPT system to iterate to a maximum efficiency; and an adjustment module that adjusts one or more parameters in the IPT system consistent with the maximum efficiency calculated by the max efficiency module,
   wherein the IPT system includes a first stage and a second stage, wherein the first stage transmits energy wirelessly and the second stage receives the wirelessly transferred energy and controls energy transfer to one or more loads via an output bus,
   wherein the output voltage and the output current are measured on the output bus, wherein the one or more parameters varied by the max efficiency module and adjusted by the adjustment module comprise one or more of a duty cycle reference that adjusts a duty cycle of a switching power converter of the second stage and a conduction angle reference that adjusts conduction angle of a switching power converter of the first stage, wherein one parameter is used as the primary control variable and another parameter is updated to regulate output power.

2. The apparatus of claim 1, wherein the first stage comprises an LCL load resonant converter and the second stage comprises one or more of a secondary resonant circuit, a secondary rectification circuit and a secondary decoupling circuit.

3. The apparatus of claim2, wherein at least one load comprises an energy storage device.

4. The apparatus of claim 1, wherein the adjustment module adjusting one or more of the duty cycle reference and the conduction angle reference comprise an outer control loop, wherein one or more of
   the first stage comprises a first stage inner loop controlling conduction angle based on the conduction angle reference, the first stage inner loop controlling conduction angle faster than the outer loop control; and
   the second stage comprises a second stage inner loop controlling duty cycle based on the duty cycle reference, the second stage inner loop controlling duty cycle faster than the outer loop control.

5. The apparatus of claim 1, wherein the max efficiency module determines the maximum efficiency by iterating using one or more variables, the one or more variables comprising:
   conduction angle of the first stage;
   duty cycle of the second stage;
   size of a gap, the IPT system transferring power wirelessly across the gap;

misalignment of a primary receiver pad and a secondary receiver pad, the IPT system transferring power wirelessly from the primary receiver pad to the secondary receiver pad;

power transferred to the one or more loads; and a quality factor.

6. The apparatus of claim 1, wherein the max efficiency module determines the maximum efficiency by determining an efficiency of at least the first stage and the second stage for the measured voltage and current.

7. The apparatus of claim 6, wherein the max efficiency module determines the maximum efficiency where efficiency of the IPT system is calculated as:

$$\eta = \eta_{r1} \cdot \eta_{c1} \cdot \eta_{r2} \cdot \eta_{b2} \cdot \eta_{c2},$$

wherein $\eta$ is IPT system efficiency;
$\eta_{r1}$ is efficiency of the first stage without voltage drop;
$\eta_{c1}$ is efficiency of first stage without linear resistance loss,
$\eta_{r2}$ is efficiency of a secondary resonant circuit of the second stage;
$\eta_{b2}$ is efficiency of a secondary rectification circuit and a secondary decoupling circuit of the second stage without voltage drop; and
$\eta_{c2}$ is efficiency of the secondary rectification circuit and the secondary decoupling circuit of the second stage with linear resistance loss.

8. The apparatus of claim 7, wherein the first stage comprises an LCL load resonant converter and the secondary decoupling circuit comprises a secondary boost converter and wherein $\eta_{r1}$ is calculated as:

$$\eta_{r1} = \frac{1}{1 + \frac{R_{L1} + R_b \omega^2 C_1^2 \left( \begin{array}{c} (R_{L1} + \mathrm{Re}(Z_r))^2 + \\ (\omega \Delta L_1 + \mathrm{Im}(Z_r))^2 \end{array} \right)}{\mathrm{Re}(Z_r)}}$$

where $R_{L1}$ is the equivalent series resistance ("ESR") of a primary receiver pad, the IPT system transferring power wirelessly from the primary receiver pad to a secondary receiver pad;
$R_b$ is ESR of a bridge inductor of the LCL load resonant converter of the first stage and linear on resistance of switching devices on during a half cycle of the LCL load resonant converter;
$\omega$ is an operating frequency of the IPT system;
$C_1$ is capacitance of a parallel tuning capacitor of the LCL load resonant circuit;
$\mathrm{Re}(Z_r)$ is a reflected resistance on the first stage of the second stage;
$\Delta L_1$ is change in the primary receiver pad inductance due to size of size of a gap, the IPT system transferring power wirelessly across the gap; and
$\mathrm{Im}(Z_r)$ is a reflected reactance on the first stage of the second stage.

9. The apparatus of claim 8, wherein the first stage comprises an LCL load resonant converter and the secondary decoupling circuit comprises a secondary boost converter and wherein $Z_r$ is calculated as:

$$Z_r = \mathrm{Re}(Z_r) + j \cdot \mathrm{Im}(Z_r)$$

where $$\mathrm{Re}(Z_r) = \frac{\omega M^2}{L_{2eq}} \frac{Q_{2v}}{1 + Q_{2v}^2 \alpha^2}$$

and $$\mathrm{Im}(Z_r) = \frac{\omega M^2}{L_{2eq}} \left( -1 - \frac{Q_{2v}}{1 + Q_{2v}^2 \alpha^2} \right)$$

where

M is mutual inductance between the primary receiver pad and the secondary receiver pad of the IPT system;
$L_{2eq}$ is an equivalent secondary receiver pad inductance with series tuning;
$Q_{2v}$ is a voltage quality factor of the secondary resonant circuit; and
$\alpha$ is a normalized detuning capacitance ratio of the secondary resonant circuit, the normalized detuning capacitance ratio defined as $$\alpha = \left| \frac{\Delta C_2}{C_2} \right|;$$

$C_2$ is capacitance of a parallel tuning capacitor of the secondary resonant circuit; and
$\Delta C_2$ is an equivalent change in secondary tuning capacitance due to variations in self inductance of the secondary receiver pad.

10. The apparatus of claim 9, wherein M is calculated as:

$$M = \frac{\sqrt{1 + Q_{2v}^2 \alpha^2}}{1 - D} \frac{I_{out} X_1}{V_{dc} \sin\left(\frac{\sigma}{2}\right)} L_{2eq}$$

where $$Q_{2v} = \frac{\pi^2 (1 - D)^2 R_{dc}}{8 \omega L_{2eq}}$$

where $$R_{dc} = \frac{V_{out}}{I_{out}};$$

$V_{out}$ is output voltage measured on the output bus;
$I_{out}$ is output current measured on the output bus;
$\sigma$ is conduction angle of the first stage; and
D is a duty cycle of the secondary boost converter of the second stage.

11. The apparatus of claim 7, wherein the first stage comprises an LCL load resonant converter and the secondary decoupling circuit comprises a secondary boost converter and wherein $\eta_{c1}$ is calculated as:

$$\eta_{c1} = 1 - \frac{\pi V_{hs\_on}}{\omega L_b \sqrt{\frac{2 P_{out}}{\mathrm{Re}(Z_r)}}}$$

where $V_{hs\_on}$ is a voltage drop portion of a switching device of the first stage;
$\sigma$ is an operating frequency of the IPT system;

$L_b$ is a bridge inductance of the LCL load resonant converter;

$P_{out}$ is output power transferred by the IPT system; and $Re(Z_r)$ is a reflected resistance on the first stage of the second stage.

12. The apparatus of claim 7, wherein the first stage comprises an LCL load resonant converter and the secondary decoupling circuit comprises a secondary boost converter and wherein $\eta_{r2}$ is calculated as:

$$\eta_{r2} = \frac{1}{1 + \frac{\omega C_2 R_{L2}}{Q_{2v}}(1 + Q_{2v}^2(1+\alpha)^2)}$$

where

σ is an operating frequency of the IPT system;

$C_2$ is capacitance of a parallel tuning capacitor of the secondary resonant circuit of the second stage;

$R_{L2}$ is ESR of a secondary receiver pad, the IPT system transferring power wirelessly from a primary receiver pad to the secondary receiver pad;

$Q_{2v}$ is a voltage quality factor of the secondary resonant circuit; and

α is a normalized detuning capacitance ratio of the secondary resonant circuit, the normalized detuning capacitance ratio defined as $$\alpha = \left|\frac{\Delta C_2}{C_2}\right|,$$

where $$Q_{2v} = \frac{\pi^2(1-D)^2 R_{dc}}{8\omega L_{2eq}}$$

and $$R_{dc} = \frac{V_{out}}{I_{out}};$$

$V_{out}$ is output voltage measured on the output bus;

$I_{out}$ is output current measured on the output bus;

$L_{2eq}$ is an equivalent secondary receiver pad inductance with series tuning;

D is a duty cycle of the secondary boost converter of the second stage; and $\Delta C_2$ is an equivalent change in secondary tuning capacitance due to variations in self inductance of the secondary receiver pad.

13. The apparatus of claim 7, wherein the first stage comprises an LCL load resonant converter and the secondary decoupling circuit comprises a secondary boost converter and wherein $\eta_{b2}$ is calculated as:

$$\eta_{b2} = \frac{1}{1 + \frac{8\omega C_2(R_{Ldc} + R_{bd\_on})}{\pi^2 Q_{2v}}}$$

where

σ is an operating frequency of the IPT system;

$C_2$ is capacitance of a parallel tuning capacitor of the secondary resonant circuit of the second stage;

$R_{Ldc}$ is ESR of a DC inductor and linear on resistance of switching devices on during a half cycle of the LCL load resonant converter;

$R_{bd\_on}$ is a linear resistance of a diode of a secondary boost converter of the second stage; and $Q_{2v}$ is a voltage quality factor of the secondary resonant circuit, where $$Q_{2v} = \frac{\pi^2(1-D)^2 R_{dc}}{8\omega L_{2eq}}$$

and $$R_{dc} = \frac{V_{out}}{I_{out}};$$

$L_{2eq}$ is an equivalent secondary receiver pad inductance with series tuning;

$V_{out}$ is output voltage measured on the output bus;

$I_{out}$ is output current measured on the output bus; and

D is a duty cycle of the secondary boost converter of the second stage.

14. The apparatus of claim 7, wherein the first stage comprises an LCL load resonant converter and the secondary decoupling circuit comprises a secondary boost converter and wherein $\eta_{c2}$ is calculated as:

$$\eta_{c2} = \frac{1}{1 + \frac{\pi V_{rd\_on} + \sqrt{2} V_{bd\_on}}{\sqrt{2}(1-D)V_{out}}}$$

where $V_{rd\_on}$ is a voltage drop portion of a diode of the secondary rectifier circuit of the second stage;

$V_{bd\_on}$ is a voltage drop portion of a diode of the secondary boost converter of the second stage;

D is a duty cycle of the secondary boost converter of the second stage; and $V_{out}$ is a DC output voltage of the secondary resonant circuit of the second stage.

15. A system comprising:

a first stage comprising a primary receiver pad;

a second stage comprising a secondary receiver pad;

an output power bus, wherein the first stage transmits energy wirelessly from the primary receiver pad and the second stage receives the wirelessly transferred energy in the secondary receiver pad, the second stage controlling energy transfer to one or more loads via the output bus, the first stage, the second stage, and the output power bus comprising at least a portion of an inductive power transfer ("IPT") system; a measurement module that measures a voltage and a current, the voltage and current measured on one or more of the output bus and an input to the IPT system;

a max efficiency module that determines, using the voltage and current measured by the measurement module, a maximum efficiency for the IPT system, the max efficiency module using one or more models of elements of the IPT system varying parameters of the IPT system within the one or more models of the IPT system to iterate to a maximum efficiency; and an adjustment module that adjusts one or more parameters in the IPT system consistent with the maximum efficiency calculated by the max efficiency module, wherein the one or more parameters varied by the max efficiency module and adjusted by the adjustment module comprise one or more of a duty cycle reference that adjusts a duty cycle of a switching power converter of the second stage and a conduction angle reference that adjusts conduction angle of a switching power converter of the first stage, wherein one parameter is used as the primary control variable and another parameter is updated to regulate output power.

16. The system of claim 15, further comprising an energy storage device, the energy storage device comprising a load of the one or more loads.

17. The system of claim 16, wherein the energy storage device provides power to a vehicle, the second stage and the energy storage device residing on the vehicle, the vehicle receiving power wirelessly from the first stage when the secondary receiver pad is at least partially aligned with the primary receiver pad.

18. The system of claim 15, wherein the first stage comprises a rectifier stage, the rectifier stage rectifying an alternating current ("AC") voltage connected as input power to the first stage.

19. The system of claim 15, wherein the first stage comprises an LCL load resonant converter and the second stage comprises a secondary resonant circuit, a secondary rectification circuit, and a secondary boost converter and wherein the max efficiency module determines the maximum efficiency where efficiency of the IPT system is calculated as:

$$\eta = \eta_{r1} \cdot \eta_{c1} \cdot \eta_{r2} \cdot \eta_{b2} \cdot \eta_{c2},$$

wherein $\eta$ is IPT system efficiency;
$\eta_{r1}$ is efficiency of the first stage without voltage drop;
$\eta_{c1}$ is efficiency of first stage without linear resistance loss,
$\eta_{r2}$ is efficiency of a secondary resonant circuit of the second stage;
$\eta_{b2}$ is efficiency of the secondary rectification circuit and the secondary boost converter of the second stage without voltage drop; and
$\eta_{c2}$ is efficiency of the secondary rectification circuit and the secondary boost converter of the second stage with linear resistance loss.

20. A method comprising:
measuring a voltage and a current of an inductive power transfer ("IPT") system, the voltage comprising one or more of an output voltage and an input voltage, the current comprising one or more of an output current and an input current, the output voltage and the output voltage measured at an output of the IPT system, the input voltage and the input current measured at an input of the IPT system;
determining, using the measured voltage and current, a maximum efficiency for the IPT system using one or more models of elements of the IPT system and varying parameters of the IPT system-within the one or more models of the IPT system to iterate to a maximum efficiency; and adjusting one or more parameters in the IPT system consistent with the calculated maximum efficiency,
wherein the IPT system includes a first stage and a second stage, wherein the first stage transmits energy wirelessly and the second stage receives the wirelessly transferred energy and controls energy transfer to one or more loads via an output bus, wherein the output voltage and the output current are measured on the output bus,
wherein varying parameters of the IPT system comprises varying one or more of a duty cycle reference that adjusts a duty cycle of the second stage and a conduction angle reference that adjusts conduction angle of the first stage and adjusting the one or more parameters comprises adjusting one or more of a duty cycle reference that adjusts a duty cycle of the second stage and a conduction angle reference that adjusts conduction angle of the first stage, wherein one parameter is used as the primary control variable and another parameter is updated to regulate output power.

21. The method of claim 20, wherein the first stage comprises an LCL load resonant converter and the second stage comprises one or more of a secondary resonant circuit, a secondary rectification circuit and a secondary decoupling circuit, and wherein at least one load comprises an energy storage device.

22. The method of claim 20, wherein adjusting the one or more parameters comprises adjusting one or more of a duty cycle reference that adjusts a duty wherein adjusting one or more of the duty cycle reference and the conduction angle reference comprise an outer control loop, wherein one or more of:
the first stage comprises a first stage inner loop controlling conduction angle based on the conduction angle reference, the first stage inner loop controlling conduction angle faster than the outer loop control; and
the second stage comprises a second stage inner loop controlling duty cycle based on the duty cycle reference, the second stage inner loop controlling duty cycle faster than the outer loop control.

23. The method of claim 20, wherein determining the maximum efficiency comprises determining the maximum efficiency by iterating using one or more variables, the one or more variables comprising:
conduction angle of the first stage;
duty cycle of the second stage;
size of a gap, the IPT system transferring power wirelessly across the gap;
misalignment of a primary receiver pad and a secondary receiver pad, the IPT system transferring power wirelessly from the primary receiver pad to the secondary receiver pad;
power transferred to the one or more loads; and
a quality factor.

* * * * *